United States Patent [19]
Poehler et al.

[11] Patent Number: 5,923,278
[45] Date of Patent: Jul. 13, 1999

[54] GLOBAL PHASE UNWRAPPING OF INTERFEROGRAMS

[75] Inventors: Paul L. Poehler, Melbourne, Fla.; Arthur W. Mansfield, Rockville, Md.

[73] Assignee: Science Applications International Corporation, San Diego, Calif.

[21] Appl. No.: 08/890,597

[22] Filed: Jul. 9, 1997

Related U.S. Application Data

[60] Provisional application No. 60/024,202, Jul. 11, 1996.
[51] Int. Cl.$^6$ ....................................................... G01S 13/90
[52] U.S. Cl. .............................................. 342/25; 342/191
[58] Field of Search ....................................... 342/25, 191

[56] References Cited

U.S. PATENT DOCUMENTS

| | | |
|---|---|---|
| 5,189,424 | 2/1993 | Brown . |
| 5,260,708 | 11/1993 | Auterman . |
| 5,332,999 | 7/1994 | Prati et al. . |
| 5,394,151 | 2/1995 | Knaell et al. . |
| 5,424,743 | 6/1995 | Ghiglia et al. . |
| 5,448,241 | 9/1995 | Zeoli et al. . |
| 5,463,397 | 10/1995 | Frankot . |
| 5,552,787 | 9/1996 | Schuler et al. . |
| 5,608,405 | 3/1997 | Pritt . |
| 5,627,543 | 5/1997 | Moreira . |

OTHER PUBLICATIONS

Just et al., "Comparison of Phase Unwrapping algorithms for SAR Interferograms", 1995 International Geoscience and remote Sensing Symposium, IGARSS '95, Qunatative Remote Sensing for Science and Applications, (Cat. No. 95CH35770) pp. 767–769, Jul. 10, 1995.

(List continued on next page.)

*Primary Examiner*—Ian J. Lobo
*Attorney, Agent, or Firm*—Banner & Witcoff, Ltd.

[57] ABSTRACT

An interferogram is an array of phases, often generated from the inverse tangent of a ratio of an imaginary component divided by a real component. The array is said to be a wrapped phase array when the phase angle is modulo between zero and $2\pi$. A method of processing a wrapped phase array into an unwrapped phase array includes computing a first array from the wrapped phase array, each element of the first array being based on a discrete Poisson difference equation, processing the first array through a two dimensional FFT to form a second array, scaling the second array by a scaling function to form a third array, and processing the third array through an inverse two dimensional FFT to form the unwrapped phase array. The step of computing a first array includes forming a twice unfolded array from the wrapped phase array, computing a row difference array, an element in the row difference array being based on a difference between an element in a particular row in the twice unfolded array and an element in an adjacent row in the twice unfolded array, computing a column difference array, an element in the column difference array being based on a difference between an element in a particular column in the twice unfolded array and an element in an adjacent column in the twice unfolded array, computing a double row difference array, an element in the double row difference array being based on a difference between an element in the particular row in the row difference array and an element in an adjacent row in the row difference array, computing a double column difference array, an element in the double column difference array being based on a difference between an element in the particular column in the column difference array and an element in an adjacent column in the column difference array, and adding the double row difference array to the double column difference array element by element to form the first array.

12 Claims, 31 Drawing Sheets

OTHER PUBLICATIONS

D.C. Ghiglia, et al. "Robust Two–Dimensional Weighted And UnWeighted Phase Unwrapping That Uses Fast Transforms And Iterative Methods", *Optical Society Of America*, vol. 11, No. 1, Jan. 1994, pp. 107–117.

D. C. Ghiglia, et al. "Direct Phase Estimation From Phase Differences Using Fast Elliptic Partial Differential Equation Solvers", *Optical Society Of America*, vol. 14, No. 20, Oct. 15, 1989, pp. 1107–1109.

Mark D. Pritt, et al. "Least–Squares Two–Dimensional Phase Unwrapping Using FET's" *IEEE Transactions On Geoscience And Remote Sensing*, vol. 32, No. 3, May 1994, pp. 706–708.

Claudio Prati, et al. "Seismic Migration For SAR Focusing: Interferometrical Applications", *IEEE Transactions On Geoscience And Remote Sensing*, vol. 28, No. 4, Jul. 1990, pp. 627–640.

Andrew K. Gabriel, et al. "Crossed Orbit Interferometry: Theory And Experimental Results From SIR–B", *Int. J. Remote Sensing*, vol. 9, No. 5, 1988, pp. 857–872.

Fabio Gatelli, et al. "The Wavenumber Shift In SAR Interferometry", *IEEE Transactions On Geoscience And Remote Sensing*, vol. 32, No. 4, Jul. 1994, pp. 855–865.

Daniel Carrasco et al., "The Developing Of A Wide Area Interferometric Processor", *Fringe 96 Conference*, 8 pages.

A. Ferretti et al., "Multi Baseline Interferometric Techniques And Applications", *Fringe 96 Conference*, 11 pages.

Otmar Loffeld, et al., "Estimating The Derivative Of Modulo–Mapped Phases", *Fringe 96 Conference*, 13 pages.

Mihai Datcu, "The Multiresolution Approach In SAR Interferometry", *Fringe 96 Conference*, 3 pages.

Helene Tarayre–Oriot et al., "New Methods Of Phase Unwrapping In SAR Interferometry", *Fringe 96 Conference*, 5 pages.

Rainer Krämer et al. "Presentation Of An Improved Phase Unwrapping Algorithm Based On Kalman Filters Combined With Local Slope Estimation", *Fringe 96 Conference*, 7 pages.

Mario Costantini, "A Phase Unwrapping Method Based On Network Programming", *Fringe 96 Conference*, 12 pages.

AFT MINUS DOPPLER ← [$A_{IJ}$] → FWD PLUS DOPPLER

A(I,J)

ZERO DOPPLER

P1 = LAYOVER CORRECTION

PLAN VIEW OF PRIOR ART SATELLITE RADARS

ELEVATION VIEW OF PRIOR ART SATELLITE RADARS

PRIOR ART SATELLITE RADAR DATA COLLECTION SYSTEM

FREQUENCY PLOT OF PRIOR ART FM RANGING

PRIOR ART RADAR ILLUMINATION PATTERN

PRIOR ART RADAR ILLUMINATION PATTERN

DOPPLER FREQUENCY RESPONSE
OF PRIOR ART RADAR

DOPPLER FREQUENCY RESPONSE
OF PRIOR ART RADAR

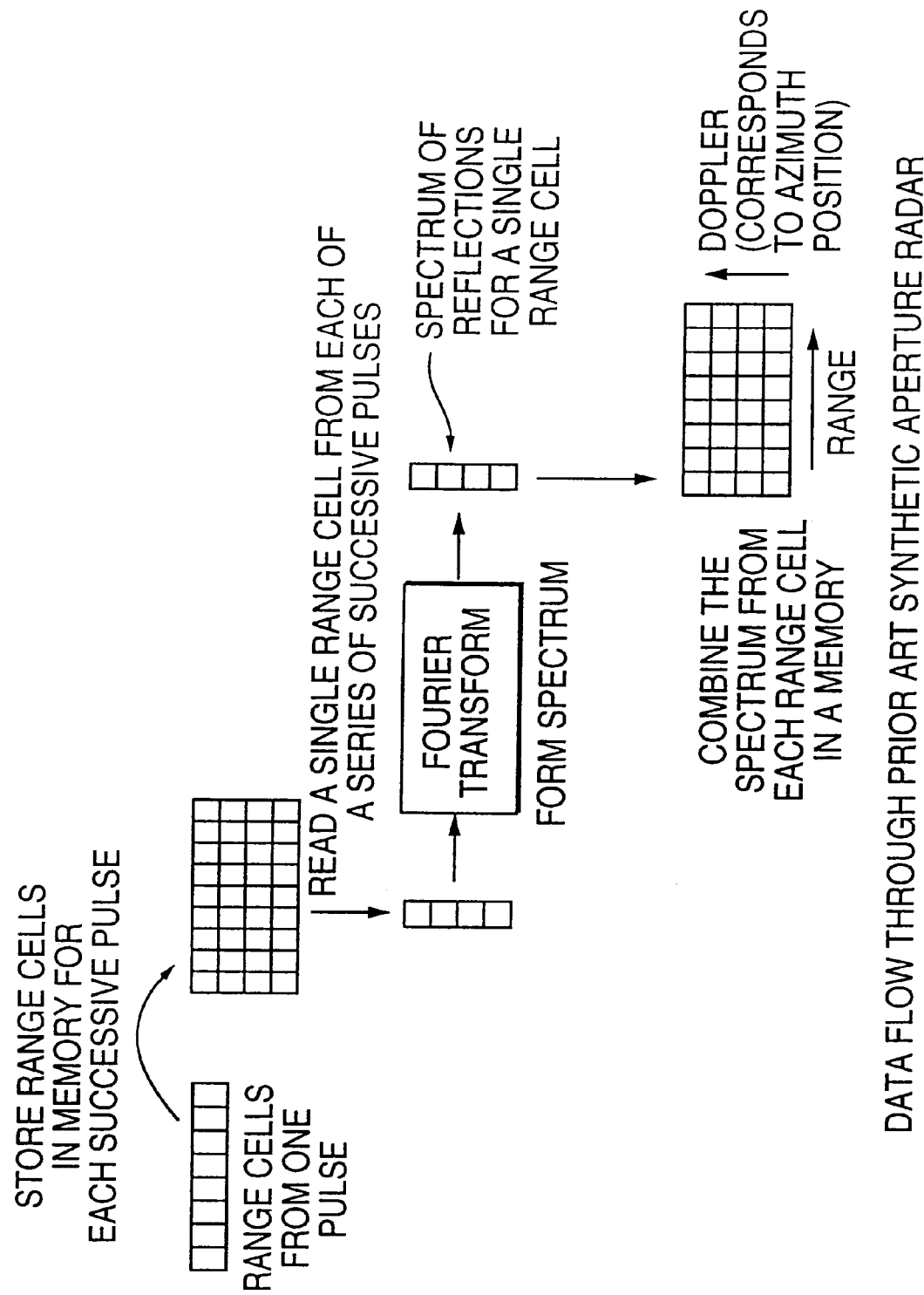

GLOBAL PHASE UNWRAPPING OF INTERFEROGRAMS

The priority benefit of the Jul. 11, 1996 filing date of provisional application number 60/024,202 is hereby claimed.

The present application is related to concurrently filed applications entitled "Terrain Elevation Measurement By Interferometric Synthetic Aperture Radar (IFSAR)" (application Ser. No. 08/890,596) and "Phase Gradient Auto-Focus For SAR Images" (application Ser. No. 08/890,598), the subject matter of which is incorporated herein by reference.

BACKGROUND OF THE INVENTION

1. Field of the Invention

The present invention relates to phase interferograms, and in particular to global methods to unwrap wrapped phases of an interferogram.

2. Description Of Related Art

In the field of interferometric synthetic aperture radar (IFSAR) interferograms are produced. For example, two SAR images are registered pixel by pixel and interferometrically combined to form an interferogram having precise phase differences at each pixel. These interferograms are used to generate interferometric (IF) synthetic aperture radar (SAR) products such as terrain elevations.

A known method to produce an interferogram is to multiply, pixel by pixel, a master image by the complex conjugate of a slave image. Then, on a pixel by pixel basis, recover the wrapped phase angle by calculating the inverse tangent of the ratio of imaginary component divided by the real component.

There are two approaches to phase unwrapping. The first consists of seeking to build paths from pixel to pixel across the interferogram. Phase transitions across a $2\pi$ boundary can be detected and then $2\pi$ may be either added or subtracted to form an unwrapped phase along the selected path.

The other approach is global and is referred to as the least squares method or Green's function method. If the relations governing the unwrapped phase are written as a system of difference equations, the equations will have the same form as the finite element equations associated with the solution to Poisson's partial differential equation in two dimensions with Neumann boundary conditions. Known computational methods are very time consuming and still do not obtain accurate results in "bad spots" (e.g., when the present invention is used in IFSAR, a bad spot might be a large body of water where the flatness of the water in the master image is different than the flatness in the slave image).

Synthetic aperture radar (hereinafter SAR) is a coherent, microwave imaging system with day, night and all-weather capability. SAR data acquisition is based on exploitation of Doppler signatures. The along track motion of a radar platform combined with a relatively large antenna beamwidth results in the recording of a large number of radar returns from each scatterer on the ground as it passes through the antenna aperture or pattern, thus forming a "synthetic aperture" along the vehicle trajectory with a length determined by the along track separation of the points at which a given target is acquired and then lost. For instance, the synthetic aperture for SEASAT was over 18 kilometers long, comprising over 4,096 individual returns from each individual scatterer. These data are collected by coherent (i.e., in-phase and quadrature-phase) demodulation to preserve their relative phases and then are processed into an image by individually adjusting their phases and adding them coherently in a fashion mathematically similar to that used to focus data from an array antenna. See D. A. Ausherman et al., "Developments In Radar Imaging," IEEE Trans. Aerosp. Electron. Syst., Volume AES-20, No. 4, pp. 363–399, July, 1984, incorporated herein by reference, for a description of SAR processing. The result of this processing is an image whose pixels are complex quantities. The phases of these individual pixels depend on: (1) the particular phase response of the individual scatterer and (2) the range to the scatterer.

A variety of space based radars have been deployed in satellites to generate information for processing as a synthetic aperture radar (e.g., SEASAT, ERS-1, ERS-2 and RADARSAT). The satellite typically orbits about 300 nautical miles above the earth in a polar orbit (i.e., passing over the north and south poles) or near polar orbit while its radar is trained at a fixed angle with respect to its NADIR (i.e., down). As the satellite orbits the earth, the radar's antenna pattern causes an illuminated spot to sweep across the earth's surface in a north-south direction at a rate defined by the satellite's velocity.

FIGS. 35 and 36 depict plan and elevation views of this illumination geometry, respectively. In FIG. 36, the satellite may orbit at, for example 800 kilometers altitude, and train the central axis of the antenna beam at a beam position with respect to NADIR, for example 20.5 degrees (SEASAT). The elevation beamwidth of the antenna pattern is, for example 6.2 degrees, resulting in an illumination area between a minimum range and a maximum range of about 100 kilometers. In FIG. 35, the antenna pattern is trained perpendicular to the velocity of the satellite, thus sweeping out a swath across the earth's surface from the minimum range to the maximum range, for example 100 kilometers. The beamwidth in the azimuth direction of the radar is, for example 1.1 degrees, thus causing the illumination of the earth in the along track direction to be about 18 kilometers (in this example).

FIG. 37 is a simplified diagram of the SEASAT system. The onboard satellite includes a stalo (i.e., stable local oscillator) and a linear FM modulator that provides a swept FM signal to the transmitter and the combiner. The transmitter forms a gated pulse from the linear FM modulator output to be passed through a circulator to the antenna for transmission. The gate radiated pulse is reflected from the earth (e.g., FIGS. 100–102) and received in the antenna where it is passed through the circulator to the receiver. The receiver advantageously alters the gain as a function of time since the transmission pulse in a process known as sensitivity time control. The output of the receiver is passed to the combiner where it is combined with the output of the linear FM modulator, and the combined signal are transmitted through a data link to a ground station. At the ground station the data link is received synchronously, demodulated and passed to a radar data recorder and formatter. In the SEASAT system, the radar data recorder and formatter converts the signals into digital form and records the data on a high-density magnetic tape recorder. Magnetic tapes from this tape recorder are then processed by radar processors in various ways defined by the user.

The linear FM modulation in the SEASAT system is used to produce accurate range data. In FIG. 38, there is depicted the output of the linear FM modulator as a solid line. As depicted in FIG. 38, the frequency of this output signal increases in a sawtooth fashion at a slope defined by (δF)/(δT). The transmitter amplifies the signal and gates it into a transmit pulse as depicted. The transmit pulse is radiated and after a period of time (i.e., ΔT) an echo of the transmit pulse is received as a received pulse. By this time the frequency of the signal from the linear FM modulator has increased whereas the frequency of the received pulse is approximately the same as it was when it was transmitted. Within the ground station, or a subsequent process, it is possible to measure the frequency difference in the linear FM Modulator transmit and receive pulses. Since the rate of change of frequency with respect to time is known, this frequency difference is used to accurately measure the quantity ΔT. From this, it is easy to determine the range of the object causing the reflection. To define a plurality of range cells, the radar processor (not shown) samples the received pulse at a plurality of points during the received pulse. These samples are then Fourier processed to determine the spectrum. The spectrum (i.e., frequencies) of the return pulse defines the various range cells.

FIG. 39 depicts an antenna pattern from a single pulse. The center line the antenna pattern is directed perpendicular to the velocity so that forward of this center line, the return signal will express plus Doppler and aft of this center line, the return signal will express minus Doppler. The range cells are determined as previously described, for example a single range cell depicted as range cell N.

FIG. 40 depicts the antenna pattern from two successive pulses, a first pulse and a second pulse. Within range cell N, there is depicted two points: P1 and P2. P1 is found within the envelope of the antenna pattern from both the first pulse and the second pulse. However, during the first pulse, P1 expresses a plus Doppler since it is forward of the center line of the antenna pattern, and during the second pulse P1 expresses a minus Doppler since it is aft of the center line of the antenna pattern. FIG. 41 depicts the Doppler expressed by a reflection from P1 (i.e., the P1 curve). Marked on this curve is the location of the frequency response expressed from the first pulse (i.e., plus Doppler) and the frequency response expressed from the second pulse (i.e., minus Doppler). Additional pulses transmitted and received by the radar win fin out the entirety of the P1 curve.

In FIG. 40, P2 is depicted as within the antenna pattern of only the second pulse, and having a plus Doppler expressed. In FIG. 42, there is depicted the Doppler curves for both PI and P2. At the point and time of the second pulse, the P1 curve indicates expression of a minus Doppler and the P2 curve indicates an expression of a plus Doppler. It will be appreciated that other points within range cell N (FIG. 40) will fill out a family of Doppler curves in FIG. 42. It is also apparent that the second pulse expresses a different Doppler frequency for point P1 than it does for point P2, and that measuring this difference in frequency, and with a certain amount of additional radar processing, the separation between points P1 and P2 within range cell N can be determined.

FIG. 43 depicts such radar processing. In the upper left hand corner, range cells from each pulse are successively stored in a corner turn memory. A complete radar image may be processed from as many as, for example, four thousand pulses. Next, a data vector is extracted from the corner turn memory representing a single range cell from each of a series of these successive pulses. This vector is Fourier processed to form an output vector representative of the spectrum of reflections from a single range cell. This spectrum represents azimuth position within the antenna pattern of the various scatterers (e.g., points P1 and P2 in FIG. 40). The vector processed from a single range cell is then collected into an output array. The processed vector from all range cells representing a two dimensional image of range by Doppler. The Doppler dimension corresponds to the azimuth position. It will be appreciated by persons skilled in the art that various processing methods are available to correct the output image into rectilinear coordinates and correct for depth of focus. When processing is carried out as complex quantities, phase information is preserved. It is this output array, and in particular the phase information in the complex quantities in this output array, that provides data for many applications such as interferometry with the synthetic aperture radar image data.

SUMMARY OF THE INVENTION

An interferogram is an array of phases, often generated from the inverse tangent of a ratio of an imaginary component divided by a real component. The array is said to be a wrapped phase array when the phase angle is modulo between zero and $2\pi$.

In an important application, interferometry exploits a separate SAR collection of data over the same ground area at a slightly different angle. Then, by forming a difference between the phases of corresponding pixels in the image pair, the random, unknown individual scatterer contribution to the phase is eliminated. The remaining interferogram phase is proportional to the range difference, once it has been unwrapped. The determination of the elevation of a given pixel is mathematically computed using trigonometry. The inherent accuracy of this technique comes from the fact that the baseline B is typically 150 to 800 meters (for ERS-1), and the range difference $\delta\rho$ is computed to about a tenth of a wavelength (0.5 cm for ERS-1).

Synthetic aperture radar (hereinafter SAR) is a coherent, microwave imaging system with day, night and all-weather capability. When two passes of the data are available and have the required relationship between their acquisition geometries, the coherence of the data can be exploited in a number of ways; precise targeting, Digital Terrain Elevation Data (DTED) generation, improvement of the ground range resolution, and coherent change detection. The accuracy of these resulting products can be enhanced significantly by the use of DTED known a priori or derived photogrammetrically to facilitate image registration, elevation distortion removal, map modeling and phase unwrapping. However, the use of rigorous models and precise photogrammetric relations requires a high level of phase integrity in the interferogram generation between corresponding complex pixels in the SAR image pair.

It is an object to the present invention to efficiently and accurately process wrapped interferograms into unwrapped interferograms. It is yet another object to unwrap interferograms so that "bad spots" in the wrapped interferogram do not distort the unwarpped results.

These and other objects are achieved in a method that processes a wrapped phase array into an unwrapped phase array and includes computing a first array from the wrapped phase array, each element of the first array being based on a discrete Poisson difference equation, processing the first array through a two dimensional FFT to form a second array, scaling the second array by a scaling function to form a third array, and processing the third array through an inverse two dimensional FFT to form the unwrapped phase array. The step of computing a first array includes forming a twice unfolded array from the wrapped phase array, computing a row difference array, an element in the row difference array being based on a difference between an element in a particular row in the twice unfolded array and an element in an adjacent row in the twice unfolded array, computing a column difference array, an element in the column difference array being based on a difference between an element in a particular column in the twice unfolded array and an element in an adjacent column in the twice unfolded array, computing a double row difference array, an element in the double row difference array being based on a difference between an element in the particular row in the row difference array and an element in an adjacent row in the row difference array, computing a double column difference array, an element in the double column difference array being based on a difference between an element in the particular column in the column difference array and an element in an adjacent column in the column difference array, and adding the double row difference array to the double column difference array element by element to form the first array.

BRIEF DESCRIPTION OF DRAWINGS

The invention will be described in detail in the following description of preferred embodiments with reference to the following figures wherein:

FIG. 43 is a data flow diagram of a known synthetic aperture radar imaging process.

DETAILED DESCRIPTION OF PREFERRED EMBODIMENTS

Figure 1:
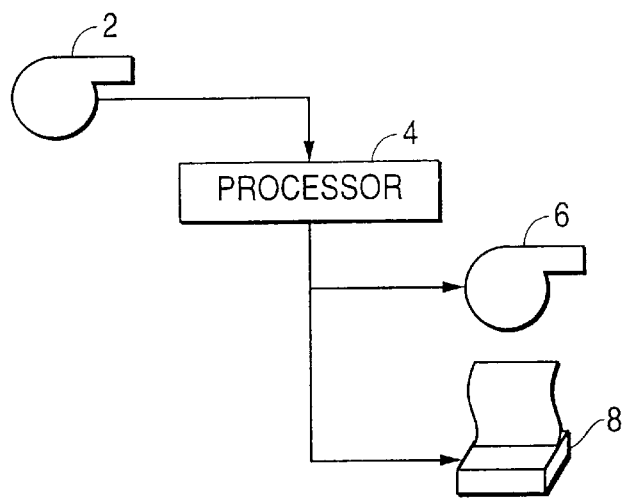
FIG. 1 is a block diagram of principal parts of a processing center in which the invention is practiced.

A satellite provides an excellent platform for a synthetic aperture radar since it is not subject to wind effects. The satellite's orbit is characterized by ephemeris data that is made available with the radar data produced at the ground station. A first set of radar data of a region is collected as the satellite passes the region during a first orbit, and the data collected of that region is matched with the corresponding ephemeris data that describes the satellite's first orbit. A second set of radar data of a region is collected as the satellite passes the region during a second orbit, and the data collected of that region is again matched with the corresponding ephemeris data that describes the satellite's second orbit.

In a simplified exemplary embodiment, the satellite orbits in a polar orbit so that the orbit lies in a mathematical plane that passes through the earth's center of gravity and through the axis around which the earth spins. The orbital period may be, for example 90 minutes, during which time the earth will rotate about 22.5 degrees. At the equator, 22.5 degrees of east-west longitude traverses about 2,500 kilometers of the earth's surface. At more northerly or more southerly latitudes, 22.5 degrees of longitude would traverse shorter distances.

Radar data for a given patch of the earth's surface may be collected during different orbits and over many different days, thus generating a plurality of data sets from which to choose. Since satellite orbits are highly predictable, data from an orbit on one day may be processed in the present invention with data from an orbit on another day. In the present invention, it is desired to choose data collected from two different orbital positions where the two orbit positions are displaced from each other and displaced from the desired patch of ground on the earth's surface by respective first and second distances such that a difference between the first and second orbital positions is, for example, 100 to 1,000 meters, preferably 200 meters, at typical satellite orbit altitudes. This difference between the first and second orbital positions forms the baseline of the herein described interferometer computations.

Radar data is collected about a desired point at the center of a patch that is to become the approximate center of the map image developed from the synthetic aperture radar. For the data collected during the first orbit, a first aperture is defined as the satellite's displacement along the orbit. The first aperture is preferably centered at the orbit's point of closest approach to the patch center, and consequently, the line of sight between the first aperture's center and the patch center is perpendicular to the velocity vector of the satellite at the point of closest approach. The length of the aperture is defined by the resolution desired in the map image so long as the length of the image is not longer than the along track dimension of the radar antenna's beam pattern.

For the data collected during the second orbit, a second aperture is defined as the satellite's displacement along the orbit. The second aperture's center is selected so that a projection on the earth's surface of the line of sight from the second aperture's center to the patch center, coincides with a projection on the earth's surface of the line of sight from the first aperture's center to the patch center.

In the present invention, satellite orbits chosen from the plurality of orbits are selected so that the first aperture's center will be closer to or farther from the patch center than the second aperture's center. This difference (i.e., the interferometer baseline) is calculated from the ephemeris data that corresponds to each orbit.

While satellite polar orbits are described for simplicity, the invention described herein works with inclined orbits as well. There may be a component of the satellite's velocity vector that gives rise to a Doppler shift in gross in the signal returned from the area being mapped. This velocity component is determined from the ephemeris data, and the resulting Doppler shift is removed during subsequent signal processing. Furthermore, the radar is not limited to a space based radar. A high altitude aircraft may carry a suitable radar. The aircraft should carry suitable navigation systems to accurately measure the aircraft's flight path as a substitute for the satellite's ephemeris data.

In this exemplary embodiment, data is acquired from satellite operators on digital data storage tapes or other equivalent storage media. The data includes discrete sampled complex data that has been sampled after the radar's signal return has been coherently demodulated. The discrete data includes real and imaginary terms so as to include radar signal phase data. In FIG. 1, input tapes 2 are processed in processor 4 to generate output tapes 6 containing terrain elevation data of the mapped area. Special printers 8 and displays (not shown) are used to record and display terrain elevation and map image data. Processor 4 is controlled by a plurality of control modules. These modules represent functional entities that can be implemented using subroutines, objects, or other means for implementing a function. These modules embody the several functions discussed herein and may be stored on a computer readable media and used to control computing machines.

Figure 2:
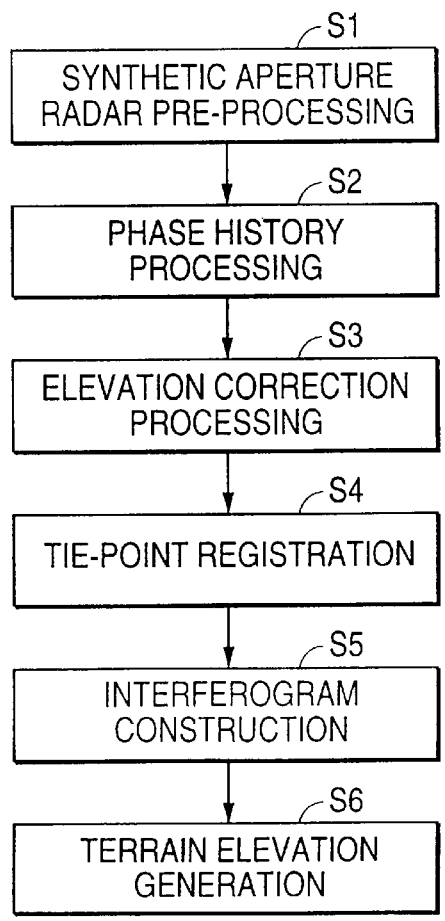
FIG. 2 is a functional block diagram of a first embodiment of the invention.

In FIG. 2, step S1 performs synthetic aperture radar preprocessing to transform raw data from tape 2 into an unfocused map image with pixels of complex values but without phase (i.e., focus) corrections. First, data from the satellite operator is processed to form a plurality of discrete range cells, for example 4,096 range cells, for each pulse return. This is customarily formed by a de-chirp process (e.g., processing the linear FM signal through a "fast time" FFT). The sampled data from each pulse return is processed into the plurality of range cells as if the ranges cells were sampled data from a very narrow pulse radar. The plurality of range cells from each transmit pulse is stored in a corner turn memory.

Figure 3A:
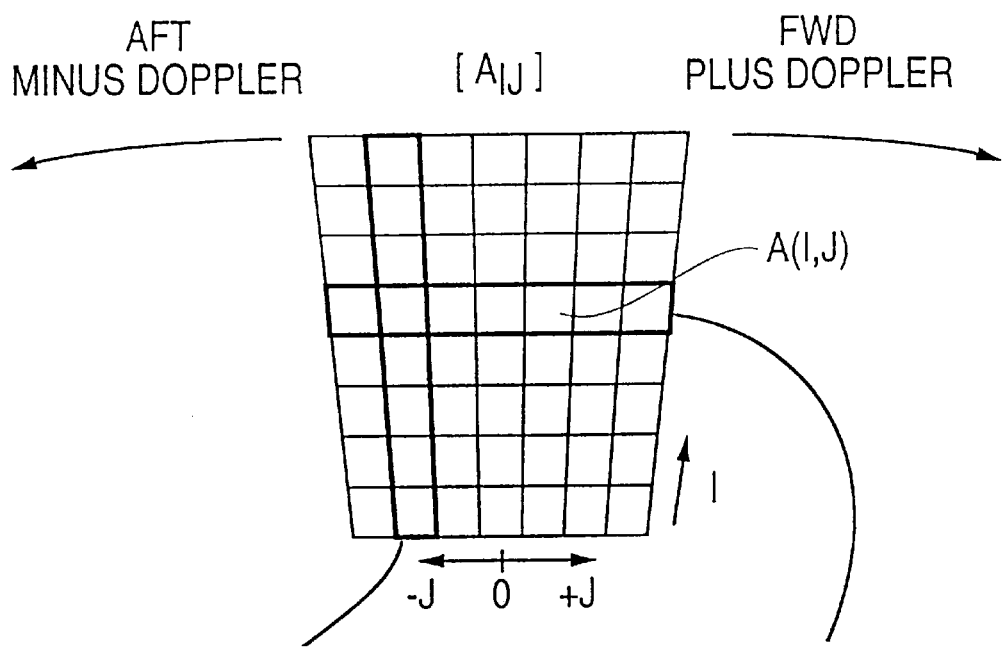
FIGS. 3A–3C are pictorial diagrams of image arrays of pixel data processed in the invention.
Figure 3B:
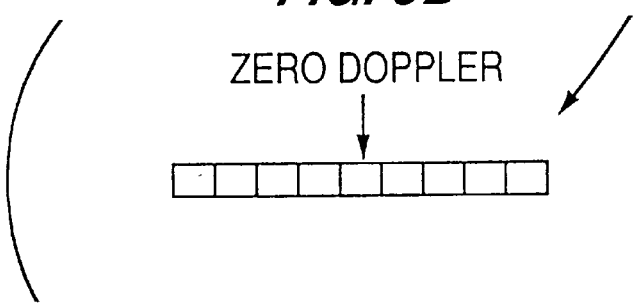

Second, after all of the radar data that was collected during the entire aperture is stored in the corner turn memory (e.g., 4,096 pulse returns by 4,096 range cells), data values from the corner turn memory corresponding to all pulses at the same range cell are extracted from the corner turn memory into a vector. This vector represents the radar reflection from the earth at a particular range corresponding to each pulse. For example, each element of the vector represents the reflected signal energy returned at the particular range for a corresponding pulse of the 4,096 successive pulses. This vector represents the time history of the reflection at the particular range (across the entire along track dimension of the radar's antenna pattern illuminated on the earth) where each pulse (i.e., element of the vector) is separated in time from the preceding pulse by the pulse repetition interval (i.e., "slow time"). By processing this time history through a "slow time" FFT, it is possible to process reflections from the same range cell of all pulses over an aperture time interval into a data vector representing a spectrum of frequencies. Each element of the data vector represents a different frequency of the spectrum of frequencies (e.g., FIG. 3B). Collectively all such data vectors represent a raw map image (FIG. 3A).

With a moving radar platform, reflections from forward of a perpendicular to the velocity vector express a plus Doppler shift and reflections from aft of a perpendicular to the velocity vector express a minus Doppler shift. A single data element in the vector output of the FFT is characterized by a frequency of the spectrum of frequencies produced by the FFT, and a value of this data element in the FFT output vector is a measure of the reflection from scatterers displaced forward or aft of a perpendicular to the radar's velocity vector by an angle defined the frequency of this element. In this way, azimuth separation of the collected radar data is achieved to a resolution defined by length of the aperture used to collect the data.

In FIG. 1, processor 4 performs the processing steps shown in FIG. 2. In FIG. 2, step S1 includes forming the initial synthetic aperture radar map image array (FIG. 3A). Step S2 includes phase history processing using a phase gradient auto-focus algorithm. In contrast to known art, the present phase gradient auto-focus technique corrects the imagery array for phase errors by statistically extracting the correction information from the imagery array itself in order to compute a correction based on a hyperbolic Doppler function. In step S3, two or more focused map images are processed to correct layover effects caused by uneven elevations in the plane in which each image was focussed. In step S4, tie-points are identified in two layover corrected image arrays, and the image arrays are registered, one to another, based on the tie-points. In step S5, an interferogram is constructed between two tie-point registered map image arrays wherein phase data is extracted from the interferogram and unwrapped. In contrast to known art, the phase unwrapping technique performs global phase unwrapping using a computationally efficient two dimensional FFT (i.e., fast Fourier transform). In step S6, terrain elevation data is generated from the unwrapped phase data.

In a preferred embodiment, the invention includes computing an elevation array by processing a first image array to generate an elevation corrected first image array, processing a second image array to generate an elevation corrected second image array, generating a phase interferogram from the elevation corrected first and second image arrays, and processing the phase interferogram to generate the computed elevation array. The layover correction is based on either (1) a predetermined elevation array, (2) an elevation array computed by radargrammetry, (3) an initial computed elevation array developed in an initial iteration by initial interferometry of uncorrected images followed by the layover correction in a subsequent iteration based on the initial computed elevation array, or (4) a combination of the above.

Step S2 (FIG. 2) is a construction of a "phase pure" phase history processor which preserves the inherent phase information in the signal data from the two SAR collections. Significant work has been done on this problem. The present approach is based on a SAR processor which processes strip map SAR data using a fast convolution method, and on higher order than quadratic auto-focusing. The first key to "phase purity" is to apply exactly the same processing parameters to both images. For instance, the same center Doppler frequency corrections are applied to both images, even if they are not optimal for one of them from the standpoint of image quality. Use of a different center Doppler frequency is equivalent to a different azimuth viewing angle for the two images, reducing coherence between them. All matched filters and windows have to be the same as well. A special problem is the auto-focus, since the known, quadratic auto-focus technique used in the past for Earth resources SAR data like ERS-1 is not suitable. Viewed on a wavelength (centimeter) scale, the quadratic approximation, which is often implemented using the map drift method, does not work well for interferometry. The present approach uses the true hyperbolic range history function in an essential way in a constrained, least squares fit to the phase error signal. This auto-focus has proven very successful in generating SAR images from airborne P-band (e.g., 400–900 MHz) SAR data, obtaining in most cases image quality comparable to L-band (e.g., 1–2 GHz) images and/or C-band (4–6 GHz) images of the same terrain. Validation of this algorithm against the precise focusing requirements imposed by IFSAR processing was one of the major goals of this research.

Figure 3C:

Raw map image data $[A_U]$ is prepared in step S1 (FIG. 2). A constant range vector (FIG. 3B) may be extracted from the raw array data. Similarly, an iso-Doppler vector (FIG. 3C) may be extracted from the raw map data. While each element of an iso-Doppler vector represents a constant Doppler frequency, each element does not represent a constant cross-range displacement from the map center. Accordingly, the map array data (FIG. 3A) does not appear as a rectilinear map. In fact, it approximates a keystone shape.

A rectilinear map is generated from the raw map array data in an auto-focus process. Phase history processing (S2 of FIG. 2 and FIG. 4) performs this auto-focus task.

Figure 4:
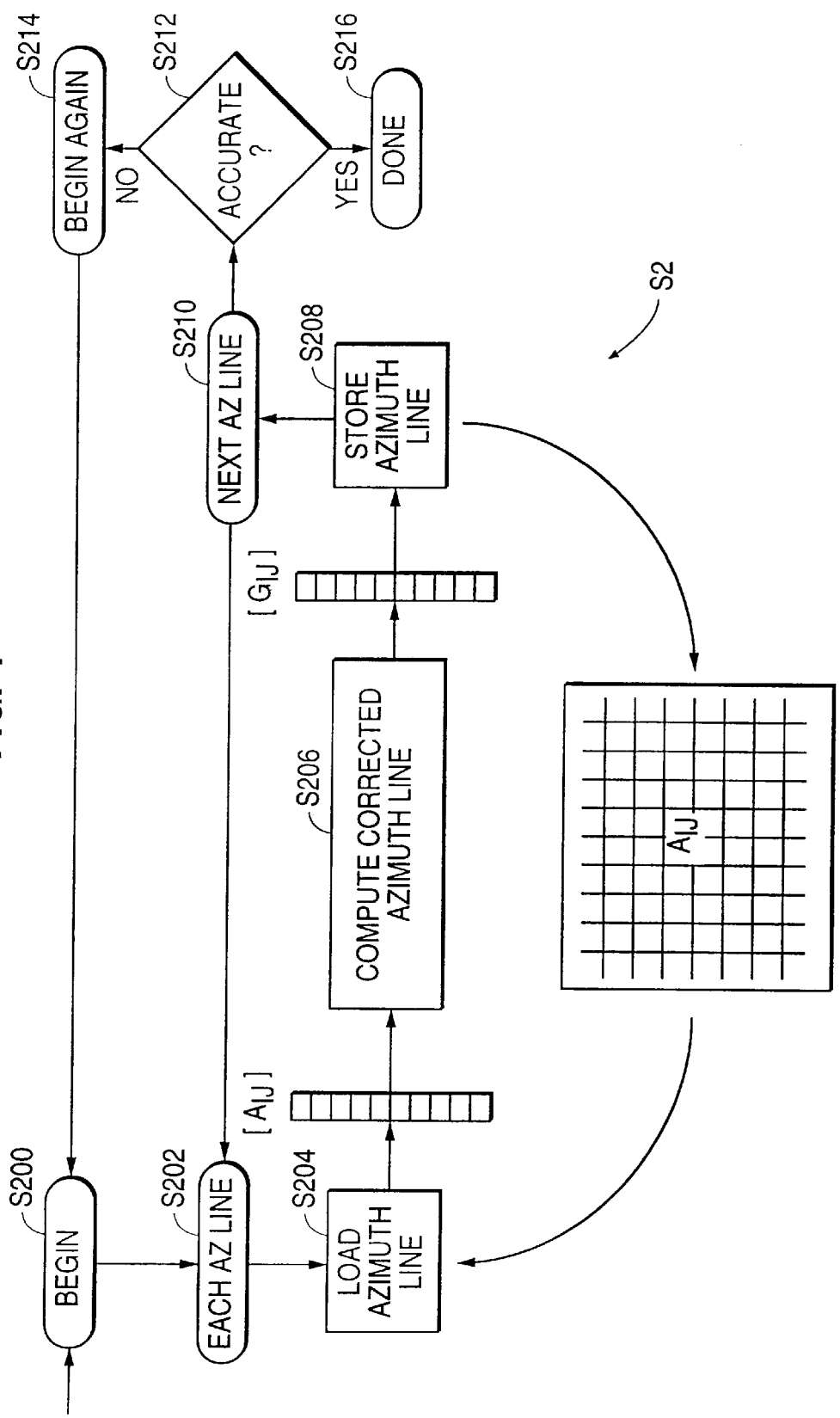
FIG. 4 is a functional block diagram of the phase gradient auto-focus process of the invention.

In FIG. 4, each azimuth line is processed in sequence in a path that generally includes steps S202, S204, S206, S208 and S210. At step S204, an uncorrected azimuth line vector $[A_U]$ is extracted from the map array data. In step S206, the uncorrected azimuth line vector is corrected to form a corrected azimuth line vector $[G_U]$. In step S208, the corrected azimuth line vector is stored back in the map array data. Then, in steps S210 and S202, the correction process is repeated for each uncorrected azimuth line vector until all azimuth line vectors have been corrected.

When all azimuth line vectors have been corrected, a determination is made as to whether the residual error is less than one-third of a pixel at step S212. If the residual error is greater than one-sixth of a pixel, correction of the entire array is begun again at steps S214 and S200. This iterative process continues until the entire map data array has been sufficiently corrected.

The amount of residual phase error is calculated analytically in step S212 as a function of the phase slope in the phase gradient algorithm fast Fourier transform in accordance with equation 8. This amount of residual phase error is determined from the phase correction result applied in the frequency domain (e.g., correction function vector $[D_{UK}]$ generated in step S238 of FIG. 6). The net effect of the correction function improves phase slope error and reduces blur.

The process is iterative. Each phase correction applied in the frequency domain results in a de-blurred spot. The process is iteratively applied until analytically the blur experienced is reduced. When further de-blurring is not possible, the process stops. Typically this process converges. Generally, it is also spatially stationary with respect to the complex image line. That is to say de-blurring (phase noise removal) works universally with respect to the entire line.

Figure 5:
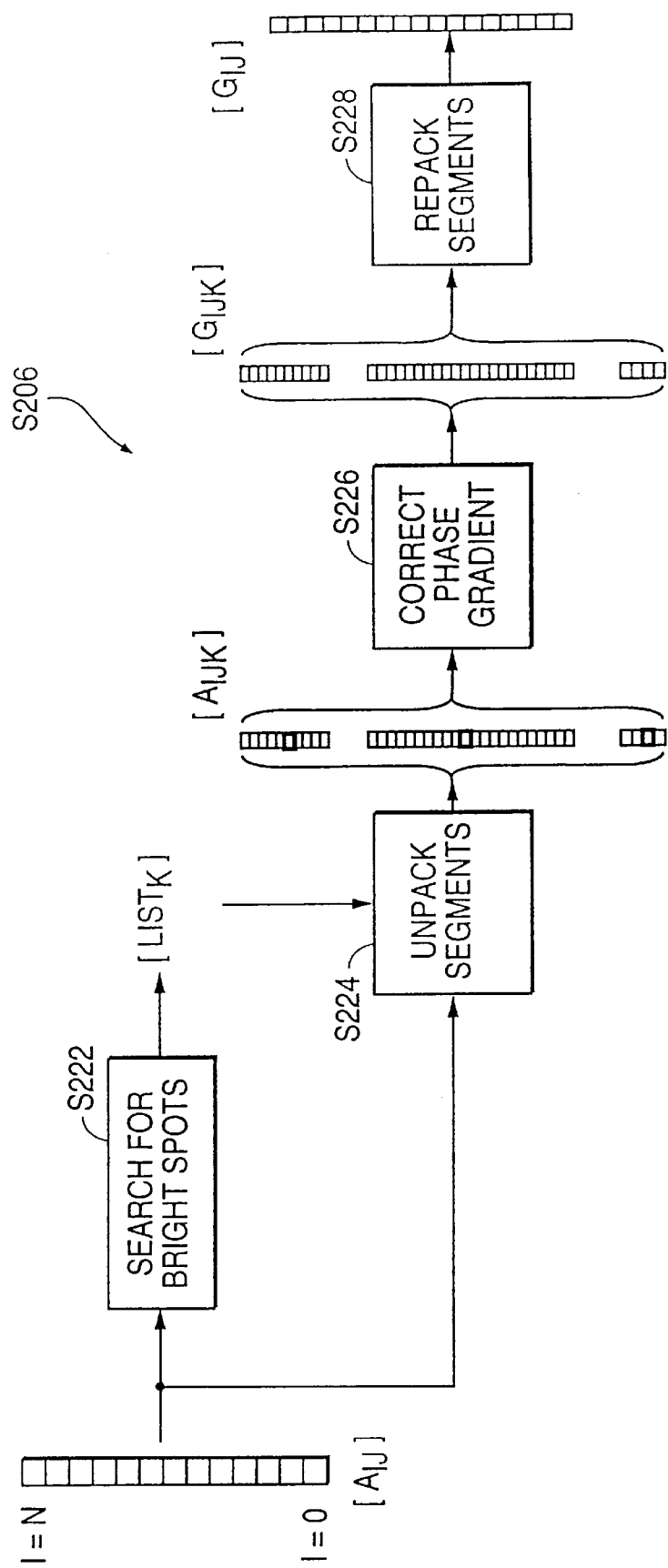
FIG. 5 is a functional block diagram of the azimuth line correction process of the invention.

In FIG. 5, correction step S206 is described in greater detail. Uncorrected azimuth line vector $[A_U]$ is processed in step S222 to identify at least one bright spot. Preferably, 100 or so bright spots are identified. A bright spot may advantageously be defined as a pixel having an amplitude 10 dB greater than the average amplitude in its immediate vicinity (e.g., within 8 pixels). For example, a running average of a particular pixel plus or minus 8 pixels may be computed. If the amplitude of any pixel is more than 10 dB greater than this average, then a bright spot is identified and included in $[LIST_K]$. It will be appreciated that step S222 is similar to a constant false alarm rate (CFAR) procedure commonly used in radar maps. Alternatively, the average in the vicinity of any pixel may average in portions of adjacent azimuth line vectors as well as adjacent pixels in the current azimuth line vector that is being processed.

Step S224 "unpacks" uncorrected azimuth line vector $[A_U]$ into uncorrected segments $[A_{UK}]$. FIG. 5 depicts three such segments, but there may be dozens. Each segment is preferably centered about a bright spot from $[LIST_K]$. However, the distribution of bright spots in vector $[A_U]$ may not be uniform. Furthermore, since the neighborhood around a bright spot which contains blur is typically less than 100 pixels, at least 200 complex imagery pixels are culled for segments $[A_{UK}]$ and centered about the bright spot. Other bright spots may be present in segment $[A_{UK}]$. However, adaptive windowing is used in step S226 to minimize any affects from asymmetric uncorrected line segments and subordinate bright spots within a segment.

In step S226, uncorrected segments $[A_{UK}]$ are corrected to produce corrected segments $[G_{UK}]$. In step S228, corrected segments $[G_{UK}]$ are "repacked" into corrected azimuth line vector $[G_U]$.

Segment correction performed in step S226 is further described with reference to FIG. 6. Uncorrected segment $[A_{UK}]$ is "filled" and "filtered" in step S232 to provide filtered and filled vector $[B_{UK}]$. The bright spot corresponding to the segment is regarded as the center of the uncorrected segment [$A_{UK}$]. Filtering performed in step S232 applies an adaptive window to suppress nearby target noise and the effects of asymmetry in the uncorrected segment. For example, a windowing vector in the form of a rect function (i.e., unity within a range of vector elements and zero otherwise) may be used to weight the uncorrected segment [$A_{UK}$]. Other windowing functions may be used as well. The filtered and filled vector is filled with zeros on either side of the segment that contains data so as to maintain symmetry about the bright spot and to provide a convenient vector length for subsequent Fourier transform processing (e.g., a power of two). A typical amplitude of the filtered and filled vector is depicted at 200. The filtered and filled vector is transformed, preferably in a fast Fourier transform (FFT), in step S234 into an uncorrected spectrum vector [$C_{UK}$]. The uncorrected spectrum vector characterizes the frequency spectrum of the filtered and filled vector (as if it were a time representation). The frequency spectrum of the uncorrected spectrum vector is depicted at 202. Note the slope of the amplitudes of the frequency spectrum. This slope is determined by statistically estimating the slope based on the uncorrected spectrum vector [$C_{UK}$].

For example, the $n^{th}$ ideal azimuth line (i.e., a cross-range line of constant range defined by index n) of a complex synthetic aperture radar image may be modeled as a time domain convolution of two time functions:

$$g_n(t) = f_n(t) * h(t), \quad (1)$$

where:

$f_n(t)$ = The ideal unblurred image line (at the resolution limit), and $h(t)$ = The point spread function (PSF) due to phase error (independent of n).

The corresponding pre-focus line expressed in the frequency domain is the FFT of $g_n$, given by:

$$G_n(f) = \sum_k A_k e^{j2\pi[\phi_n(f) + \phi_\varepsilon(f)]} \quad (2)$$

where:

frequency f is the Doppler frequency corresponding to a cross-range position of an element k from the image, $A_k$ = the target related complex amplitude (all in the nth bin), $\phi_n(f)$ = the target related Doppler phase corresponding to each target's offset in space from a central constant azimuth line defined by t=0 position, and $\phi_e(f)$ = the phase error (usually assumed quadratic in f, but not in this case).

The two functions convolved in time domain equation (1) are multiplied in frequency domain equation (2). Since equation (2) is based on an exponential function, the multiplied functions in equation (2) become an exponential function with added phase angles in the exponent. This forms the basis for separating the two convolved functions in equation (1). The point spread function due to phase errors in the time domain can therefore be written as an inverse FFT of a frequency domain counterpart:

$$h(t) = FFT^{-1}\{e^{j 2\pi\phi_\varepsilon(f)}\}, \text{ and} \quad (3)$$

the ideal image is computed from the inverse FFT of a frequency domain counterpart as follows:

$$f_n(t) = \sum_k A_k \cdot FFT^{-1}\{e^{j2\pi\phi_n(f)}\}. \quad (4)$$

The present phase gradient algorithm functions by analyzing point targets and statistically determining the phase error function $\phi_\epsilon(f)$. Random phase errors are eliminated by averaging to determine $\phi_\epsilon(f) = \int \phi_{dot}(f)df$ By statisticly determining the phase error function at several points, the true hyperbolic Doppler relationship of phase error versus frequency is approximated. The hyperbolic relationship, as modeled in the present invention, includes quadradic and higher order terms. In contrast, known systems usually assume the phase error to be adaquately modeled by just the quadratic term, so that:

$$\phi_\epsilon(f) = (\tfrac{1}{2})\phi_{dot}f^2, \quad (5)$$

where the error phase gradient $\phi_{dot}$ is due to Doppler mismatch in the azimuth matched filter caused by uncompensated position or velocity error. $\phi_{dot}$ is assumed to be constant within the segment being analyzed.

Thus, the focus problem becomes estimating $\phi_{dot}(f)$ from the complex image by analyzing bright points (actually the segments about the bright points).

Using the above analysis, the spectrum of a single bright point is given by:

$$G(f) = A_k(f) \bullet e^{j2\pi[t_o f + \phi_\epsilon(f)]} = A \bullet X(f) \quad (6)$$

where $t_o$ defines the azimuth position (i.e., the t=0 position), and A(f) is the complex amplitude of the spectrum (i.e., in the frequency domain but related to $A_k$ above in the time domain). The derivative of G(f) from equation (6) with equation (5) substituted therein is:

$$G'(f) = A' \bullet X(f) + j2\pi[t_0 + \phi_{dot}(f)] \bullet G(f), \quad (7)$$

so that a complex conjugate of G(f) from equation (6) multiplied by G'(f) from equation (7) defines:

$$G(f)^* \bullet G'(f) = A'A|X(f)|^2 + j|G(f)|^2 \bullet 2\pi(t_0 + \phi_{dot}(f)). \quad (8)$$

Finally, assuming that $t_0$ is referenced to zero, which can be accomplished by moving the bright point to the time origin before making the calculations (i.e., the FFT), the phase gradient as a function of frequency is solved to be:

$$\phi_{dot}(f) = \text{Im}\{G(f) \bullet G'(f)\}/(2\pi|G(f)|^2). \quad (9)$$

The expression on the right side of equation (9) is computed from uncorrected spectrum vector [$C_{UK}$] (FIG. 6) of the complex image data to determine a measured phase gradient $\phi_{dot}(f)$ at each value f (i.e., pixel in the image). An estimate of a constant phase gradient $\phi_{dot\_}{}^{avg}$ is statistically extracted using least squares procedures from the measured phase gradient $\phi_{dot}(f)$ in step S236 (FIG. 6).

The value of $\phi_{dot}(f)$ is computed for each value f in the uncorrected spectrum vector [$C_{ijk}$]. The least squares process computes the average phase slope (i.e., phase gradient) $\phi_{dot\_}{}^{avg}$ by first simply summing the measured phase gradient values $\phi_{dot}(f)$ evaluated at each frequency (i.e., cross-range position in the uncorrected spectrum vector) and then dividing the sum by the number of measurements in the sum.

The average phase slope is inverted (i.e., plus slope becomes minus slope), and a correction function vector $[D_{UK}]$ is generated in step S238. The spectrum of the correction function vector is depicted at 204.

At step S240 the uncorrected spectrum vector is multiplied, element by element, by the correction function vector to produce a corrected spectrum vector $[E_{UK}]$. As may be best understood when complex values are regarded in phasor form, multiplication of two complex values adds the two corresponding phase angles. The spectrum of the corrected spectrum vector is depicted at 206. The spectrum of the corrected spectrum vector is flat (or at least flatter) with respect to changes in frequencies due to the above described correction.

The corrected spectrum vector is transformed in step S242, preferably through an inverse fast Fourier transform into corrected full vector $[F_{UK}]$. In a time representation, the corrected full vector is depicted at 208. The time representation at 208, when compared with the time representation at 200, should be more symmetrical about zero time due to the correction made in the frequency domain. In step S244, corrected segment $[G_{UK}]$ is culled from corrected full vector $[F_{UK}]$ in such a way as to be suitable for replacement of uncorrected segments $[A_{UK}]$.

Most users require maps that are rectilinear. Such coordinates makes alignment and interferometric exploitation of radar maps possible. For high resolution maps, it is conventional to use a phase correction that is quadratic in frequency. However, for interferometric exploitation of radar maps, it is preferred to correct for the exact hyperbolic shape of the iso-Doppler contours. This is achieved by correcting the phase based on the measured data taken from local segments of a cross-range line.

Doppler iso-contours define a conic surface about the radar platform's velocity vector (e.g., about the satellite's velocity vector) at which all reflections will have equal Doppler shift. As the radar platform traverses the aperture at high altitude but substantially parallel to the earth's surface, this conic surface intersects the earth's surface in a hyperbola, also called iso-Doppler lines. All reflections from the earth's surface along an iso-Doppler line express the same Doppler shift. To a first approximation, these iso-Doppler lines equally spaced when the patch of interest is perpendicular to velocity vector; however, for high resolution radar maps, it is preferred that a quadratic correction be applied to obtain a better approximation to equally spaced pixels in azimuth. However, for alignment and the interferometric exploitation, it is preferred to correct the azimuth spacing of pixels to compensate for the true azimuth separation of the iso-Doppler lines (i.e., based on a true hyperbola representation).

Figure 6:
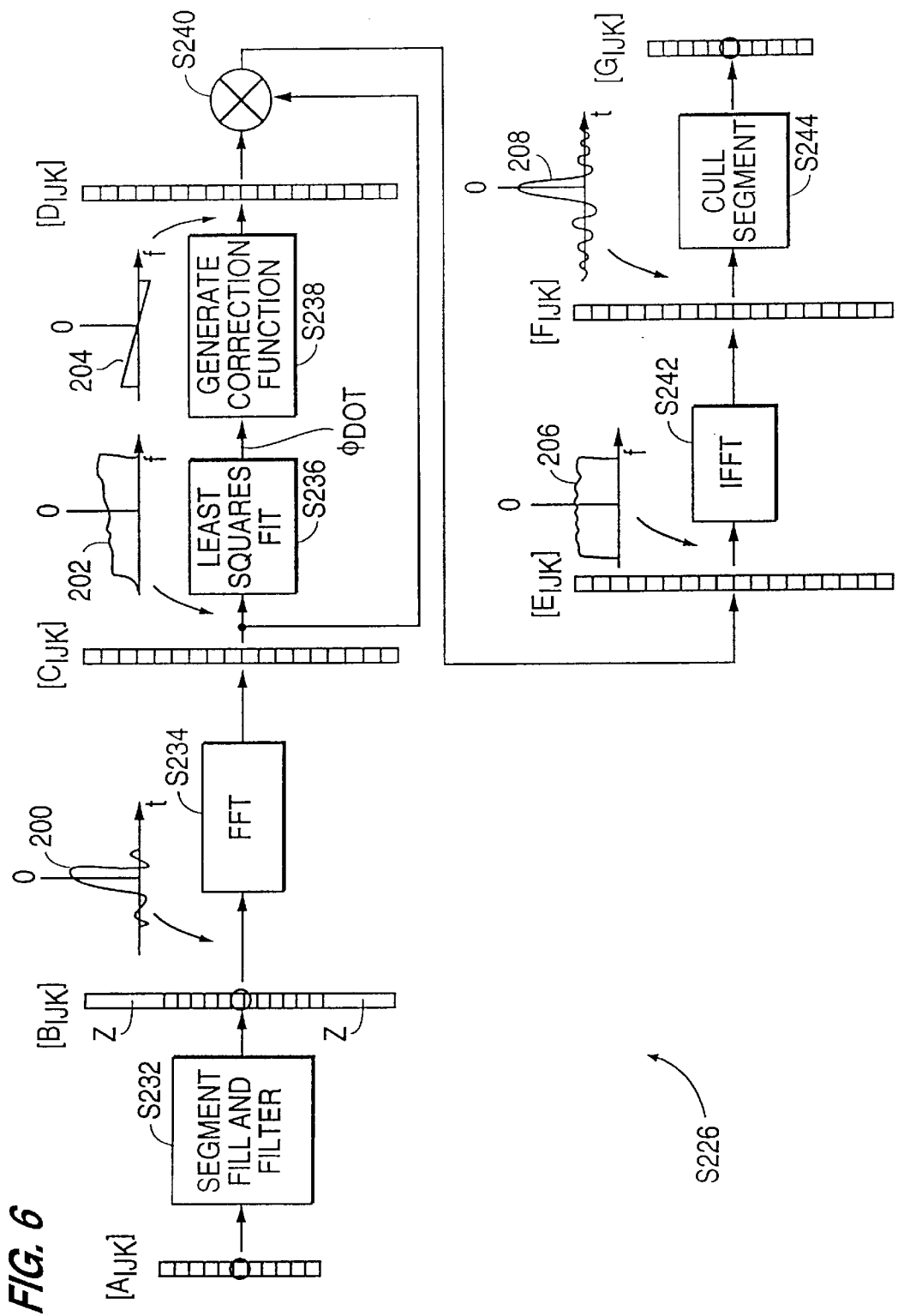
FIG. 6 is a functional block diagram of the phase gradient correction process of the invention.

The phase gradient auto-focus process discussed with respect to FIGS. 4–6 generates a focussed image represented by a two dimensional array of complex values. The focusing process is achieved with respect to a plane surface. Real world terrain is generally not planar. Radar reflections from terrain points that are higher (or lower) than the focus plane will effect a pixel in the array so that it appears displaced from the pixel representing the true location of the terrain point. This phenomenon is often referred to as the layover effect. The present invention removes this elevation distortion.

For a satellite radar viewing the earth's surface at a slant angle (e.g., 45 degrees), a high elevation, such as a peak of a very high mountain, will truly be closer to the satellite than a point within the base of the mountain at the same latitude and longitude as the peak. The reflections from the mountain peak will be placed by the raw radar map process S1 of FIG. 2 and the auto-focus process S2 of FIG. 2 in a pixel closer to the satellite than is accurate based on the latitude and longitude location of the peak. Thus, it is necessary to correct these layover effects.

Out of plane (i.e., out of the focal plane) elevation differences cause reflections to appear displaced in range due to the reflection point being closer to or farther from the radar. Also, out of plane elevation differences cause reflections to be displaced in Doppler (i.e., cross-range) due to the elevated or depressed reflection point being closer or farther from the radar and thereby having an angular rate (referenced to the radar's velocity vector) that is greater or less than the angular rate of a point in the focal plane that corresponds to the same latitude and longitude as the true reflection point.

The layover correction process (step S3 of FIG. 2) corrects the effects of layover when the elevation of the terrain is known. FIGS. 7–10 illustrate several ways that the correction is obtained. For purposes of FIGS. 7–10, postulate a layover correction process P1 that corrects image layover effects based on a same size array of elevation data. For purposes of FIGS. 8–10, postulate a radargrammetry process P2 that stereoscopically compares two radar images to determine the elevation of the terrain. The terrain elevation solution is purely geometric using intersections of range spheres and Doppler cones. This requires that the two radar images compared by radargrammetry process the same side view of the same terrain but from largely separated aspect angles that converge at a ground point at an angle preferably from 20 to 50 degrees. Such an angle should not be used for interferometric elevation determination because of specular reflections and a lack of coherence which occurs.

The additional image in combination with either of the interferometric images can be used by the radargrammetry processes to develop independent information about the elevation of the ground and calculate an estimate of the elevation over the ground scene. This estimate is at least an order of magnitude worse than is achievable with interferometric SAR techniques; however, it is sufficient to be used to correct layover effects. Details of processes P1 and P2 are described following the description of FIGS. 7–10.

The accuracy of the radargrammetry solution is limited by the determined position of the radar sensor. The ground point is determined geometrically using equations to project from the radar sensor to the ground. Geometric dilution of precision (GDOP) limits accuracies to a one sigma vertical error greater than 50 meters.

Figure 7:
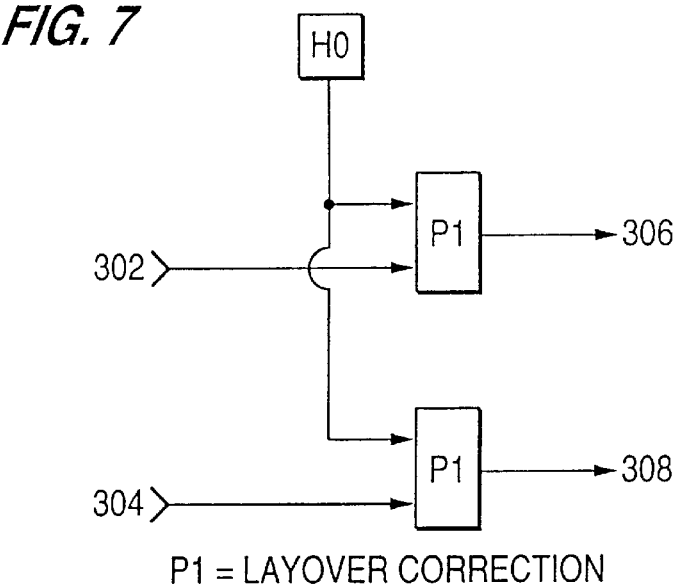
FIGS. 7–10 are functional block diagrams of elevation correction processes of the invention.

In FIG. 7, first and second focussed images 302 and 304 (as focused in process S2 of FIG. 2) are corrected for image layover effects in separate processes P1 based on predetermined terrain elevation data H0 to generate first elevation corrected image data 306 and second elevation corrected data 308. Two distinct images are corrected for layover effects to provide the input into the tie-point registration and interferogram processes S4 and S5 (FIG. 2). The two images are collected at radar stations separated by only a small displacement (e.g., 100 to 300 meters for a satellite radar in a 300 nautical mile orbit) to minimize uncorrelated noise from aspect dependent glint as described with respect to the interferogram process. With respect to a point on the ground, the two radar stations are preferably separated by an angular extent that varies between 0.007 and 0.07 degrees. Larger angular separations are equivalent with decreasing interferometric accuracy. As discussed with herein with regard to layover correction process P1, the grid increments of elevation data H0 need not be the same as the pixel increments of the images 302 and 304.

Figure 8:
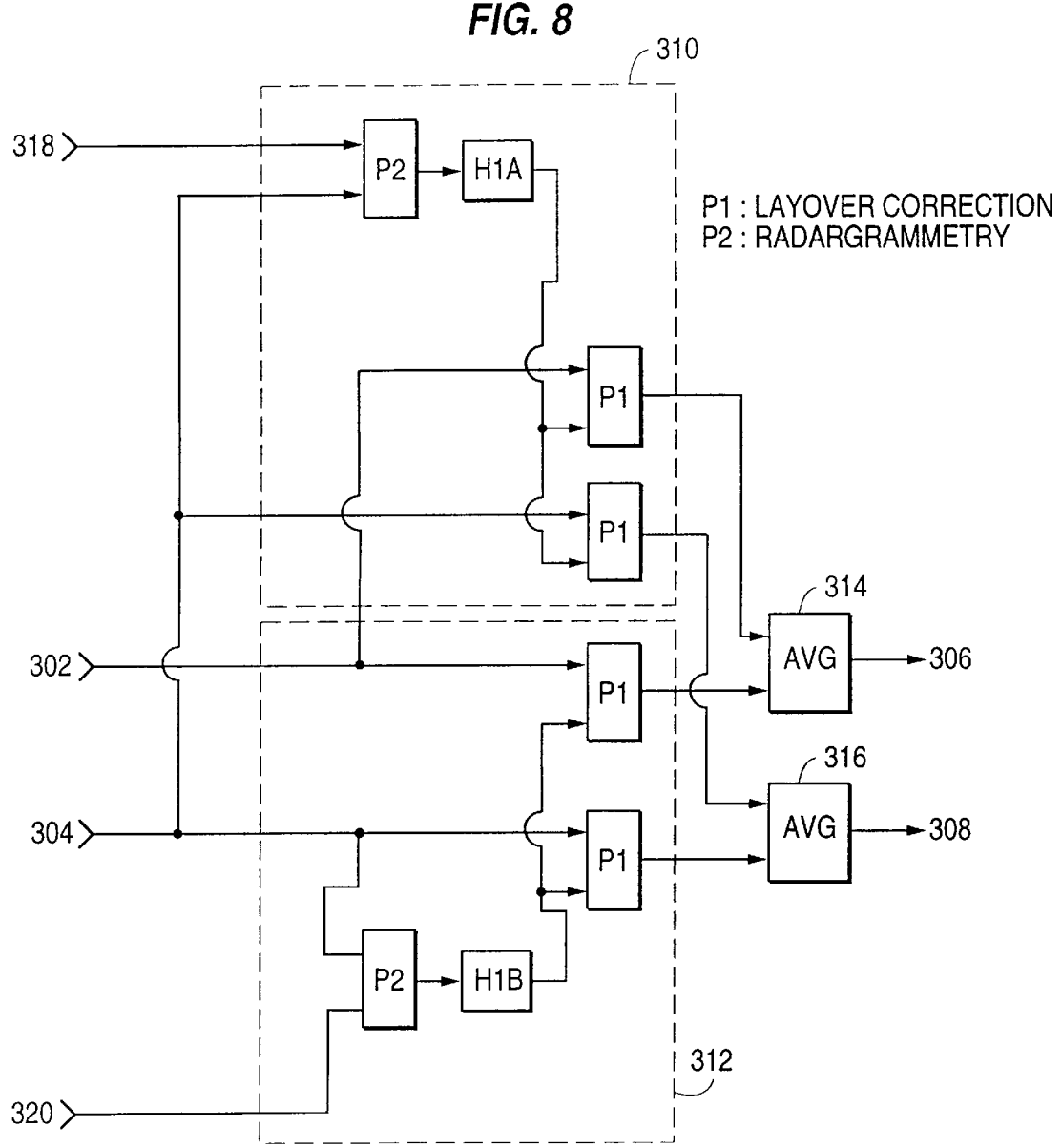

In FIG. 8, two layover correction processes 310 and 312 (of the same two images) are averaged in averagers 314, 316. The averaging process is merely a pixel by pixel arithmetic mean of the complex values contained in corresponding pixels. Layover correction process 310 is similar to the process depicted in FIG. 7, except that the predetermined elevation data is replaced by radargrammetry derived elevation data H1A. The radargrammetry process P2 computes the elevation data based on a stereoscopic combination of the focussed second image 304 and an angularly displaced first image 318. Similarly, layover correction process 312 is similar to the process depicted in FIG. 7, except that the predetermined elevation data is replaced by radargrammetry derived elevation data H1B. Here too, the radargrammetry process P2 computes the elevation data based on a stereoscopic combination of the focussed second image 304 and an angularly displaced second image 320. Both processes 310 and 312 determine an estimate of a layover corrected image based on its independently determined elevation data, and these estimates are averaged in averagers 314 and 316. Processes such as 310 or 312 may be repeated many times and then averaged to determine the layover corrected images to increasing accuracy. The noise in this process increases by the square root of the number of images that are averaged while the signal (i.e., information) in the process increases by the number of independent images (310 or 312) that are averaged.

As discussed herein with regard to layover correction process P1, the grid increments of elevation data H1A and H1B need not be the same as the pixel increments of images 302, 304, 318 and 320. The grid increments of elevation data H1A need not be the same as the grid increments of elevation data H1B. The vertical accuracy of elevation data H1A need not be the same as the vertical accuracy of elevation data H1B. When the vertical accuracy of elevation data H1A is not the same as the vertical accuracy of elevation data H1B, the averagers 314 and 316 use a weighted average to avoid giving undue weight to images corrected for layover effects using elevation data with less desirable vertical accuracies. Similarly, the elevation data averager depicted in FIG. 9 uses a weighted average when the vertical accuracy of elevation data H1A is not the same as the vertical accuracy of elevation data H1B.

Figure 9:
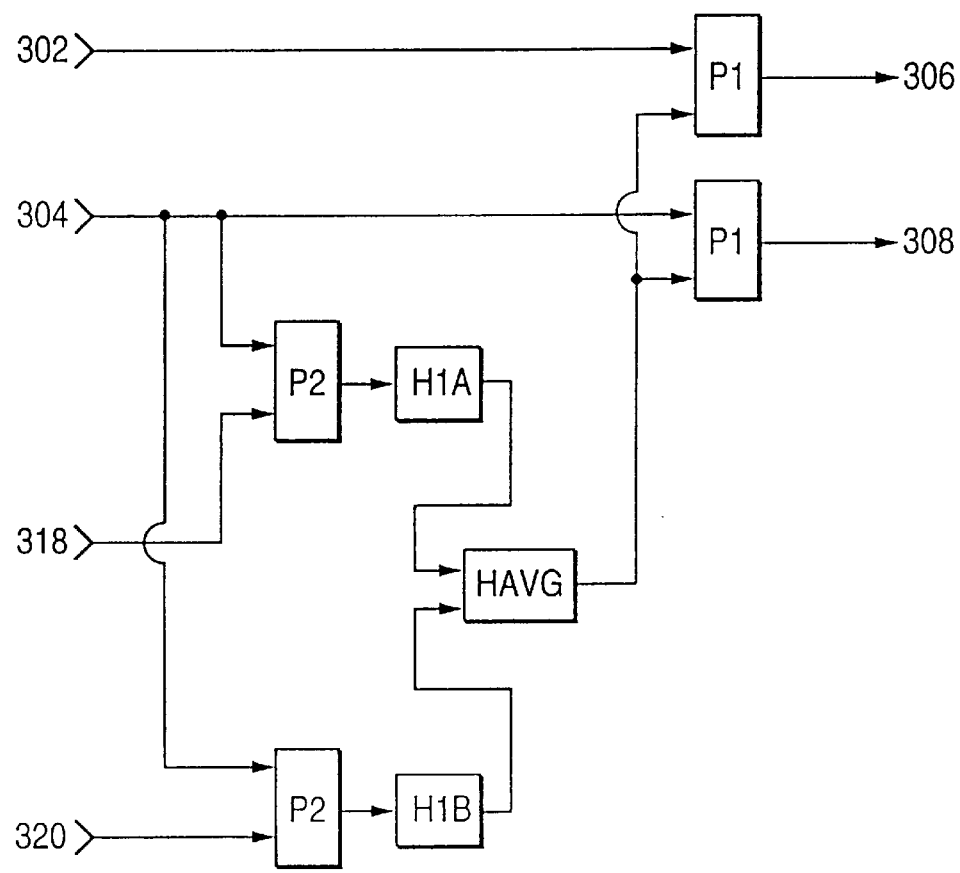

In FIG. 9, a single layover correction process of two images is processed based on an average elevation data array HAVG based on the averaging of two independently determined elevation data arrays H1A and H1B. Each of elevation data arrays H1A and H1B is determined by radargrammetry in the same way that the same data arrays are determined in the embodiment described with respect to FIG. 8.

Figure 10:
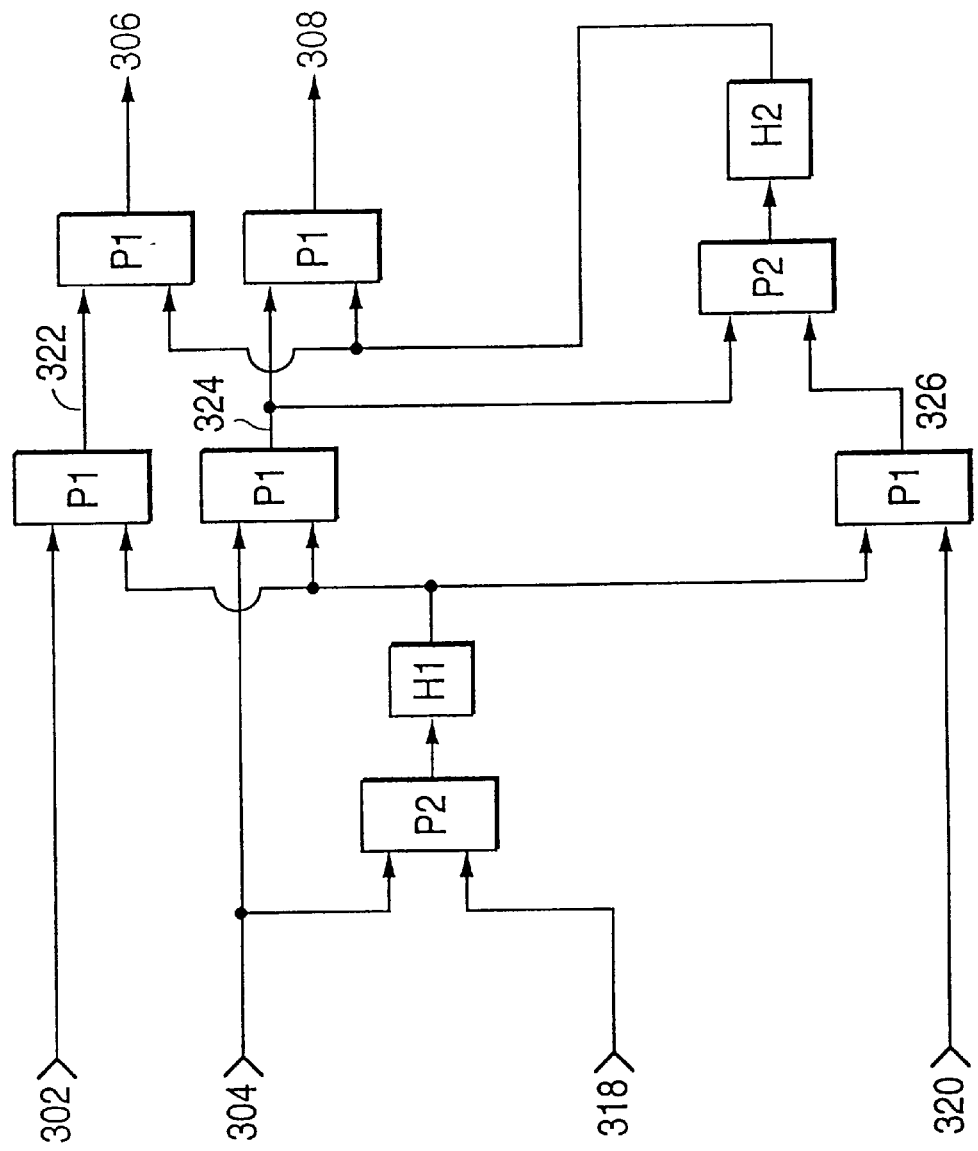

In FIG. 10, a series process is depicted for layover correction step S3 (of FIG. 2). In contrast, FIGS. 8 and 9 depict parallel layover correction where the additional image used for radargrammetry is applied in a parallel arrangement since the process averages data arrays. In the series process, the focussed first and second images 302 and 304 are first corrected for layover effects to determine first and second intermediate images 322 and 324 based on elevation data H1 determined by radargrammetry from displaced first image 318 and focused second image 318. At the same time displaced second image 320 is first corrected for layover effects to determine third intermediate image 326 based on elevation data H1. Then, first and second intermediate images 322 and 324 are second corrected for layover effects to determine first and second corrected images 306 and 308 based on elevation data H2 determined by radargrammetry from displaced second and third images 324 and 326. Additional serial steps of layover correction may be added to process additional displaced images; however, each displaced image should be itself layover corrected at each serial step based on the elevation data that is being used for layover correction in the serial step.

FIGS. 7–10 depict various parallel and serial processes to correct for layover effects based on predetermined and/or radargrammetry determined elevation data. Elevation data may also be determined by photogrammetry or otherwise, but would be considered other independently predetermined elevation data. The above described processes may be advantageously combined in any serial or parallel arrangement as may be designed to best correct layover effects in the particular terrain being mapped or based on the radar platform (aircraft or satellite) generating the data. Elevation variations vary depending on the location on the earth's surface.

Figure 11:
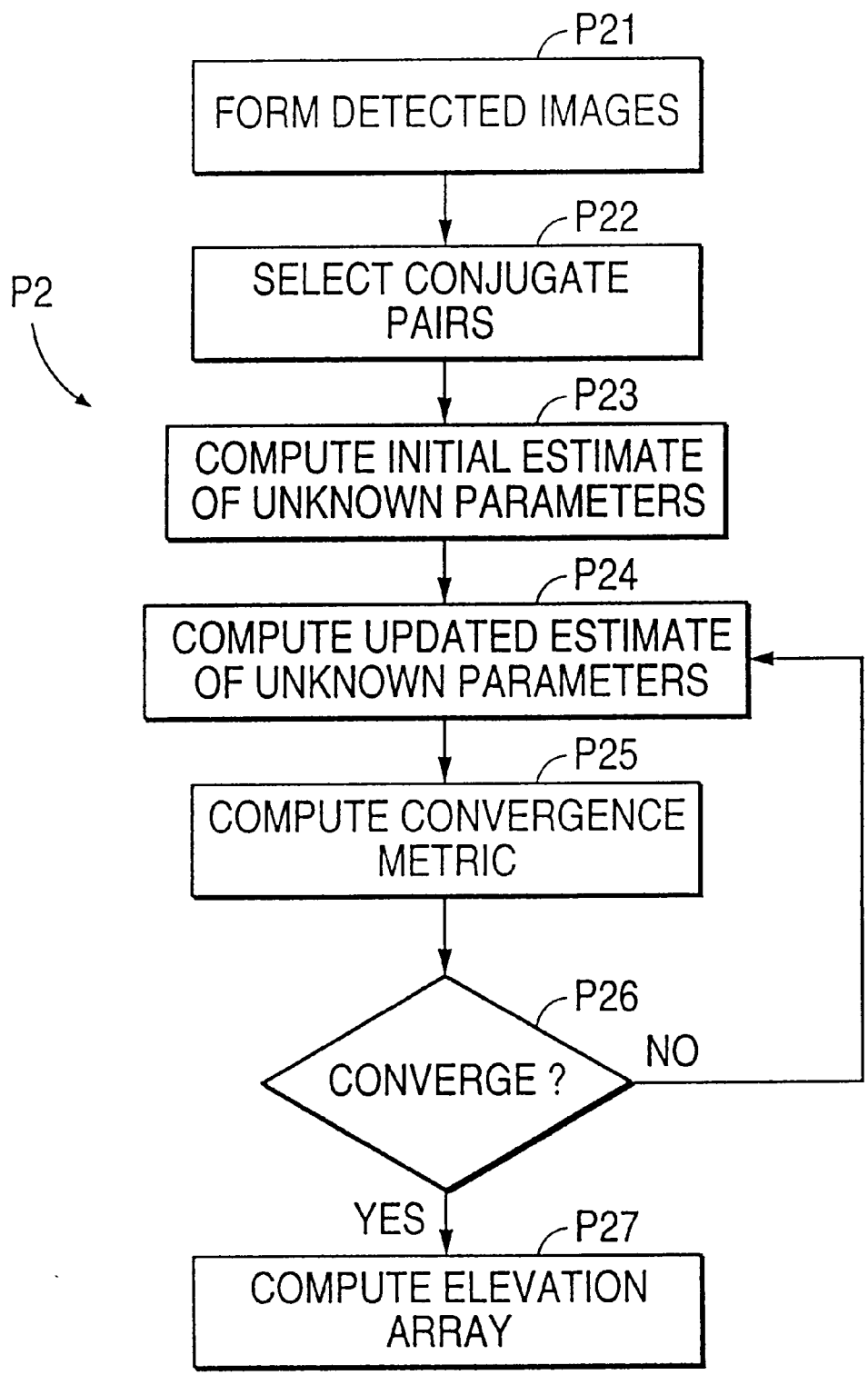
FIG. 11 is a functional block diagram of a radargrammetry process of the invention.

In FIG. 11, the radargrammetry process P2 (of, for example, process 310 of FIG. 8) is depicted where each input 304, 318 (FIG. 8) is detected in step P21 to generate intensity images. The input images 304, 318 are two dimensional arrays of complex values, each complex value having an in-phase component I and a quadrature component Q. The detected output for each image is a two dimensional intensity image array of real values, each real value being the magnitude of the corresponding complex values as represented by I, Q values.

The radargrammetry process P2 identifies several points, for example 10 to 20 points, common to both images 304, 318. For each point in each image, the process determines the pixel R value (image range) and θ value (image cross-range) that correspond to the point. Then using a least squares adjustment process the elevations of all pixels in the images are determined as described in the following discussion. The first step in a least squares adjustment process is developing a model underlying the problem.

Figure 13:
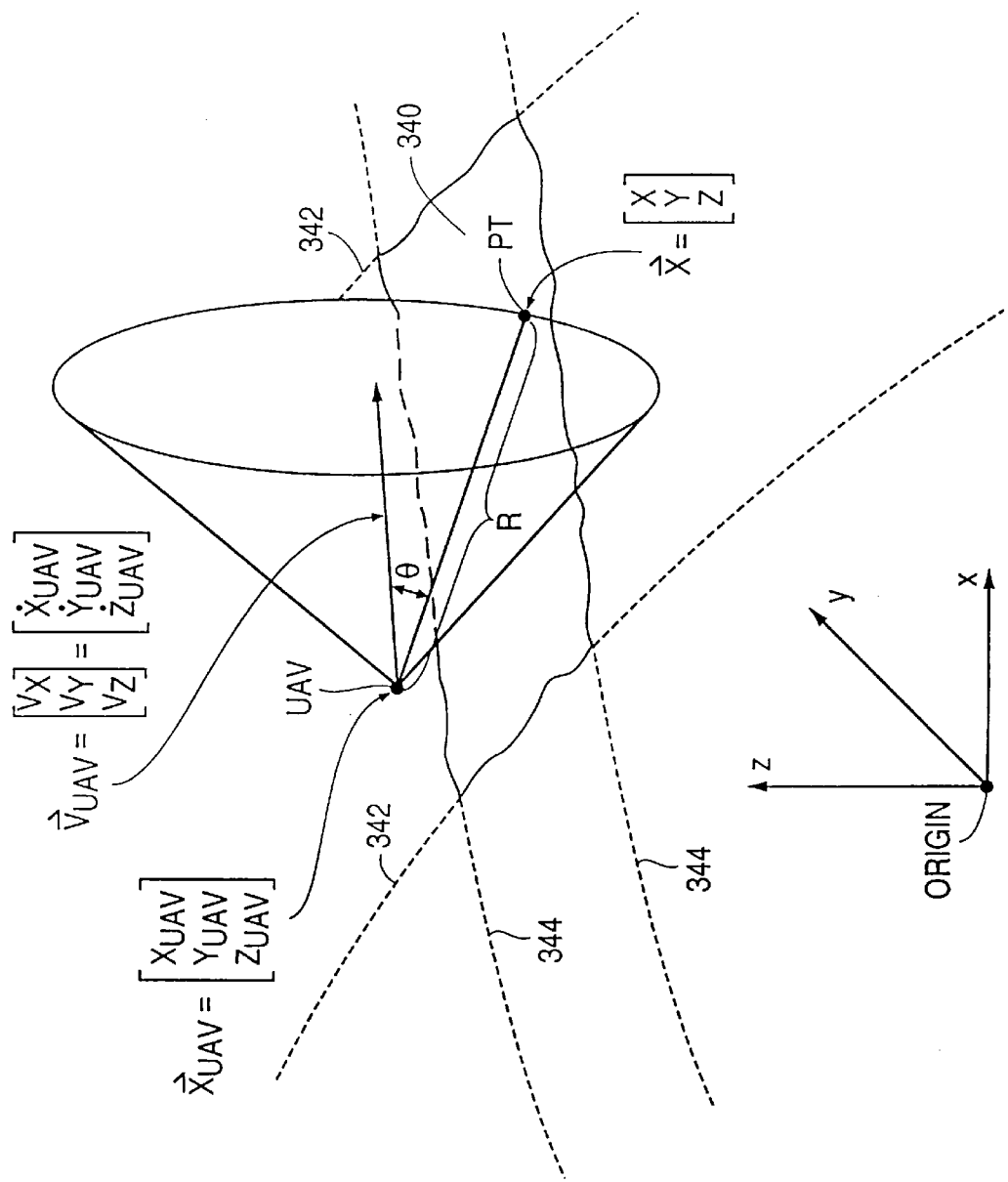
FIG. 13 is a pictorial diagram of the geometry of the imaging radar used in the invention.

FIG. 13 depicts an unmanned airborne vehicle UAV (may be satellite or aircraft) carrying the radar and moving over surface region 340 of the earth defined between latitude lines 342 and longitude lines 344. For compatibility with common satellite orbit models, the coordinate system is preferably geodetic (i.e., earth centered), in three coordinates X, Y, Z. For compatibility with aircraft flight models, the coordinate set is preferably based on a flat local plane tangent to the earth at a point in the center of the imaged region. In either coordinate set, point PT of interest on the earth's surface is defined by vector X, the location of the UAV is defined by vector $X_{UAV}$, and the velocity of the UAV is defined by vector $V_{UAV}$ as follows.

$$X = \begin{bmatrix} X \\ Y \\ Z \end{bmatrix} = \text{unknown ground point coordinates} \quad (10)$$

$$X_{UAV} = \begin{bmatrix} X_{UAV} \\ Y_{UAV} \\ Z_{UAV} \end{bmatrix} = \text{radar platform coordinates, and} \quad (11)$$

$$V_{UAV} = \begin{bmatrix} X_X \\ Y_Y \\ Z_Z \end{bmatrix} = \begin{bmatrix} \dot{X}_{UAV} \\ \dot{Y}_{UAV} \\ \dot{Z}_{UAV} \end{bmatrix} = \text{platform velocity vector.} \quad (12)$$

The line-of-sight range vector R from the UAV (i.e., the radar) to point PT is merely the vector difference between X and $X_{UAV}$ as follows.

$$R = X - X_{UAV} = \begin{bmatrix} X - X_{UAV} \\ Y - Y_{UAV} \\ Z - Z_{UAV} \end{bmatrix} = \begin{bmatrix} dX \\ dY \\ dZ \end{bmatrix} \quad (13)$$

The length R of range vector R and the magnitude V of the velocity vector V are:

$$R = \sqrt{dX^2 + dY^2 + dZ^2} \quad (14)$$

$$V = \sqrt{V_x^2 + V_y^2 + V_z^2} \quad (15)$$

A Doppler shift is experienced by radar signals from the radar on moving platform UAV when reflected from stationary ground point PT. The amount of the Doppler shift depends on a cone angle defined about the velocity vector of the moving platform. Stationary point PT is disposed on the surface of one such cone characterized by a cone angle of θ. See FIG. 13. A vector dot product between the range vector R and the velocity vector V is scaled by the cosine of θ. Thus, the cone angle θ is computed by the inverse cosine function of the vector dot product as follows.

$$\theta = [\cos^{-1}(R \cdot V)]/RV = \quad (16)$$

$$\cos^{-1}\left[\frac{(dX)\dot{X}_{UAV} + (dY)\dot{Y}_{UAV} + (dZ)\dot{Z}_{UAV}}{RV}\right]$$

Typically, the measured position of the UAV comes from an onboard satellite navigation receiver (e.g., the Global Positioning System, GPS) and the velocity comes from an onboard inertial navigation system (INS). Often, the INS is stabilized with the GPS receiver.

Measurement techniques used to retrieve data at the time that point PT was acquired are subject to systematic errors called biases. These biases include biases in the range, cone angle, the UAV position and the time relative to a reference time. Different radar images used in the processes of this invention may be acquired during different orbits of a satellite or on different days. The position bias is actually a result of several biases:
1. the bias in the position measurement equipment (GPS receiver);
2. the correction due to the drift rate bias as a function of time;
3. the correction due to any acceleration biases as a function of time (the acceleration itself is assumed to be equal to zero); and
4. the correction due to time bias as a function of velocity.
The corrections due to time bias combined with drift rate bias, and the corrections due to time bias combined with acceleration bias are considered trivial and are ignored. The positional bias of the UAV position $X_{UAVbias}$ is then the sum of several bias sources as follows:

$$X_{UAV_{bias}} = X_{GPS_{bias}} + V_{bias}t_0 + \frac{1}{2}\ddot{X}_{UAV_{bias}}t_0^2 + V_0 t_{bias} \quad (17)$$

In step P22 of FIG. 11, 10 to 20 conjugate pairs of pixels are selected, manually, automatically or semi-automatically. To select a conjugate pair manually, the two detected images are displayed, side by side. An operator looks for identical features (e.g., a road intersection) in the imaged regions. A pixel in each image that is recognized to represent the same point on the ground is selected to form a conjugate pair. This process may be performed automatically using a correlation process to correlate portions of one image with portions of the other. This process may be performed semi-automatically by first manually identifying identical features in the two images and then using a cued correlation process to select the pixel from each image that forms the conjugate pair. The identification of a point (i.e., a pixel) in an image simultaneously identifies an R and a θ (e.g., equations 13 and 15) associated with a measurement of the point in the image. If 10 conjugate points are identified in the two images, then 20 R, θ pairs are determined, 10 R, θ pairs in each image.

In an embodiment of the automatic selection of conjugate points for use in step P22 of FIG. 11, the master and slave images are first coarsely correlated and then selected points are correlated more exactly. For example, an offset needed to align a slave 100 kilometer by 100 kilometer ERS-1 image with a master ERS-1 image is first determined from satellite navigation data. Then, each of the master and slave images is parsed into a plurality of sub-images (e.g., 16 sub-images arranged in four rows of 4 sub-images each). One of the sub-images, preferably one of the central four sub-images, from each of the master and slave images are intensity correlated to determine a refined offset value. Alternatively, more than one sub-image may be intensity correlated and the refined offset values averaged. Alternatively, a small portion of a sub-image of the master and slave images may be intensity correlated to be more computational efficient so long as the initial alignment from satellite navigation data is sufficiently accurate the ensure that the small portions of the sub-images from master and slave images corresponds to the same portion of the earth's surface. The intensity correlation process is described in more detail with regard to step S410 depicted in FIG. 22 including step S416 depicted in FIG. 24.

Using the refined offset values determined by intensity correlation, the slave image is translated based on the refined offset values. Then, chips are selected for spectral correlation. A chip is a small portion or sub-array selected from one of the sub-images. In this example, there are 16 sub-images; therefore, there are 16 chips selected from each of the master and slave images. The size of the chip depends on the accuracy of the intensity correlation process; however, a 64 pixel by 64 pixel chip is generally adequate to ensure that a chip from the master image significantly overlaps a corresponding chip from the slave image when the slave image has been aligned with the master image using the refined offset values determined by intensity correlation. Each selected chip contains pixels having complex values (i.e., before detection).

Figure 22:
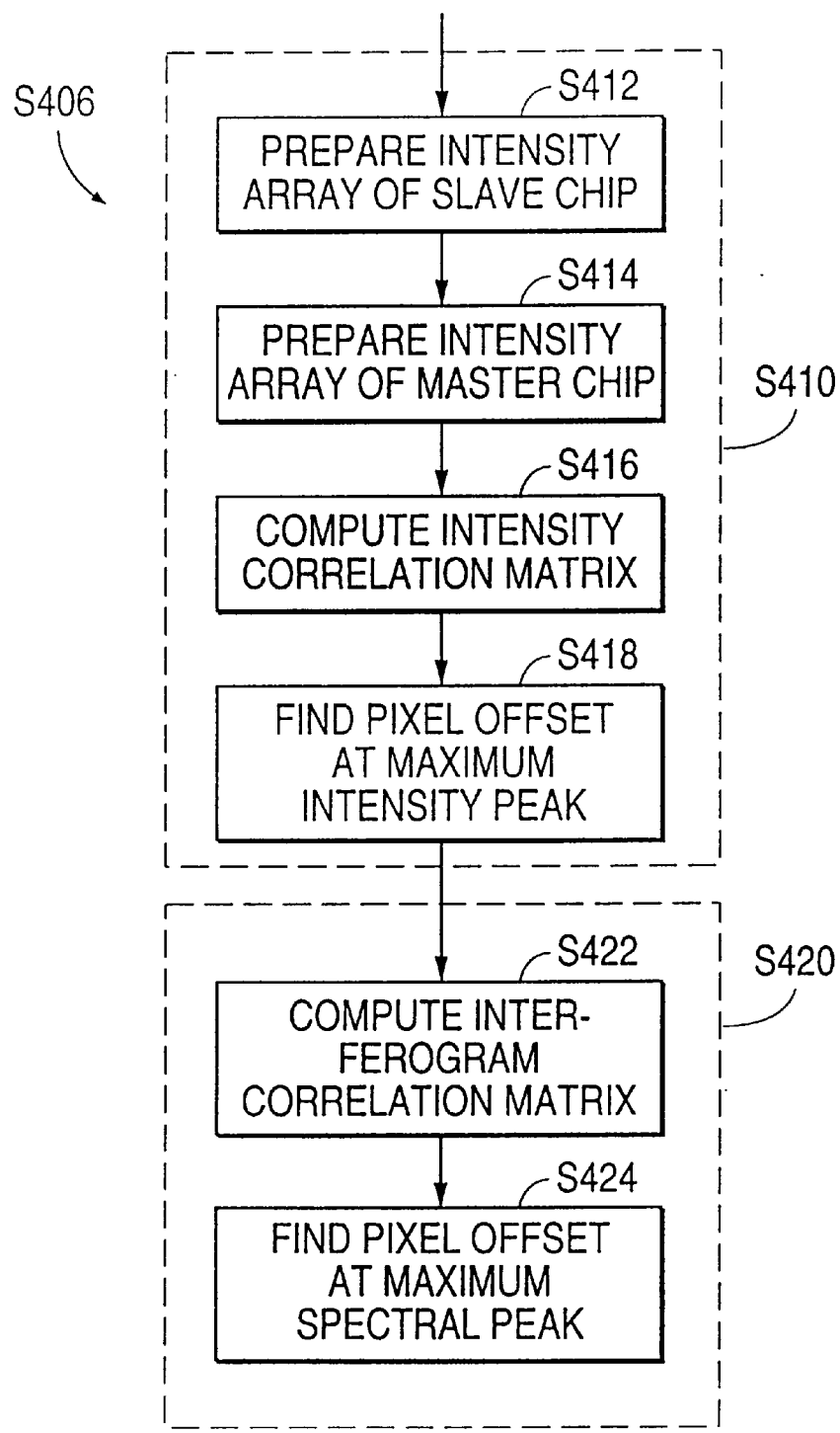
FIG. 22 is a functional block diagram of a process of the invention to determine registration offsets of tie-points.
Figure 25:
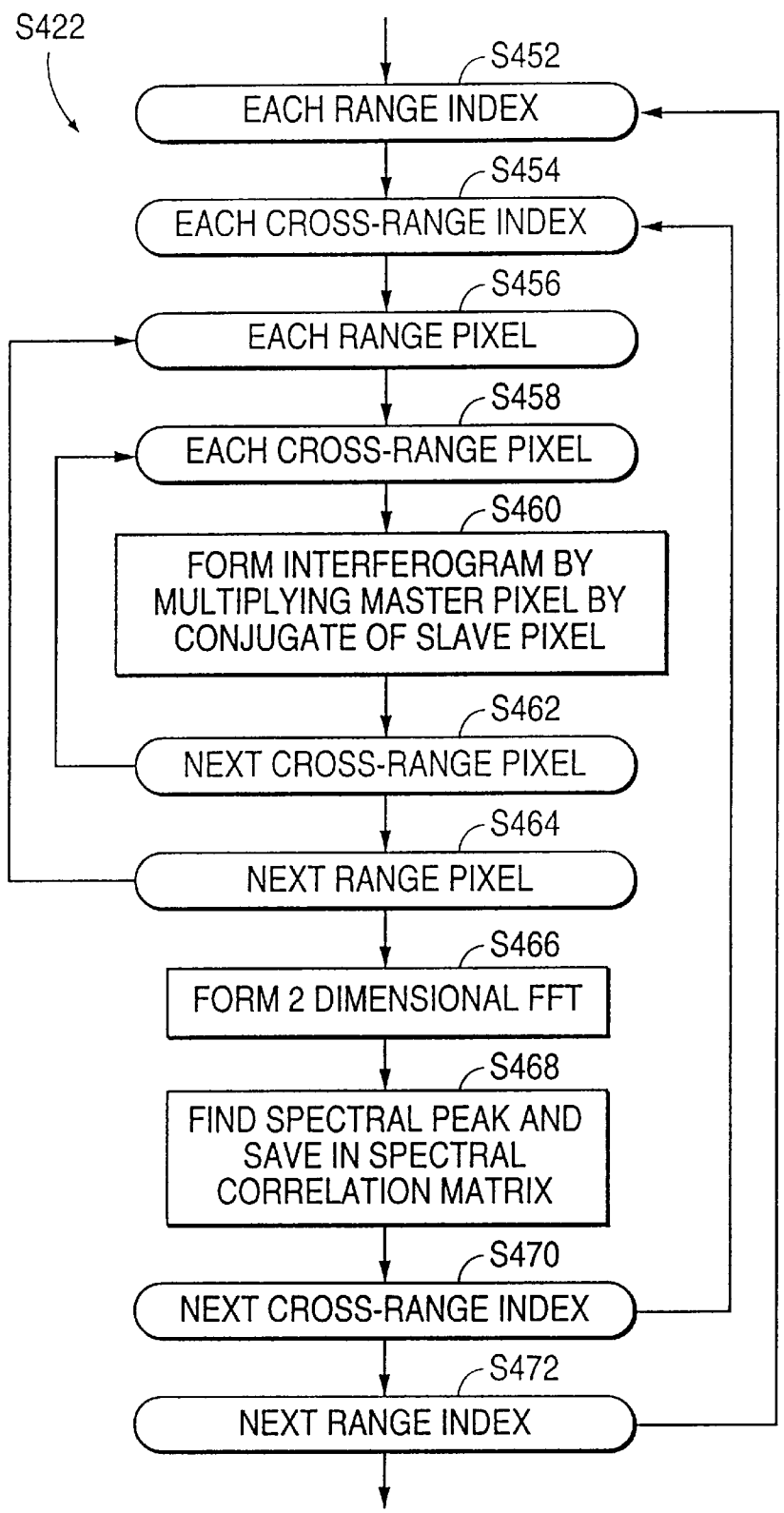

The spectral correlation process is described in more detail with regard to step S420 depicted in FIG. 22 including step S422 depicted in FIG. 25. In particular, an offset slave chip are culled from the slave image at an offset value. An interferogram is formed between the offset slave chip and the corresponding master chip, and the interferogram is processed through a two dimensional FFT (fast Fourier transform) to form a spectral array. The phase fringes in an interferogram are more sensitive to variations in terrain elevation than are intensity correlated detected images. Thus, the spectral array has more variation in which to test for correct correlation. A peak of the spectral array is determined and stored in a spectral peak array at an element location corresponding to the index value. This spectral processing is repeated for a plurality of index values (e.g., corresponding to the uncertainty of the alignment of the master and slave chips after correction for the intensity correlated offset value). The spectral peak array may be of the order of 16 pixels by 16 pixels. When the spectral peak array is filled, a final offset value is determined at the index value corresponding to the maximum value in spectral peak array or an interpolated value between maximums.

The offsets determined by the spectral correlation process provide the offsets in the slave image relative to the master image to align each conjugate point in the corresponding chip to a typical accuracy of one-sixth of a pixel. Any pixel in a master chip may be selected to be a conjugate point to a corresponding position in the slave chip after the offset is applied.

This provides an automatic, accurate and novel way to selected conjugate points for step P22 in FIG. 11. Although 16 points are selected in this example, any number of conjugate points from 10 to 20 will prove adequate for radargrammetry elevation determination.

Each point PT in each image constitutes an observation of R and $\theta$. Associated with each observation are 9 measured variables: (1) the XYZ position of the UAV (e.g., satellite platform or aircraft) as measured by, for example, an onboard GPS, (2) the velocity of the UAV in the XYZ coordinates as measured by, for example, an onboard INS, and (3), the R, $\theta$ (based on Doppler frequency shift of the pixel in the image array) and t position of the point being observed as determined by the SAR aperture (observation window).

In step P23 of FIG. 11, initial estimates of unknown parameters are determined. First to be determined is an initial estimate for parameter vector P. The general form of parameter vector P includes the coordinates (X, Y, Z) of each point PT to be determined (regardless of how many images of the point may be observed) and 12 biases. The 12 biases include: (1) three biases in the X, Y, Z position of the UAV, (2) three biases in the X, Y, Z direction of the velocity drift of the UAV, (3) three biases in the X, Y, Z direction of the acceleration of the UAV, and (4) three biases in the SAR measurements of the R, $\theta$ and t. Initially, the biases might be assumed to be zero; however, by assuming some initial bias (that is better than a random guess) and designing an iterative process to determine corrections to the initial bias estimates, it is possible to improve the speed of the coordinate estimation process by correcting for inaccuracies in the initially assumed biases. Each of these biases comes from systematic (i.e., repeatable) error sources that are not otherwise accounted for in the equations that model the radargrammetry. The supplier of the input data (i.e., data tapes used to generate images 304, 318) may provide GPS position bias estimates associated with the data on the data tape and INS drift rate and acceleration bias estimates associated with the data on the data tape. The developer of the SAR image processor (including phase history processing for auto-focus) may provide the SAR measurement bias estimates associated with images 304, 318, or in the alternative, these biases may be initially assumed to be zero. These biases are to be the initial biases that will be corrected during the coordinate estimation process.

The process of estimating the initial coordinates (X, Y, Z) for each point PT to be included in the parameter vector P is initially only an approximation. For example, with the center of the earth as the X, Y, Z origin, point PT may be assumed to be at mean sea level at a point in the center of the imaged area based on a Clarke spheroid model of the earth (or any other spherical earth model). The Z axis passes through the north spin axis of the earth or 90 degrees of latitude. In geodetic coordinates, the X axis passes through the prime meridian or zero degrees of longitude. The Y axis is then defined by a right hand coordinate system rule.

When processing data in geodetic coordinates, a reference point at the center of the imaged area at mean sea level may be the estimated initial position of all of the conjugate pairs. For example, where the mean sea level is $R_0$, latitude is LAT and longitude is LONG, the geodetic coordinates of the reference point is given by:

$$X_0 = R_0 \cos(\text{LAT})\cos(\text{LONG}),\ Y_0 = R_0 \cos(\text{LAT})\sin(\text{LONG}),\ Z_0 = R_0 \sin(\text{LAT}). \qquad (18)$$

The least squares adjustment of measurements and parameters will adjust the individual coordinates of each conjugate pair to converge on a more accurate coordinate estimate. To speed convergence, the initial position of each conjugate pair may be individually corrected for X and Y displacements from the central reference point based on the pixel position of the conjugate pair in the pixel image.

Alternatively, local tangent plane coordinates are preferred when the radar is on a terrestrial aircraft (i.e., when the INS and GPS systems provide data in a local tangent plane). A local tangent plane is defined based on a reference point at mean sea level in the center of the imaged area. The Z axis passes upward through the reference point at the center of the imaged area, and an eastward tangent to the earth model at and from the reference point defines the X axis. The Y axis is a northward tangent from the reference point defined by the right hand coordinate system rule.

Preferably, the X, Y, Z axes used to locate each point PT should be the same axes used to locate the position and velocity of the UAV. Positions expressed in geodetic coordinates may be transformed into local tangent plane coordinates (and vice versa) using known translation and rotation transforms. The focused radar image is preferably expressed in coordinates compatible with measured position and velocity of the UAV. It is thus possible to compute the initial estimates of the X, Y, Z coordinates of any pixel in an imaged area. If 10 conjugate pairs are determined then the number of unknown coordinates X, Y, Z will total 30 (i.e., 3 times 10), and the number of elements in the parameter vector P will be 42 (i.e., 30 plus 12).

Second to be determined in step P23 of FIG. 11 is the a priori cofactor matrix Q defined as the matrix of relative variances and co-variances of the observations. In the present exemplary embodiment there are 9 measured variables: (1) the X, Y, Z position of the UAV (e.g., satellite platform or aircraft) as measured by, for example, an onboard GPS, (2) the velocity of the UAV in the X, Y, Z coordinates as measured by, for example, an onboard INS, and (3), the R, $\theta$ (based on Doppler frequency shift of the pixel in the image array) and t position of the point being observed as determined by the SAR aperture (observation window). Thus, the a priori cofactor matrix Q is a 9 by 9 matrix. Along the diagonal are the variances of each of the measured variables. The image data suppliers provide the variances for the measurements by the GPS and INS sensors. The SAR processor supplier provides the variances for the measurements by the SAR processor. Elements in the matrix off the diagonal are only present if the various measurements are not totally independent. For example, the X and Y components of velocity from the INS may not be totally independent. In such case, the supplier of the data tape will provide the co-variance between the X and Y components of velocity to be used in the a priori cofactor matrix Q. The measurement weight matrix W is the inverse of the a priori cofactor matrix Q.

The general least squares criteria is expressed by:

$$\phi = v^t W_v \quad (19)$$

where $\phi$ is a parameter to be minimized, residual vector v is a vector of N elements, matrix W is an N by N weight matrix and the superscript t indicates a transposed vector. For example, postulate three residuals such that $v=[v_1, v_2, v_3]^t$ and that each residual is independent (i.e., zero co-variance with other residuals) and of unequal weight $W=\text{diag}[w_1\ w_2\ w_3]$. Then the least squares criteria seeks to minimize:

$$\phi = w_1(v_1)^2 + w_2(v_2)^2 + w_3(v_3)^2 \quad (20)$$

Weight matrix W is the reciprocal of the variance/co-variance matrix Q. In the present exemplary embodiment there are 9 residuals of the measurements (i.e, the X, Y, Z components of the UAV position, the X, Y, Z components of the UAV velocity, and the R, $\theta$ and t measurement of point PIT in the SAR image). In the present exemplary embodiment, the weight matrix $W=[Q]^{-1}$ where Q is a 9 by 9 measured variable covariance matrix defined by three 3 by 3 covariance matrices as follows:

$$Q = \text{diag}[(\sigma_{x_{GPS}})^2 + (\sigma_{v_{INS}})^2 + (\sigma_{SAR})^2], \text{ where} \quad (21)$$

$$(\sigma_{x_{GPS}})^2 = \text{diag}[(\sigma_{x_{GPS}})^2 + (\sigma_{y_{GPS}})^2 + (\sigma_{z_{GPS}})^2], \quad (22)$$

$$(\sigma_{v_{INS}})^2 = \text{diag}[(\sigma_{v_{INSx}})^2 + (\sigma_{Vy})^2 + (\sigma_{v_{INSz}})^2], \text{ and} \quad (23)$$

$$(\sigma_{x_{SAR}})^2 = \text{diag}[(\sigma_{R_0})^2 + (\sigma_{\theta_0})^2 + (\sigma_{t_0})^2]. \quad (24)$$

The values of the diagonal elements of Q are based on the expected variances and co-variances (i.e., accuracy) of the measurements produced by the measuring instruments: GPS, INS and SAR. These values are typically available from the supplier of the image data tapes or the supplier of the SAR processor so that the weight matrix may be pre-computed in step P23 of FIG. 11.

Step P24 of FIG. 11 is a computation process that is iteratively performed until a solution converges as determined by steps P25 and P26 of FIG. 11 or until a maximum number of attempts is reached. If the maximum number of attempts has not been reached and the convergence criteria (steps P25 and P26) has failed after the computation of step P24 is performed, the computation of step P24 is repeated.

Figure 12:
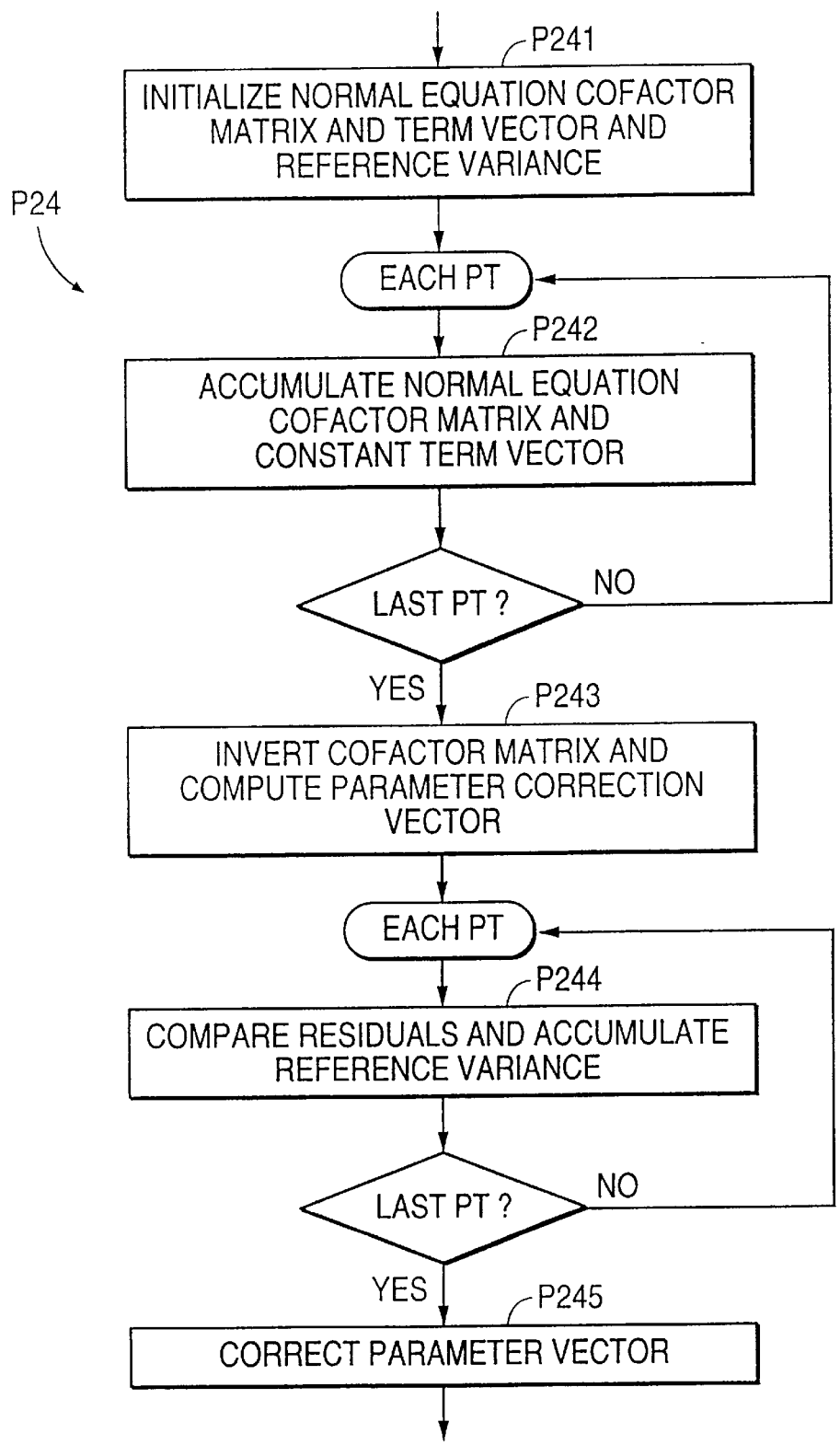
FIG. 12 is a functional block diagram of a least squares regression of observations and parameters process of the invention.

Step P24 of FIG. 11 includes initialization step P241 of FIG. 12, first repeating loop step P242 of FIG. 12 (repeating for each point PT in each image), calculating step P243 of FIG. 12, second repeating loop step P244 of FIG. 12 (repeating for each point PT in each image), and calculating step P245 of FIG. 12.

Initialization step P241 of FIG. 12 merely zeros a normal equations cofactor matrix N and a normal equations constant term vector t, the dimensions of which will become apparent during the discussion of steps P242 and P244 of FIG. 12. An a posteriori reference variance is initialized to zero. The a posteriori reference variance is denoted by $(\partial_0)^2$.

In step P242 of FIG. 12, the normal equations cofactor matrix N and the normal equations constant term vector t are computed by adding an update for each point PT. This process is based on a general formulation of the least squares adjustment of observations and parameters which is given by:

$$Av + B\Delta = f, \quad (25)$$

where matrix A is a 2 by 9 measurement matrix and matrix B is a 2 by N parameter matrix, N being three times the number of points PT to be determined plus 12 (i.e., the number of biases to be determined). The parameter correction vector $\Delta$ is a vector of corrections to be applied to correct parameter vector P to ensure that all conditions of equation (25) are met. As with parameter vector P, parameter correction vector $\Delta$ includes a correction corresponding to each element of parameter vector P: corrections of the coordinates (X, Y, Z) of each point PT to be determined and corrections of the 12 biases (i.e., three biases in the XYZ position of the UAV, three biases in the XYZ direction of the velocity drift of the UAV, three biases in the XYZ direction of the acceleration of the UAV, and three biases in the SAR measurements of the R, $\theta$ and t).

Residual vector v is a vector of residuals of the measured variables. After parameter correction vector $\Delta$ is determined in step P243 of FIG. 12 based on a least squares criteria, residual vector v is computed in step P244 of FIG. 12 for each point PT so that equation (25) is satisfied exactly. In the present exemplary embodiment, there are 9 measured variables that make up measurement vector I: the X, Y and Z components of the GPS position and the INS velocity and the SAR measurements of R, $\theta$ and t of point PT. Consequently there are 9 residuals in residual vector v. The residuals for range, cone angle, time, for the UAV position vector and for the radar velocity vector are $v_R$, $v_\theta$, $v_t$, $V_{Xuav}$, and $v_v$, respectively, and are specified as follows:

$$R_0 + v_R = R - R_{bias}, \quad (26)$$

$$\theta_0 + v_\theta = \theta - \theta_{bias}, \quad (27)$$

$$t_0 + v_t = t - t_{bias}, \quad (28)$$

$$X_{GPS} + v_{X_{UAV}} = X_{UAV} - X_{UAV_{bias}}, \text{ and} \quad (29)$$

$$V_{INS} + v_v = V, \text{ where} \quad (30)$$

$R_0$, $\theta_0$, $t_0$, $X_{GPS}$ and $V_{INS}$ are the measurements of true range R, true cone angle $\theta$, true time t, the true UAV position vector $X_{UAV}$ and the true velocity vector V, respectively. When all biases are removed from an observation there remains an observational residual which is assumed to be a random error with a Gaussian (i.e., normal) distribution.

The function vector f is a vector of residual functions: $F_1$ is the range residual $v_R$, and $F_2$ is the cone angle residual $v_\theta$, as defined by:

$$F_1 = v_R = R - R_{bias} - R_0 = 0 \quad (31)$$

$$F_1 = \sqrt{(X - X_{UAV})^2 + (Y - Y_{UAV})(Z - Z_{UAV})^2} - R_{bias} - R_0 \quad (32)$$

$$F_2 = v_\theta = \theta - \theta_{bias} - \theta_0 = 0 \quad (33)$$

$$F_2 = \cos^{-1}\left[\frac{(X - X_{UAV})V_X + (Y - Y_{UAV})V_Y + (Z - Z_{UAV})V_Z}{RV}\right] - \theta_{bias} - \theta_0 \quad (34)$$

where velocity V is defined by equation (15). Position vector $X_{UAV} = X_{GPS} + X_{UAVbias}$ where bias vector $X_{UAVbias}$ is a vector defined by equation (17).

The function vector f from equation (25) is merely $f=[F_1 \ F_2]^t$. A numerical value for function vector f is determined by substituting into equations (32) and (34):
1. the measured values of the X, Y and Z components of the GPS position are substituted for $X_{UAV}$, $Y_{UAV}$ and $Z_{UAV}$;
2. the measured values of the X, Y and Z components of the INS velocity are substituted for $V_X$, $V_Y$ and $V_Z$, and speed V is determined;
3. the SAR measurements of R and θ of point PT for aperture center $t_0$ are substituted for $R_0$, $\theta_0$;
4. the bias estimates of R, θ and t of point PT from parameter vector P is substituted for $R_{bias}$, $\theta_{bias}$ and $t_{bias}$; and
5. the current estimate of the X, Y, Z coordinates of point PT from parameter vector P is substituted for the X, Y and Z position of point PT.

The measurement matrix A from equation (25) is a 2 by 9 matrix formed from the Jacobian of $[F_1 \ F_2]^t$ with respect to the 9 measured variables. Matrix A is defined by:

$$A_{MEAS} = [A_{GPS} \ A_{INS} \ A_{SAR}], \text{ where} \quad (35)$$

$$A_{GPS} = \begin{bmatrix} \frac{\partial F_1}{\partial X_{GPS}} & \frac{\partial F_1}{\partial Y_{GPS}} & \frac{\partial F_1}{\partial Z_{GPS}} \\ \frac{\partial F_2}{\partial X_{GPS}} & \frac{\partial F_2}{\partial Y_{GPS}} & \frac{\partial F_2}{\partial Z_{GPS}} \end{bmatrix}, \quad (36)$$

$$A_{INS} = \begin{bmatrix} \frac{\partial F_1}{\partial \dot{X}_{INS}} & \frac{\partial F_1}{\partial \dot{Y}_{INS}} & \frac{\partial F_1}{\partial \dot{Z}_{INS}} \\ \frac{\partial F_2}{\partial \dot{X}_{INS}} & \frac{\partial F_2}{\partial \dot{Y}_{INS}} & \frac{\partial F_2}{\partial \dot{Z}_{INS}} \end{bmatrix}, \text{ and} \quad (37)$$

$$A_{SAR} = \begin{bmatrix} \frac{\partial F_1}{\partial R_0} & \frac{\partial F_1}{\partial \theta_0} & \frac{\partial F_1}{\partial t_0} \\ \frac{\partial F_2}{\partial R_0} & \frac{\partial F_2}{\partial \theta_0} & \frac{\partial F_2}{\partial t_0} \end{bmatrix}. \quad (38)$$

A numerical value for the A matrix may be determined for each observation by applying the 9 measured variables in measurement vector I and the current parameters from parameter vector P to the matrix A.

The parameter matrix B from equation (25) is a 2 by N parameter matrix where N is three times the number of points PT to be determined plus 12 (i.e., the number of biases to be determined). Parameter matrix B is formed from the Jacobian of vector $[F_1 \ F_2]^t$ with respect to the X, Y, Z coordinates for each point PT and with respect to the 12 bias parameters. Parameter matrix B is defined by $[B_{PT} \ B_{bias}]$ where $B_{PT}$ is a single point matrix defined by a 2 by 3 Jacobian of $[F_1 \ F_2]^t$ with respect to the three point coordinates X, Y, Z when only a single point PT is measured. When two points PT are measured, point matrix $B_{PT}$ is a 2 by 6 matrix where point matrix $B_{PT}$ becomes $[B_{PT1} \ B_{PT2}]$, and single point matrix $B_{PT1}$ is a 2 by 3 point matrix for the first point PT, and single point matrix $B_{PT2}$ is a 2 by 3 point matrix for the second point PT. Skilled persons will be able to expand the point matrix to apply to 10 points PT to be determined. Point matrix $B_{PT}$ for a single point is defined by:

$$B_{PT} = \begin{bmatrix} \frac{\partial F_1}{\partial X} & \frac{\partial F_1}{\partial Y} & \frac{\partial F_1}{\partial Z} \\ \frac{\partial F_2}{\partial X} & \frac{\partial F_2}{\partial Y} & \frac{\partial F_2}{\partial Z} \end{bmatrix} \quad (39)$$

Matrix $B_{bias}$ is a 2 by 12 Jacobian of $[F_1 \ F_2]^t$ with respect to the 12 bias parameters from parameter vector P (e.g., X, Y, Z bias components of the UAV position from the GPS, the UAV velocity from the INS, the UAV acceleration from the INS and the point R, θ and time t from the SAR). Matrix $B_{bias}$ is defined by:

$$B_{bias} = [B_{GPS_{bias}} \ B_{INS_{bias}drift} \ B_{INS_{bias}accel} \ B_{SAR_{bias}}], \text{ where:} \quad (40)$$

$$B_{GPS_{bias}} = \begin{bmatrix} \frac{\partial F_1}{\partial X_{GPS_{bias}}} & \frac{\partial F_1}{\partial Y_{GPS_{bias}}} & \frac{\partial F_1}{\partial Z_{GPS_{bias}}} \\ \frac{\partial F_2}{\partial X_{GPS_{bias}}} & \frac{\partial F_2}{\partial Y_{GPS_{bias}}} & \frac{\partial F_2}{\partial Z_{GPS_{bias}}} \end{bmatrix}, \quad (41)$$

$$B_{INS_{drift}} = \begin{bmatrix} \frac{\partial F_1}{\partial \dot{X}_{INS_{bias}}} & \frac{\partial F_1}{\partial \dot{Y}_{INS_{bias}}} & \frac{\partial F_1}{\partial \dot{Z}_{INS_{bias}}} \\ \frac{\partial F_2}{\partial \dot{X}_{INS_{bias}}} & \frac{\partial F_2}{\partial \dot{Y}_{INS_{bias}}} & \frac{\partial F_2}{\partial \dot{Z}_{INS_{bias}}} \end{bmatrix}, \quad (42)$$

$$B_{INS_{accel}} = \begin{bmatrix} \frac{\partial F_1}{\partial \ddot{X}_{INS_{bias}}} & \frac{\partial F_1}{\partial \ddot{Y}_{INS_{bias}}} & \frac{\partial F_1}{\partial \ddot{Z}_{INS_{bias}}} \\ \frac{\partial F_2}{\partial \ddot{X}_{INS_{bias}}} & \frac{\partial F_2}{\partial \ddot{Y}_{INS_{bias}}} & \frac{\partial F_2}{\partial \ddot{Z}_{INS_{bias}}} \end{bmatrix}, \text{ and} \quad (43)$$

$$B_{SAR_{bias}} = \begin{bmatrix} \frac{\partial F_1}{\partial R_{bias}} & \frac{\partial F_1}{\partial \theta_{bias}} & \frac{\partial F_1}{\partial t_{bias}} \\ \frac{\partial F_2}{\partial R_{bias}} & \frac{\partial F_2}{\partial \theta_{bias}} & \frac{\partial F_2}{\partial t_{bias}} \end{bmatrix}. \quad (44)$$

A numerical value for the B matrix may be determined for each observation by applying the 9 measured variables in measurement vector I and the current parameters from parameter vector P to the matrix B.

There is formed one measurement vector I for each observation of each unknown point PT. For example, when there are 10 conjugate pairs identified in step P22, the number of measurement vectors being processed is 20 (two measurement vectors for each conjugate pair).

In step P242 of FIG. 12, the normal equations cofactor matrix N and the normal equations constant term vector t are incremented by updates $N_i$ and $t_i$ as computed for each observation of measurement vector I. The initialized normal equations cofactor matrix N and the initialized normal equations constant term vector t accumulate updates $N_i$ and $t_i$, respectively, as computed for each measurement vector I. The weight matrix $W_1$ for each measurement is the weight matrix W determined from matrix Q in step P23. A 9 by 9 equivalent weight matrix $W_{ei}$ is defined by $(A_i Q_i A_i^t)^{-1}$ where $A_i$ is the 2 by 9 matrix formed from the Jacobian with respect to the 9 measured variables of the two element function vector f evaluated for the measurement vector I that is being processed and the current values of parameter vector P. The updates to the normal equations coefficient matrix $N_i$ for the ith measurement is defined by:

$$N_i = (B_i^t W_{ei} B_i) = [B_i^t (AW_i A^t)^{-1} B_i], \text{ where} \quad (45)$$

$B_i$ is the 2 by 42 matrix (for 10 unknown points PT) formed from the Jacobian with respect to the parameter vector P of the two element function vector f evaluated for the measurement vector I that is being processed and the current values of parameter vector P.

The update to the normal equations constant term vector $t_i$ for the ith measurement is defined by:

$$t_i = B_i^t W_{ei} f = B^t (AW_i A^t)^{-1} f. \quad (46)$$

After all updates $N_i$ and $t_i$ have been accumulated in the initialized normal equations cofactor matrix N and the initialized normal equations constant term vector t, respectively, in step P243 of FIG. 12 the normal equations cofactor matrix N is inverted and the parameter correction vector Δ is computed by:

$$\Delta = N^{-1} t. \tag{47}$$

In step P244 of FIG. 12, a new a posteriori reference variance $(\theta_0)^2$ is determined by accumulating a contribution to the initialized variance based on a residual vector $v_i$ computed for each point PT that is measured. In a processing loop, a numerical value for the $A_i$ matrix, the $B_i$ matrix and the $f_i$ matrix (i.e., evaluated by applying the 9 measured values from measurement vector I and the current parameters from the parameter vector P) is computed and corresponding residual vector component is computed by:

$$v_1 = Q_i A_i{}^t W_{ei}(f_1 - B_i \Delta), \text{ where} \tag{48}$$

matrix $Q_1$ and matrix $W_{ei}$ are the same as computed in step P242 of FIG. 12.

For each residual vector $v_i$, the a posteriori reference variance $(\partial_0)^2$ is incremented as follows:

$$(\partial_0)^2 = (\partial_0)^2 + (1/r)\Sigma\Sigma v_j{}^t W_{jk} v_k \tag{49}$$

where the double summation of the variances of and co-variances between elements of residual vector $v_i$ (over j elements by k elements) is weighted by matrix $W_{jk}$. The redundancy r is defined to be the number of points PT that are to be determined less 1. The matrix $W_{jk}$ reflects a judgment of the relative importance of each residual variance and co-variance to a convergence metric. The matrix $W_{jk}$ may set the identity matrix I when the co-variances are of minimal or non-existent importance (e.g., as when the measured variables are independent) and the variances are of equal importance to the convergence metric.

At the end of each iteration of step P24, parameter vector P is updated by regarding the current parameter vector P as uncorrected parameter vector $P^0$ and adding to it parameter correction vector Δ to determine the updated parameter vector P as follows:

$$P = P^0 + \Delta, \text{ where} \tag{50}$$

$P^0$ is the prior iteration's parameter vector P.

After the second iteration of step P24 (FIG. 11), a convergence metric is computed by forming a ratio of the present iteration's a posteriori reference variance $(\partial_0)^2$ to the prior iteration's a posteriori reference variance $(\partial_0)^2$. If this ratio is greater than a threshold (e.g., 90%), then the solution is determined in step P26 to have converged. If not, step P24 is repeated.

Figure 14:
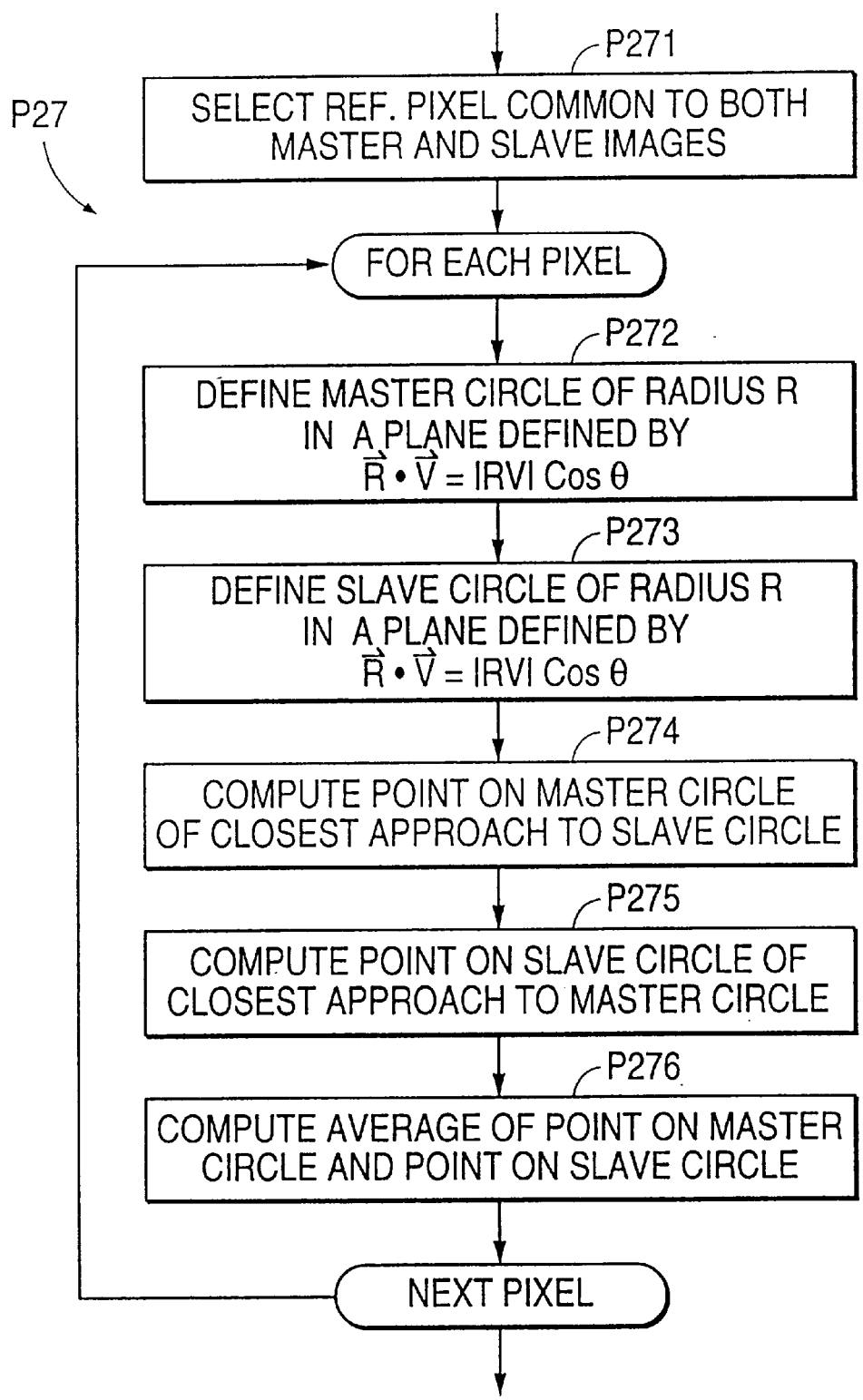
FIG. 14 is a functional block diagram of a radargrammetry elevation calculation process of the invention.

FIG. 14 depicts details of step P27 (FIG. 11). Step P27 is the process by which the X, Y, Z coordinates for each pixel in an image (e.g., either 304 or 318 of FIG. 8) is determined.

In step P271 of FIG. 14, a pixel is selected that is common to both the master image and the slave image. Preferably, a pixel is selected that is one of the conjugate pairs used in the radargrammetry process. With this common pixel as a "tie-point", a two dimensional loop is used to sequentially address each pixel in the master image and the corresponding pixel in the slave image for further processing in steps P272, P273, P274, P275 and P276.

Figure 15:
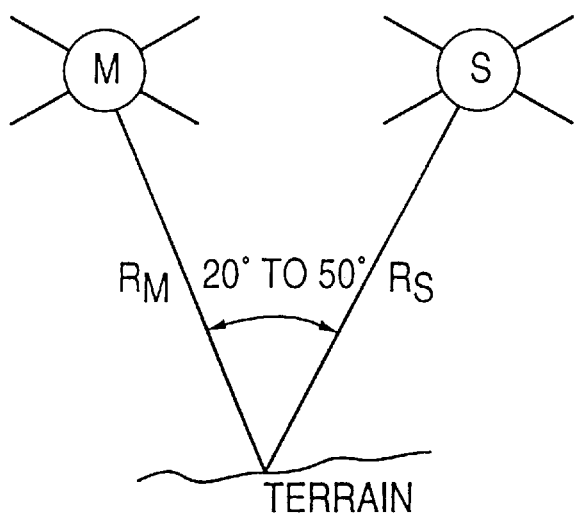
FIGS. 15–17 are pictorial diagrams of the geometries of the radargrammetry elevation calculation process of the invention.

FIG. 15 shows radar position M when master image data was collected and range $R_M$ from the radar position to the selected pixel. FIG. 15 also shows radar position S when slave image data was collected and range $R_S$ from the radar position to the selected pixel. Radar positions $R_M$ and $R_S$ are known with great precision since their position was adjusted to correct position biases that were determined by the least squares process of adjustment of observations and parameters as described above.

Figure 16:
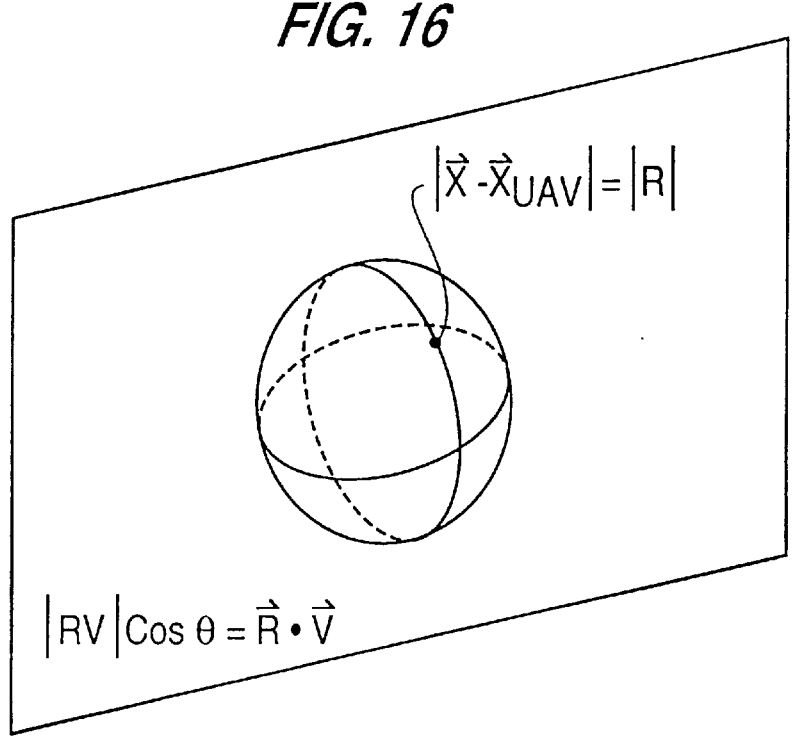

In step P272 of FIG. 14, an equation for a sphere according to radius vector $R_M$ is defined around the master radar position (see FIG. 16). The sphere is defined by:

$$R_M = X_M - X_{UAVM} = \begin{bmatrix} X_M - X_{UAVM} \\ Y_M - Y_{UAVM} \\ Z_M - Z_{UAVM} \end{bmatrix} \tag{51}$$

The radar's velocity measurement defined by equation (12) is corrected for calculated biases determined during the least squares process of adjustment of observations and parameters described above to define a corrected master velocity vector $V_M$. Scalar radius $R_M$ and speed $V_M$ are calculated in accordance with equations (14) and (15).

An equation for the vector dot product between the radius vector and the velocity vector is defined as:

$$|R_M V_M| \cos(\theta_M) = R_M \bullet V_M, \text{ where} \tag{52}$$

cone angle $\theta_M$ is the cone angle defined by the pixel being investigated in the master image.

The selected pixel specifies $R_M$ which defines a spherical surface centered at the radar's position when data was collected for the master image. Equation (51) defines the spherical surface on which coordinates $X_M$, $Y_M$ and $Z_M$ are located.

The selected pixel specifies $R_M$ and $\theta_M$ which define a conical surface with apex at the radar's position when data was collected for the master image. Equation (52) defines the conical surface on which coordinates $X_M$, $Y_M$ and $Z_M$ are located.

Figure 17:
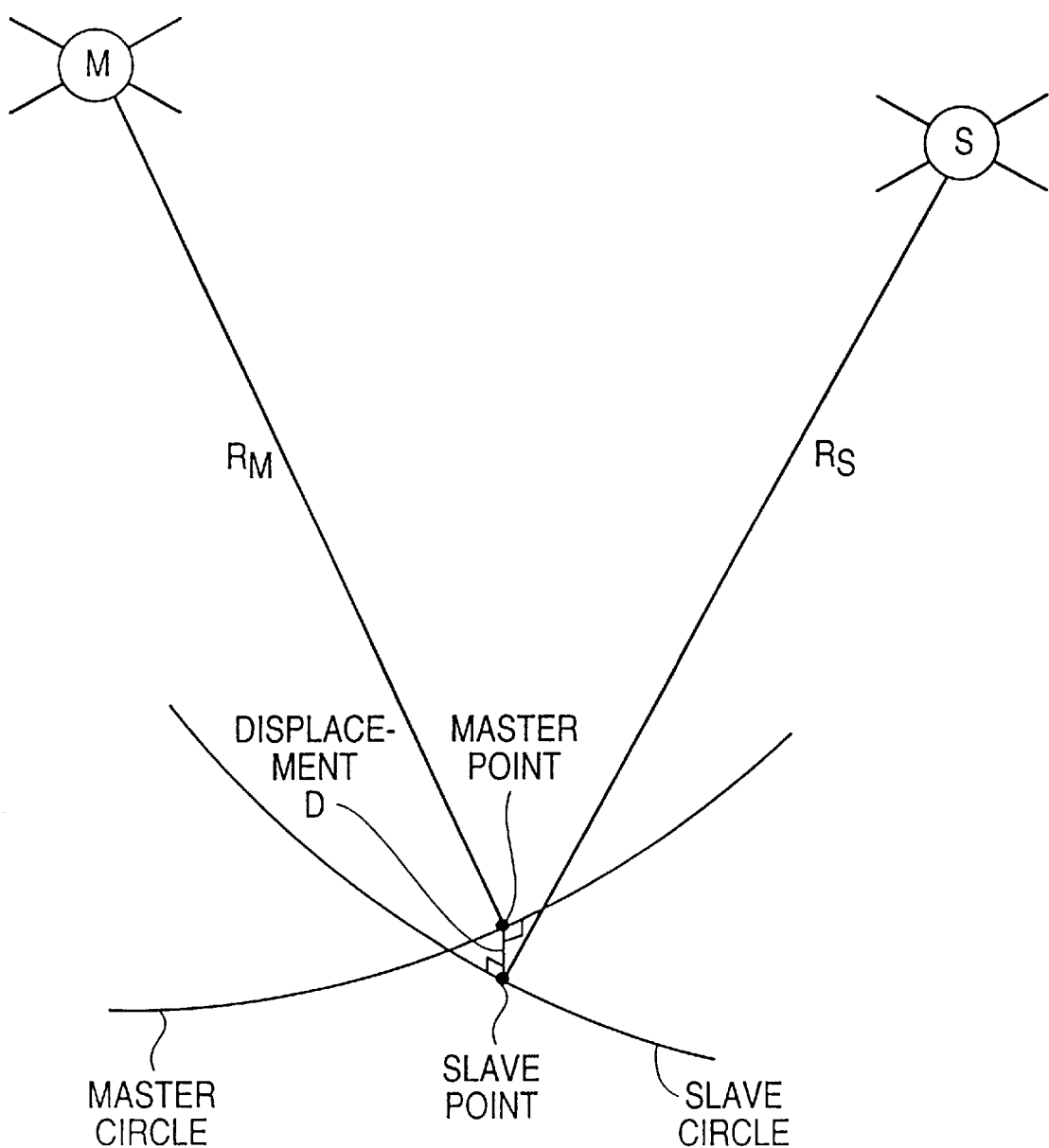

The intersection of the sphere defined by equation (51) and the cone defined by equation (52) is a circle in space containing coordinates $X_M$, $Y_M$ and $Z_M$ that pass through the selected pixel. FIG. 17 depicts a master circle at radius $R_M$ from the radar's position when data was collected for the master image.

In step P273 of FIG. 14, equations substantially identical to equations (51) and (52) are developed for computing coordinates $X_S$, $Y_S$ and $Z_S$ on the slave circle depicted in FIG. 17.

In step P274 of FIG. 14, the master circle point $X_{MM}$, $Y_{MM}$ and $Z_{MM}$ that is closest to the slave circle is calculated. First, a normal vector N is defined normal to the slant plane in which the master image is formed, and having components $N_X$, $N_Y$, $N_Z$. The normal vector N is defined by the vector cross product between the range vector to the center of the master image (i.e., call this point $X_C$, $Y_C$, $Z_C$) as defined by equation (51) and a corrected velocity vector as used in equation (52). Any point $X_M$, $Y_M$, $Z_M$ on the slant plane is defined by:

$$\begin{bmatrix} X_M - X_C \\ Y_M - Y_C \\ Z_M - Z_C \end{bmatrix} \cdot \begin{bmatrix} N_X \\ N_Y \\ N_Z \end{bmatrix} = 0 \tag{53}$$

Equations (51), (52) and (53) define three constraint equations, and point $X_M$, $Y_M$, $Z_M$ is easily solved. The sphere of equation (51) intersects with the cone of equation (52) to define the master circle (FIG. 17) in space. Equation (53) defines a point $X_M$, $Y_M$, $Z_M$ on the slant plane that intersects the master circle in two points. One point is the master point sought, point $X_{MM}$, $Y_{MM}$, $Z_{MM}$, (see FIG. 17), and the other point is easily eliminated due to its great distance from the imaging area.

In step P275 of FIG. 14, the slave circle point $X_{SS}$, $Y_{SS}$ and $Z_{SS}$ that is closest to the master circle is calculated in the same way that the master circle point $X_{MM}$, $Y_{MM}$, $Z_{MM}$ is calculated.

In step P276 of FIG. 14, an average between the master and slave circle points defines the approximate intersection of the circles that is regarded as the pixel location (i.e., the point of closest approach). The mean sea level radius of the earth in the region being imaged is subtracted from the radius from the earth's center to the averaged point of closest approach to calculate the elevation associated with the selected pixel for inclusion in H elevation arrays used in the processing depicted in FIGS. 8–10. Then, the next pixel is selected. When all pixels have been determined, the elevation by radargrammetry process is complete.

It will be appreciated that there are other techniques to determine the point of closest approach. For example, defining an equation for a scalar distance between arbitrary points on the master and slave circles, defining a derivative of the equation for scalar distance with respect to a coordinate on the master circle, setting the derivative equal to zero to find the minimum scalar distance and solving for the coordinates of the master and slave points of closest approach. Alternatively, the master and slave spherical surfaces may be defined so as to intersect in a circle in space, and one conical surface may be defined to intersect the circles. It will be appreciated that there are alternative equivalent embodiments of this calculation.

Known methods of radargrammetry may be found in pages 349–368, *Radargrammetric Image Processing*, by Franz W. Leberl, published by Artech House, 1990, or a paper on a photogrammetry counter part in "Space Intersection From ERS-1 Synthetic Aperture Radar Images", P. H. Chen and I. J. Dowman, *Photogrammetric Record*, pages 561–573, October 1996, Volume 15(88).

Figure 18:
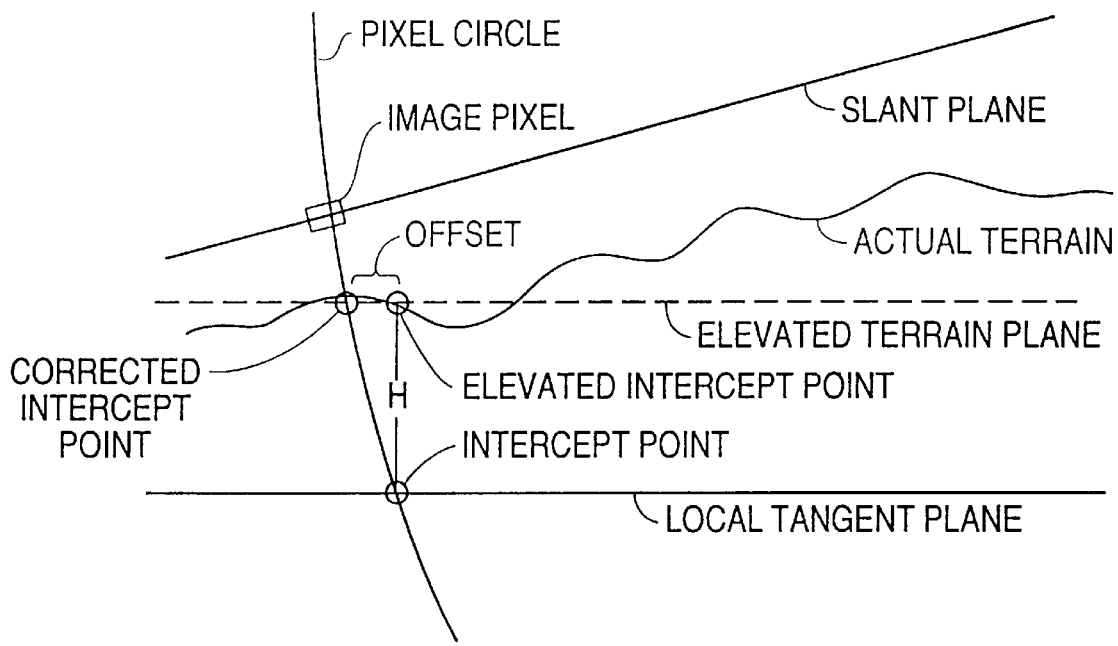
FIG. 18 is a pictorial diagram of the geometries of the layover correction process of the invention.

Layover correction process P1, as used in FIGS. 7–10, requires calculation of warped grid offsets and then resampling the image onto a regular grid based on the warped grid offsets. FIG. 18 depicts the necessary relationships. A radar image that has been processed through the phase history processor will contain an array of pixels, each having a complex value corresponding to a measured reflectivity of the terrain. The image is focused on a slant plane defined so as to include a velocity vector of the radar when the image data was collected and a line-of-sight vector from radar (at a center of its positions during the time that the radar data was collected) to a central point in the radar image. Each image pixel in the image corresponds to a range sphere radius R and cone angle θ. Each range sphere radius R and cone angle θ defines a pixel circle passing through the image pixel (see FIG. 18).

The process of determining warped grid offsets first determines the coordinates of an intercept point of the pixel circle with a local tangent plane (different from the image slant plane). Then, elevation data approximating actual terrain elevation at the intercept point is used to define an elevated terrain plane (see FIG. 18). Then, the coordinates of a corrected intercept point of the pixel circle with the elevated terrain plane is determined. In general, the corrected intercept point is offset in latitude and longitude from the corresponding pixel on the regular grid of the local tangent plane. The warped grid offsets are the latitude, longitude differences between points of a regular grid on the local tangent plane and the latitude and longitude of the corrected intercept points.

Figure 19:
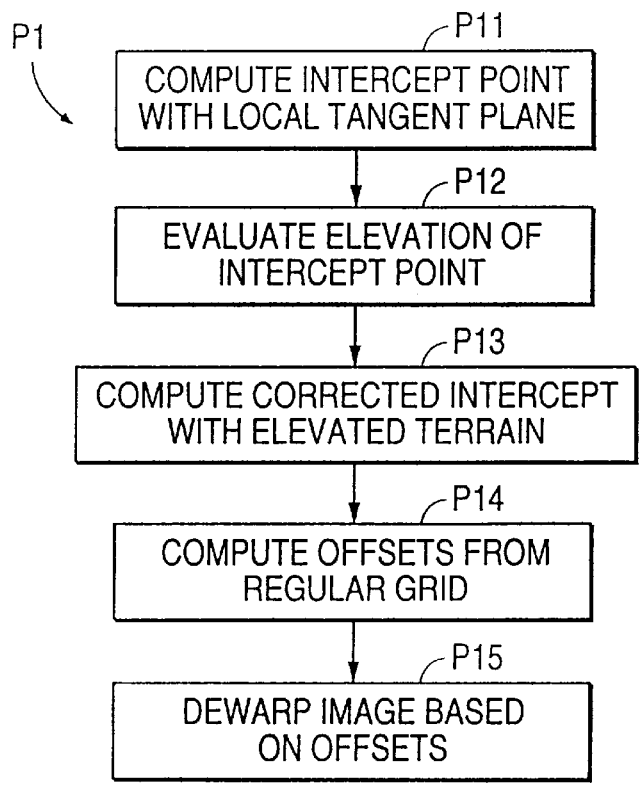
FIG. 19 is a functional block diagram of a layover correction process of the invention.

In FIG. 19, the layover correction process P1 is depicted as including five substeps: P11 through P15. For each pixel in the image, step P11 is calculated. Then, for each pixel step P12 is calculated, and so forth. However, it would be equivalent to calculate all steps for a single pixel and then repeat the calculation on the next pixel's data.

In step P11, a pixel in the master image defines a magnitude $R_M$ of radius vector $R_M$ (see equation (51)) that is a function of coordinates $X_M$, $Y_M$ and $Z_M$. The pixel also defines cone angle $\theta_M$ of that is also a function of $X_M$, $Y_M$ and $Z_M$ (see equation (52)). The cone and sphere intersect in a circle disposed in space (see FIG. 17 or 18). This circle passes through a local tangent plane at the intercept point $X_M$, $Y_M$ and $Z_M$ (FIG. 18).

The local tangent plane is specified by a reference point $X_0$, $Y_0$ and $Z_0$ in the imaged area. This reference point is taken to be on the earth's surface, preferably at a radius from the earth's center equal to the mean sea level in the imaged area. A point on this local tangent plane $X_M$, $Y_M$ and $Z_M$ is defined by:

$$\begin{bmatrix} X_M - X_0 \\ Y_M - Y_0 \\ Z_M - Z_0 \end{bmatrix} \cdot \begin{bmatrix} X_0 \\ Y_0 \\ Z_0 \end{bmatrix} = 0 \quad (54)$$

where $X_M$, $Y_M$ and $Z_M$ defines the geodetic coordinates of an arbitrary point on the tangent plane, and $X_0$, $Y_0$, $Z_0$ defines the geodetic coordinates of the reference point on the tangent plane. Equation (54) is just a dot product of a displacement vector from the reference point to the arbitrary point on the local tangent plane and a radius vector from the origin to the reference point. Equation (54) ensures that the displacement vector is perpendicular to the radius vector. The square root of the sum of $X_0^2$, $Y_0^2$, $Z_0^2$ is just the earth's radius as measured by mean sea level in the imaged region.

Equations (51), (52) and (54) form a thee equation set in three unknowns, $X_M$, $Y_M$ and $Z_M$, and therefore, may be solved as simultaneous equations. The solution point $X_M$, $Y_M$ and $Z_M$ is the intercept point (FIG. 18) and is located on the local tangent plane due to the constraint of equation (54).

In step P12 of FIG. 19, the elevation of the terrain at the latitude and longitude of the intercept point is computed. If the intercept point $X_M$, $Y_M$ and $Z_M$ is not already expressed in coordinates of the local tangent plane (i.e., X is north, Y is east and Z is down), an appropriate coordinate transformation is used to re-expressed these coordinates in the local tangent plane coordinate set.

Terrain data used for layover corrections is stored in a two dimensional array containing elevation values for each unique combination of the two dimensions (e.g., north, east). The separation between the elevation values in either the north or east direction need not be the same as the pixel intervals in the master image or desired pixel intervals when projected onto the local tangent plane.

The four elevation values closest to the solution coordinates $X_M$ (north) and $Y_M$ (east) are averaged to determine the elevated intercept point. The elevated intercept point is defined by $X_M$ (north), $Y_M$ (east) and H (down) where H is the average of the four closest elevation values in the elevation data array (see FIG. 18). This process is repeated for all pixels in the master image.

In step P13 of FIG. 19, an elevated reference point is computed to be the distance H above or below (depends on the sign of H) the local tangent plane from the old reference point $X_0, Y_0, Z_0$. By denoting the elevated reference point as $X_0, Y_0, Z_0$, a new elevated terrain plane (see FIG. 18) is defined by equation (54). Equations (51), (52) and (54) then form another three equation set in three unknowns $X_M, Y_M$ and $Z_M$ to be solved simultaneously to calculate the coordinates of the corrected intercept point (see FIG. 18) now denoted by $X_M, Y_M$ and $Z_M$. This calculation is repeated for each pixel in the image. The coordinate $X_M$ is the number of meters that the corrected intercept point is displaced north or south of the latitude of the reference point. The coordinate $Y_M$ is the number of meters that the corrected intercept point is displaced east or west of the longitude of the reference point.

In step P14 of FIG. 19, a regular grid on the local tangent plane is defined with respect to the original reference point (i.e., the reference point contained within the local tangent plane). For example, the grid may be defined by pixel increments north and south being 15 meters (i.e., level III elevation data), and pixel increments east and west being 15 meters. A pixel on the local tangent plane is located by an ith index and a jth index.

Each corrected intercept point corresponds to a pixel in the radar image slant plane. The corrected intercept point of the ith, jth image slant plane pixel defines latitude and longitude coordinates $X_M$ (north) and $Y_M$ (east). For the ith, jth image slant plane pixel an X and Y offset is calculated by subtracting the coordinates $X_M$ (north) and $Y_M$ (east) of the corrected intercept point from respective the X and Y coordinates of the ith, jth pixel on the local tangent plane. This subtraction is repeated for each pixel in the radar image until an offset in the north direction (call it Aa) and an offset in the east direction (call it Bb) have been determined for each pixel.

In step P15 of FIG. 19, the radar image is resampled into the regular grid according to the calculated offsets in a process called de-warping the image based on the offsets. The resampling preferably uses a bilinear interpolation sampling function two pixels wide. A bilinear sampling function is a one dimensional function defined to be unity at the origin, and from the origin, it linearly decrease to zero at +1, where the +1 refers to a one pixel increment. The function also linearly decreases from unity at the origin to zero at −1 to form an inverted V shape. The function is zero everywhere except between −1 and +1.

In a one dimensional example, the offset Aa would be divided into an integer part, A, that is an index of the number of pixels displaced (i.e., it represents and integral multiple of the pixel interval) and a fractional part, a, that defines the displacement within a single pixel. A linear array of pixels is conceptually displaced by a distance Aa. The sampling function will now overlay only two pixels having values F(p) and F(p+1), respectively. The resampled value would be given as:

$$F(p')=F(p)R(-a)+F(p+1)R(1-a), \qquad (55)$$

where R() is the two pixel wide bilinear sampling function. Note that only the fractional part, a, is in the equation since the selection of the two pixels from the linear pixel array accounts for a displacement of the integer part, A. Bilinear sampling functions extending over more than two pixels may also be used up to the point where resolution loss, by blending values from multiple pixels, becomes excessive. For example, on higher resolution image data, the "width" in pixels of the bilinear sampling function may be greater than if the image data were of a lower resolution.

Each radar image slant plane pixel has associated with it, corresponding offsets in X (north) and Y (east) defined in the regular grid on the local tangent plane. A two dimensional bilinear sampling function is defined as the product of two orthogonal bilinear sampling functions. The resampled pixel value would then be given as:

$$F(p',q')=F(p,q)R[-a]R[b]+F(p+1,q)R[1-a]R[b]+F(p,q'1)R[-a]R[-(1-b)]+F(p+1,q+1)R[-(1-a)]R[-(1-b)], \qquad (56)$$

where p and q are indices to the radar image slant plane array, and p' an q' are indices to the resampled array (i.e., the array projected onto a regular grid on the local tangent plane). This resampling process is easily mechanized in computers or separate discrete hardware.

The complex reflectivity value for each pixel in the radar image is resampled according to the offsets to defined a complex reflectivity value for each pixel in the regular grid on the local tangent plane. It will be appreciated that other similarly sized sampling functions are equivalent. Thus, the in-phase I and quadrature phase Q components of the reflected signal for the array of pixels in the radar image are resampled to de-warp the warped master radar image. The de-warped master image is preferably de-warped into a regularly spaced 15 meter (level III), 30 meter (level II) or 100 meter (level I) grid. This corrects for layover effects.

Process steps P11 through P15 are repeated for the slave radar image to complete the layover correction process P1 required in FIGS. 7–10. For example, in FIG. 7 radar image 302 may be regarded as the master radar image, and radar image 304 may be regarded as the slave radar image. Images 306 and 308 are corresponding resampled (i.e., de-warped) images.

Figure 20:
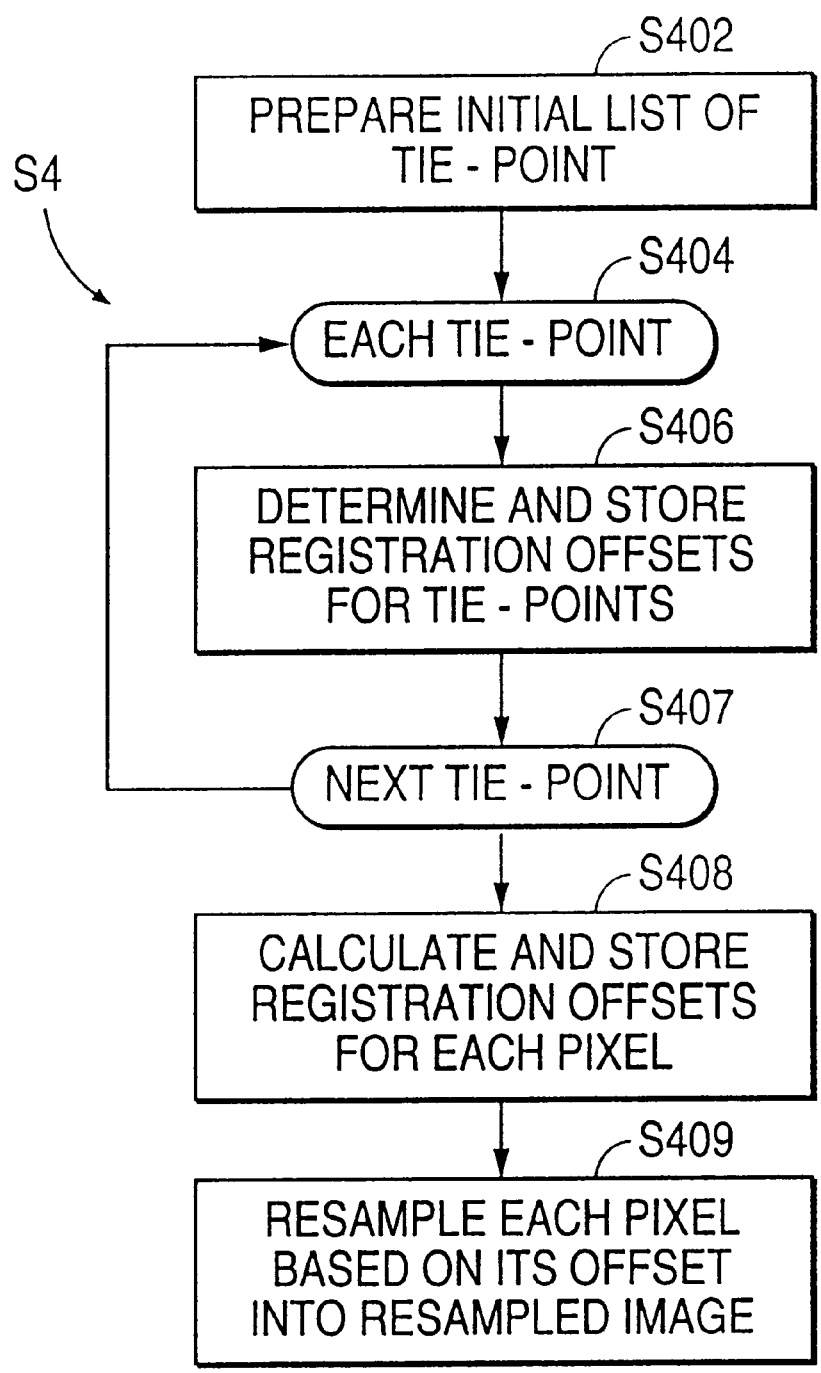
FIG. 20 is a functional block diagram of a tie-point registration process of the invention.

Interferometry demands that the first and second map images be accurately registered (step S4 of FIG. 2 and FIG. 20). One map image is regarded as the master map image (e.g., 306 of FIG. 7) and the other map image is regarded as the slave map image (e.g., 308 of FIG. 7). Registration is achieved by determining pixel offset values necessary to register the slave map image to the master map image at each of several tie-points, interpolating offset values for all pixels and then resampling (i.e., de-warping) the slave image into the master image (FIG. 20).

A plurality of tie-points is defined in the master map image such that each tie-point has a corresponding tie-point in the slave map image. Preferably, five points are selected. These tie-points may be selected manually by observing bright spots or high "contrast" areas. Alternatively, these tie-points may be determined by a correlation search of high contrast areas or bright spots. Furthermore, these tie-points may be initially determined manually, and then a correlation search around each tie-point is used to improve the alignment. One point is selected at the approximate center of the map image (the patch's center) and the four remaining points are selected close to the corners of the map image. However, the tie-points are selected to be far enough from the true corners of the map images to ensure that the tie-point, and a small region around the tie-point, are located within the boundary of both the master and slave map images.

The small region around the tie-points is at least large enough to perform correlation registration as discussed below. The small region includes at least a 64 by 64 array of 4,096 pixels plus additional pixels (for example, 5 additional pixels in all four directions) for a search correlation process. Thus, a tie-point may be defined as a pixel in the 80th row of pixels and in the 80th column of pixels in the master (or slave) image.

Figure 21:
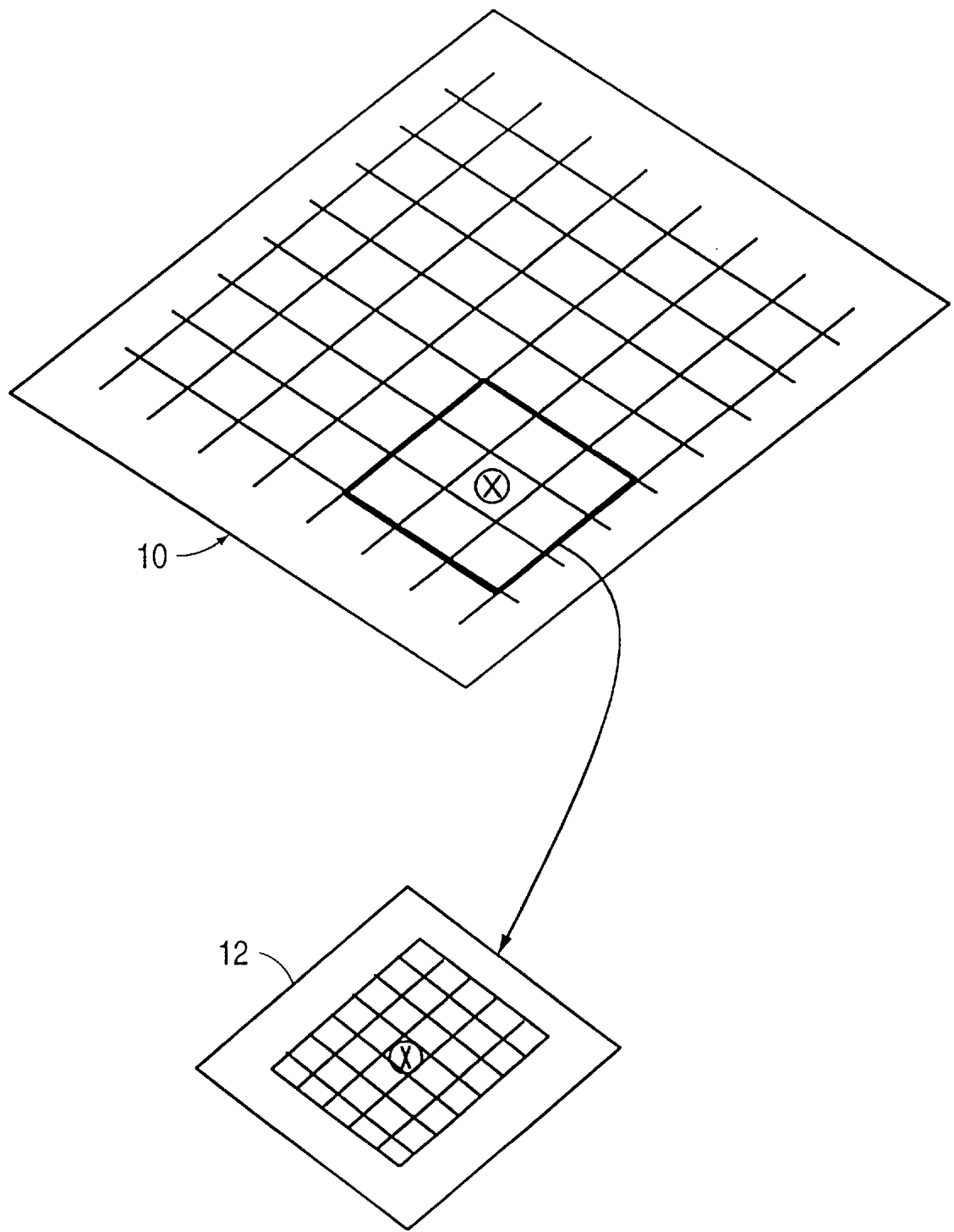
FIG. 21 is a pictorial diagram of an image chip used in tie-point registration.

In the search correlation process, small chip image 12 (FIG. 21) is first extracted from image 10 (FIG. 21) near the tie-point. For example, a 64 by 64 array of 4,096 pixels is extracted to form the slave chip image.

Each element of the chip image is a complex number. To obtain a positive real number, the square of the magnitude of each pixel in the chip image is computed by multiplying the pixel's value by its complex conjugate to form an intensity slave chip image.

In the master image, master chip 16 (FIG. 23) is identified in the master image, for example, a 75 by 75 array of pixels about the same tie-point. Master chip 16 is larger than slave chip 14. A positive real number is obtained for each pixel in the master chip image by multiplying the pixel's value by its complex conjugate to form an intensity master chip image.

Figure 23:
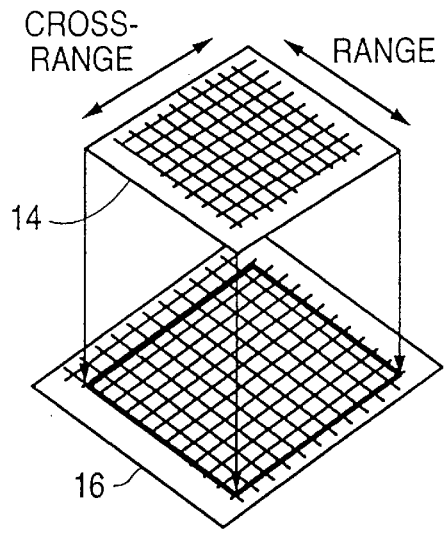
FIG. 23 is a pictorial diagram of an image chip in a correlation process of tie point registration.

The intensity slave chip image is registered to the intensity master chip image. In FIG. 23, the intensity slave chip image (e.g., 64 by 64 pixels) is mathematically overlayed on the intensity master chip image (e.g., 75 by 75 pixels). Since the intensity slave chip image is smaller than the intensity master chip image, the intensity slave chip image may be overlayed on the central portion of the intensity master chip image, or it may be displaced by up to 5 pixels in any direction from the central portion. There are 121 possible locations (i.e., 11 by 11 positions) for the slave chip to be overlayed on the master chip.

At each possible location, of the 121 locations, an intensity correlation value is determined. A correlation value is determined by forming, for each pixel of the 64 by 64 pixel array, a multiplication product of a pixel intensity from the slave chip and the respective underlying pixel intensity from the master chip, and then adding all multiplication products over the 64 by 64 pixel array. This correlation value is stored in an intensity correlation matrix array of 11 by 11 pixels.

When correlation values are stored in all elements of the 11 by 11 correlation matrix array, a peak value detector is used to determine where the largest correlation peak occurs. The peak value detector interpolates fractional pixels in such a way as to locate the correlation peak to an accuracy of about 2 or 3 pixels. The correlation peak detector generates pixel offsets in both directions from the tie-point that will move the slave chip into best registration with the master chip.

In FIG. 20, an initial list of tie-points is prepared at step S402. This may be achieved manually based on bright spots or areas of high contrast. Alternatively, these tie-points may be identified by a machine process that also identifies bright spots and/or areas of high contrast. Based on the present process, experience has indicated that only five tie-points are needed. This compares favorably to other processes where up to a 100 tie-points are needed for accurately registering two maps, one to another.

At each tie-point (sequenced in steps S404, S407), registration offsets are determined by correlation processing in step S406. Many different methods of correlation processing may be provided; however, it is desirable to obtain correlation accuracies to a small fraction of a pixel so that an accurate interferogram may be prepared.

Figure 26:
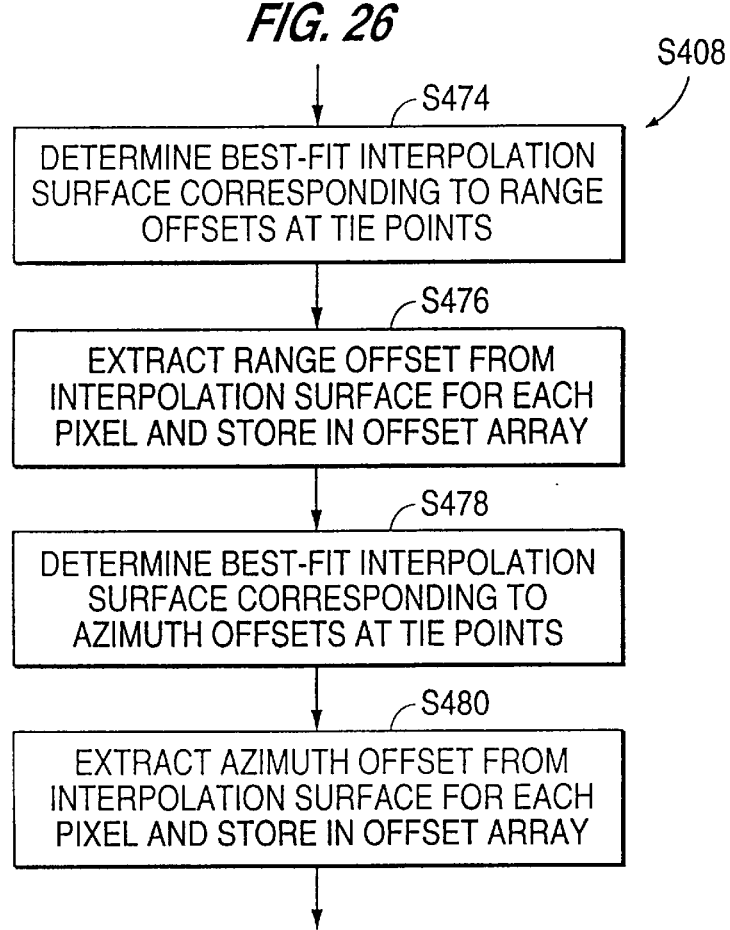
FIG. 26 is a functional block diagram of an interpolation process of the invention to determine offsets at all pixels.
Figure 27:
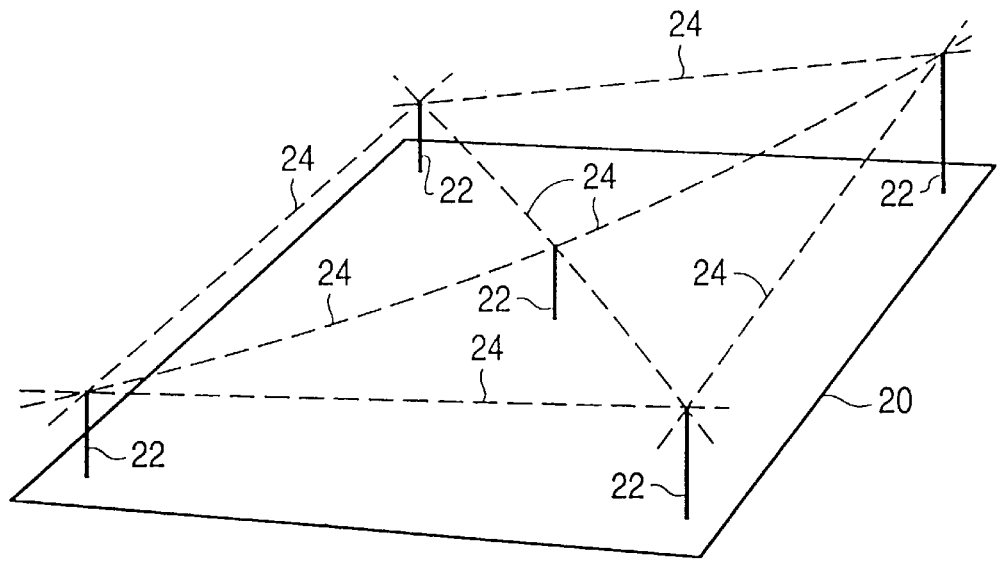
FIG. 27 is a pictorial diagram of the interpolation surface.

After the tie-point offsets (i.e., slave image to master image) have been determined in two dimensions (i.e., range and cross-range), an offset in two dimensions is computed in step S408 (FIG. 20) for each pixel in the image by interpolation as described with regard to FIGS. 26 and 27. After an offset (i.e., slave image to master image) has been computed at each pixel, each slave pixel is resampled in step S409 (FIG. 20). In the resampling process, a resampling function overlays the slave image at a location of a master pixel (i.e., displaced from the location of the corresponding slave image pixel by the offset in two dimensions). Using the resampling function, a weighted resampled pixel is computed as described with regard to step P15 of FIG. 19.

In FIG. 22, correlation processing step S406 includes a first intensity correlation process S410 and a second interferogram correlation processing step S420. In the intensity correlation step S410, an intensity array of the slave chip is prepared in step S412 by multiplying a complex value of each pixel by its conjugate value. Similarly, an intensity array of the master chip is prepared in step S414. In step S416, an intensity correlation matrix is computed. In step S418, a pixel offset is determined at a maximum intensity peak to an accuracy of 2 or 3 pixels.

In FIG. 23, slave chip 14 is mathematically overlayed on top of master chip 16. This overlay may be adjusted in 11 steps in cross-range and 11 steps in range so as to produce an 11 element by 11 element correlation matrix.

Figure 24:
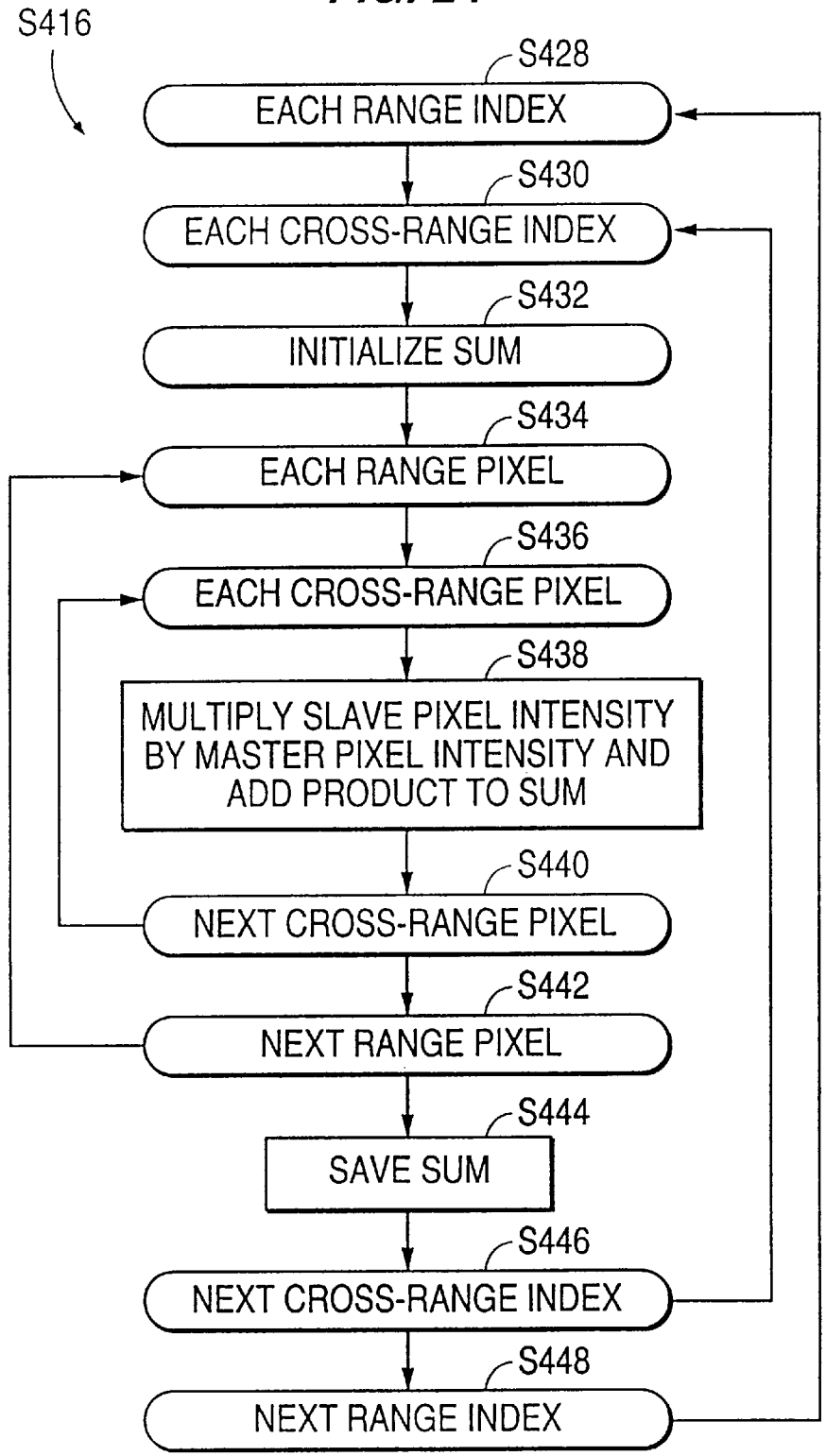
FIGS. 24 and 25 are functional block diagrams of a tie-point offset determination process of the invention.

Step S416 is described in FIG. 24 where in steps S428 and S430, initial range and cross-range indices are set. A sum is initialized in step S432. For each pixel (e.g., 64 range pixels by 64 cross-range pixels), the intensity of the slave pixel is multiplied by the intensity of the corresponding master pixel and the product is added to the sum in step S438. All pixels within the slave chip are so processed in steps S434, S436, S440 and S442.

The final sum is saved in the correlation matrix at step S444 as defined by the particular range and cross-range indices set in steps S428 and S430. The indices are next advanced to the next index value in steps S446 and S448 and the process is repeated until the pixels at all range and cross-range indices have been processed. At this point the entire intensity correlation array has been determined.

In FIG. 22, step S418 determines the best fit pixel offset at the maximum intensity peak, preferably by a polynomial peak detector.

Based on offsets determined by intensity correlation (step S410), a new slave chip is extracted and used to compute an interferogram correlation matrix in step S422. The pixel offset value as determined in step S418 is rounded to the nearest pixel and used to define the center and bounds of the new slave chip to be used in the generation of the interferogram used in step S422. From the correlation matrix developed in step S422 a final pixel offset is determined based on a maximum spectral peak in step S424.

In FIG. 25, step S422 is described in detail to compute an interferogram correlation matrix. As in FIG. 24 (intensity correlation), range and cross-range indices are stepped through each element in the correlation matrix in steps S452, S454, S470 and S472. At each range and cross-range index, a value is computed and stored in the corresponding correlation matrix element.

First, a small chip interferogram is generated in steps S456, S458, S460, S462 and S464. For each pixel in the interferogram, a value from a corresponding master pixel is multiplied by a complex conjugate of a value from a corresponding slave pixel in step S460. Steps S456, S458, S462 and S464 step through each pixel of the interferogram. The interferogram is produced based on the dimensions of the slave chip (e.g., 64 pixels by 64 pixels).

Once the interferogram is produced it is processed through a two dimensional fast Fourier transform (i.e., 2D FFT) in step S466. The two dimension spectrum produced in step S466 is processed in step S468 to find a spectral peak which is then stored in the spectral correlation matrix. The amplitude of the spectral correlation peak is a measure of the contrast of the dominant fringe pattern, and it is a figure of merit of how well the slave chip is registered with respect to the master image. The process of determining the spectral peak is repeated for each range and cross-range index provided by steps S452, S454, S470 and S472 to result in an 11 by 11 interferogram correlation matrix. In FIG. 22, step S424 operates on this 11 by 11 spectral correlation matrix to interpolate and find a pixel offset at the maximum spectral peak, preferably using a polynomial peak detector. The accuracy of this process has been observed to be within about one-eighth of a pixel.

In FIG. 26, the interpolation of range offsets for each pixel as performed in step S408 (FIG. 20) includes determining a best fit interpolation surface corresponding to range offsets at the previously computed tie points in step S474 and extracting range offsets from the interpolation surface for each pixel and storing the range offsets in an offset array in step S476. The processes of steps S474 and S476 are repeated for azimuth (i.e., cross-range) offsets in steps S478 and S480.

In step S474 of FIG. 26 in the present example, there are five tie-points, each characterized by a position (X, Y location) in array 20 (FIG. 27), and each characterized by a range offset and a cross-range offset. In FIG. 27, values 22 may be regarded as representing range offsets at each of the tie-points. Each of the tie-points is located at coordinates X, Y and is characterized by range offset Z in array 20 representing the pixels of the slave image. These range offsets at the five tie-points define a surface containing lines 24 that may be modeled as:

$$Z = AX + BY + CXY + D, \qquad (57)$$

where the position in array 20 of a tie-point is defined by coordinates X, Y, and the value of Z is a range offset at a tie-point, and the parameters A, B, C and D are parameters to be determined. Thus, with the five tie-points, a least squares regression process is used to determine the four parameters A, B, C and D. The range offset Z may then be calculated for all pixels by evaluating the interpolation equation for the coordinates X, Y of each pixel. Other polynomial equations may be used to model the surface. In this way step S474 determines the best fit interpolation surface for interpolating the range offset for all pixels in the array based on only the calculated range offsets at the tie-points. For each pixel location in array 20, the value of the interpolation surface is calculated and regarded as the range offset value for the corresponding pixel, and this value is stored in a range offset array in step S476. The same process is repeated for steps S478 and S480 to develop the azimuth (i.e., cross-range) offset values. After completion of step S408 (FIG. 20), the offset array includes range and cross-range offsets for each pixel.

In step 409 of FIG. 20, the slave image, for which the offsets from the master image have been calculated, is de-warped onto the master image in order to prepare an interferogram. This process preferably uses the resampling process described with respect to step P15 of FIG. 19 (within the layover correction process). This process uses a bilinear sampling function as discussed with respect to layover correction; however, other equivalent de-warping functions may be used. The result of de-warping slave image onto the master image is that each pixel in the de-warped slave image is registered to a corresponding master image pixel to within about one-eighth of a pixel. This forms a satisfactory registration for preparing an interferogram.

Some researchers into image registration have used large numbers of tie-points. One researcher into ice field movements uses 64. With this number of tie-points, the registration processing would become a major part of the processing cost when applied to IF SAR processing. This is important if one considers the immense data volume that would be involved in deriving precise elevation data for any large geographical area. The trouble is caused by the very thing that we are trying to measure: the unknown terrain elevations. These unknown elevations cause an offset jitter in the tie-point positions in the two images due to layover effect differences. The present approach to this problem is to use available approximate DTED (see FIG. 7) or use radargrammetry from another available SAR image to generate approximate DTED (see FIG. 8) or use an iterative approach to IFSAR to develop DTED (see FIG. 31) to reduce this measurement jitter caused by layover distortion and obtain better resampling offset values. Approximate DTED is available almost anywhere in the world or can be obtained photogrammetrically with a third image over the terrain of interest. The present approach uses a precise radargrammetric model to generate pixel offsets, and at the same time, to correct the interferometric baseline by precise corrections to the location of the measuring radar indicated by the path or orbit data. Thus, it is possible to drastically reduce the number of tie-points required for registration, and the expense of process them. Experiments to date have used just five tie points, in the middle and at the four corners, obtaining what appears to be good results.

In the process depicted in FIG. 2, the de-warped master and slave images output from step S3 (e.g., after the layover correction process P1 in FIGS. 7–10) are registered to a regular grid on the local tangent plane.

Figure 28:
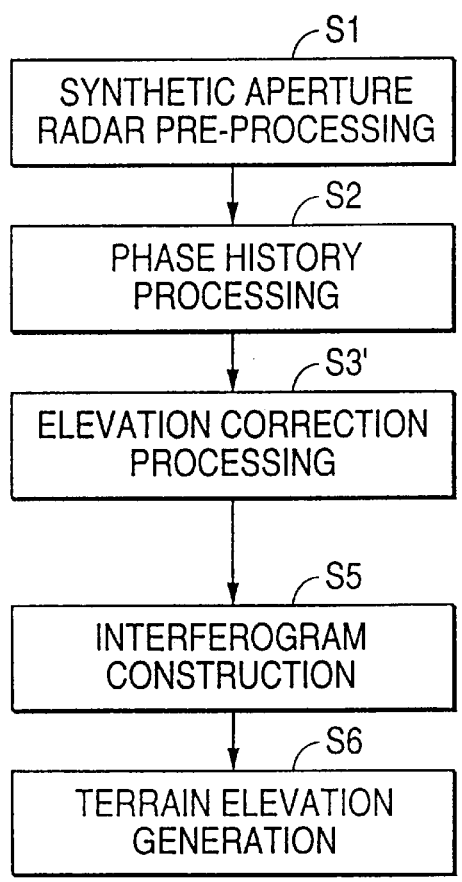
FIG. 28 is a functional block diagram of a second embodiment of the invention;.

An alternative embodiment is depicted in FIG. 28 in which the layover correction process P1 depicted in FIGS. 7 and 9 and the final layover correction process P1 depicted in FIG. 10 (producing images 306, 308) are modified to produce registered images so that construction of an interferogram in step S5 (FIG. 28) may be achieved directly from the output of step S3' (FIG. 28), thus bypassing tie-point registration step S4 (FIG. 2). The layover correction process is modified as follows.

Instead of de-warping a master image to a regular grid and de-warping a slave image to the regular grid defined on the local tangent plane, the warped slave image may be resampled to directly de-warp the slave image to the warped master image grid, and vice versa, so that a pixel by pixel comparison is still possible. In FIG. 8, it is necessary for all four layover correction processes P1 to de-warp the elevation warped images to a common regular grid due the later summation process. Where this alternative can be used, it is preferred when it is desired to minimize calculations since (1) the necessity of tie-point registration and resampling (i.e., FIGS. 20–27) is by-passed and (2) there is no substantial loss of determined elevation accuracy due to a slightly warped grid. The important aspect is that layover corrected master and slave images 306 and 308 be accurately registered, even if the array is slightly warped.

In step S5 (FIG. 2 or 28), an interferogram is constructed that is actually a principal part of the total phase. It varies in value between 0 and $2\pi$, and it must be unwrapped to form the total phase before elevations can be computed. Unwrapping is the process of moving along a path in the interferogram, adding or subtracting $2\pi$ from the wrapped phase whenever a jump from 0 to $2\pi$, or vice versa, is encountered, to obtain the continuous total phase that is proportional to the elevation difference. The unwrapping process will be totally defeated if the phase noise in the region being unwrapped is comparable to the value $\pi$. The wrapped interferometric phase is usually derived from the phase of the interferogram, which is the pixel by pixel product of one image with the complex conjugate of the other. The quality of the interferometric phase depends on the amount of phase noise, which comes from four distinct sources:

(1) System noise, including phase history processor noise (e.g. approximate focusing);
(2) Image misregistration;
(3) Time decorrelation; and
(4) Baseline decorrelation.

The first two sources of phase noise have addressed. Since already collected SAR data is an input to the process, time decorrelation is beyond the invention's power to alter, so that leaves baseline decorrelation. Classically, baseline decorrelation is attributed to an increase in the viewing angle difference between the two SAR images, which, due to the change in angle see a myriad of point scatterers that comprise a distributed pixel differently. Total decorrelation is reached when the separation of the two passes reaches the critical baseline ( e.g., about 1,000 meters for ERS-1). Past this point, fringes will not be properly formed, and interferometry is impossible. More recent work views baseline decorrelation as the result of a shift in the ground range wave number spectrum due to a difference in incidence angle. As the baseline is increased, the shift becomes greater, and the overlap of the ground spectra becomes less. Interferometry works only in the region of overlap, and the non-overlapping spectra of the two images appear in the interferogram as phase noise. According to this model, this phase noise can be eliminated by bandpass filtering the phase history in range to pass only the overlapping part of the range spectrum. The "baseline noise" disappears, but the range resolution is reduced to that corresponding to the bandpass of the range filter. The critical baseline corresponds to the case when the frequency offset is equal to the system bandwidth, and there is no overlap. In a variant of the present invention, a range filter is applied to the image pair used in constructing the interferogram. This improves the quality of the interferogram significantly, but not enough, and therefore a phase filter is preferably applied in a preferred variant. The phase filter is a multi-look filter, which is really a weighted coherent average of the pixels in a region, in this case a region defined by 3 range pixels by 7 azimuth pixels. The smoothed interferogran is significantly improved, and the noise reduction is very apparent. The phase unwrapping problem has been greatly simplified.

The approaches to phase unwrapping divide into two classes. The first consists of those which seek to build paths from point to point across interferograms along which phase can be unwrapped perfectly and elevations derived. Such paths must avoid "bad places" in the interferogram, because once an error in unwrapping is committed anywhere on a path, that error is propagated from there on along the path. There seems to be a recent consensus in the literature that this approach will never be fully automatic; there will always be a human in the loop.

The other approach is global, and is referred to as the least squares method or the Green's function method. It is based on the fact that if the relations governing the unwrapped phase are written as a system of difference equations, they have the same form as the finite element equations associated with the solution to Poisson's partial differential equation in two dimensions with Neumann boundary conditions. In the present invention, these equations are solved using FFTs, fast cosine transforms, or fast elliptical equation solvers. These methods are very time consuming, and they still don't obtain correct elevations in "bad spots." But the elevation errors are localized; they do not propagate to other parts of the image. In a preferred embodiment of the invention, a modification of the global Poisson's finite element method solution is used which performs well in "bad areas" and is efficient computationally.

In a "coherence image", the pixels all have values between zero and one, and they depict a correlation coefficient measured in a small neighborhood of the pixel. Bright areas represent places with strong pixel to pixel coherence. However, dark areas represent places with weak correlation and phase unwrapping would not work well along a path crossing one of those areas (e.g., often caused by the extreme slopes of the mountain sides which are under sampled (aliased) by the range sample distance). A coherence image can be used, along with an approximate DTED, to label areas of a scene where the derived elevation is unreliable.

In step S5 (FIG. 2 or 28), an interferogram algorithm converts registered master and slave image pixels into unwrapped phase angles. An interferogram is an array of phase angles. A wrapped interferogram is an array of wrapped phase angles were the angles are $2\pi$ modulo wrapped to a value between $-\pi$ and $+\pi$. An angle of $3\pi/2$ would be wrapped to $-\pi/2$. Any unwrapped angle may be converted to a wrapped form by adding or subtracting an integer multiple of $2\pi$ until the result is confined between $-\pi$ and $+\pi$. The wrapping is a modulo division process where the modulo index is lost, thus making it impossible to exactly reverse the process.

Each pixel in the interferogram is formed by multiplying the complex values in the master image (i.e., in phasor form $M*e^{j\alpha}$) by a complex conjugate of the complex values in the slave image (i.e., in phasor form $S*e^{-j\alpha}$). The complex product expressed in phasor form becomes $M*S*e^{j(\alpha-\beta)}$. Each pixel of the interferogram is formed by extracting the phase difference $\psi_{i,k}=\alpha-\beta$ from the complex product. The complex values in the master and slave images and in the complex product may be expressed in phasor form; however, the complex values are stored in arrays as real Re and imaginary Im terms. For each pixel in the interferogram the phase difference $\alpha-\beta$ is determined as the arctangent function of the ratio Im/Re. The arctangent function is periodic in phase and can only be determined to within a range of $2\pi$. Thus, the resulting interferogram is wrapped. To use interferometry to evaluate elevation, these phases must be unwrapped.

Wrapped phase $\psi_{i,j}$ is the ith, kth element of an M by N wrapped interferogram array where each element is a real valued wrapped angle between $-\pi$ and $+\pi$. Unwrapped angle $\phi_{i,k}$ is the ith, kth element of an M by N unwrapped interferogram array where each element is an unwrapped angle corresponding to the wrapped angle of a corresponding element of the wrapped interferogram. Thus, $\exp(j\phi_{i,k})=\exp(j\psi_{i,k})$ for each element of the array.

Unwrapping phases may be achieved by path unwrapping that starts at a control point and moves along a path. Each time the phase between elements in the array "jumps" more than a predetermined amount, it is assumed that the cyclic phase was wrapped (i.e., rolled over a $2\pi$ boundary) between the two elements, and $2\pi$ is either added to or deducted from the phase to unwrap the phase along the path. This technique is frequently path dependent and operator intervention is usually required to determine optimal paths.

In contrast, global unwrapping is a preferred embodiment. Global unwrapping uses an iterative weighted least squares method to minimize a difference between partal derivatives in rows and columns of the wrapped interferogram on the one hand and partial derivatives in rows and columns of the unwrapped interferogram on the other hand. This method allows the assignment of a weight (e.g., between 0 and 1) to each pixel of the interferogram to specify the weight (i.e., the relative importance) that the pixel is given in the final unwrapping solution. For example, some areas of an image may include a large body of water with significant wave states that will render the phase in these areas unreliable. These areas are candidates for a low weight.

The resulting normal equations (e.g., see discussion of radargrammetry) form a system of linear difference equations in the same form as Poisson's partial difference equations. The least squares solution of these normal equations is equivalent to a solution to the Poisson difference equations on a rectangular grid with Neumann boundary conditions. Unwrapped phases of the entire area (i.e., global unwrapping) is achieved using a Poisson partial difference equation solver.

Poisson's partial difference equations for spatial partial differences of function f(x, y) is defined by:

$$\delta^2 f(x,y)/\delta x^2 + \delta^2 f(x,y)/\delta y^2 = \rho(x,y). \tag{58}$$

The solution of this equation is unique up to an additive constant if the Neumann boundary conditions are given. The boundary conditions are the derivative df/dv at a normal to the boundary. However, under conditions that the data are periodic, the boundary conditions are not necessary.

Figure 29:
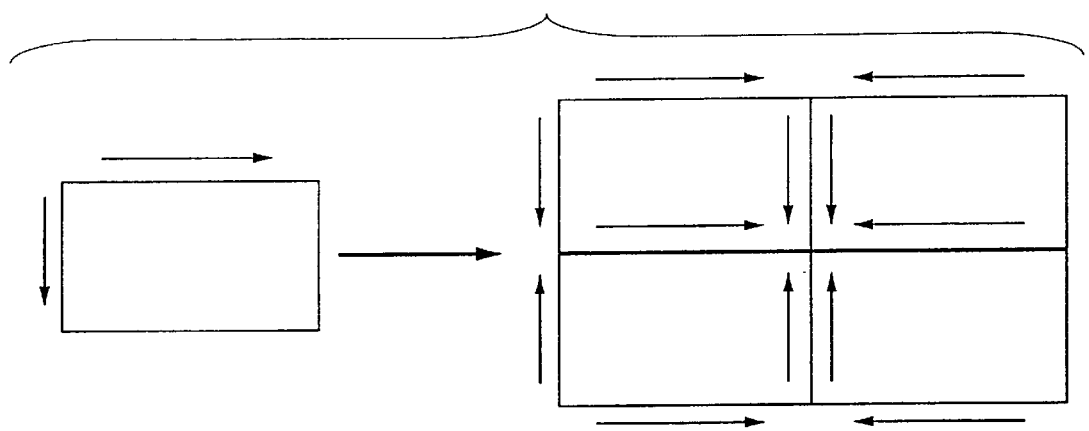
FIG. 29 is a diagram depicting how an interferogram is reflected horizontally and vertically to achieve a cyclic array for processing.

To prepare an interferogram that is periodic, the original interferogram is reflected first horizontally about the right-hand edge and then vertically about the lower edge to form a doubly enlarged interferogram array $\psi_{j,k}$ that is continuous throughout the array and periodic in a cyclic sense. See FIG. 29. Thus, the boundary conditions are not necessary.

The Poisson difference equations are implemented in discrete form. A row difference array $\Delta^x$ is formed by calculating for each array element of the doubly enlarged interferogram array:

$$\Delta_{j,k}^x = \psi_{j+1,k} - \psi_{j,k}, \tag{59}$$

for each j, k combination within the doubly enlarged array.

A column difference array $\Delta^y$ is formed by calculating for each array element of the doubly enlarged interferogram array:

$$\Delta_{j,k}^y = \psi_{j,k+1} - \psi_{j,k}, \tag{60}$$

for each j, k combination within the doubly enlarged array.

A second difference array p is formed by calculating for each array element:

$$\rho_{j,k} = \Delta_{j,k}^x - \Delta_{j-1,k}^x + \Delta_{j,k}^y - \Delta_{j,k-1}^y, \tag{61}$$

for each j, k combination within the doubly enlarged. This is the discrete form of the Poisson's difference equation.

In an original interferogram array that is 4,096 elements by 4,096 elements, the doubly enlarged array is 8,192 by 8,192 elements, having over 64 million elements. For each element, there is an equation for $\rho_{j,k}$, and this constitutes over 64 million equations.

A computational efficient solver is needed. The Poisson difference equations on a rectangular grid with Neuman boundary conditions can be solved directly, without need for iterations, by the use of a two dimensional Fourier transform.

A frequency space array P is formed from a two dimensional Fourier transform of the second difference array $\rho$ as follows:

$$P_{m,n} = 2\text{DFFT}\{\rho_{j,k}\}, \tag{62}$$

Compute frequency space array $\Phi_{m,n}$ defined by:

$$\Phi_{m,n} = P_{m,n}/(2\cos(\pi m/M) + 2\cos(\pi n/N) - 4). \tag{63}$$

The solution that provides the unwrapped phase $\phi_{i,k}$ is given by two dimensional inverse Fourier transform of $\Phi_{m,n}$ defined by:

$$\phi_{i,k} = 2\text{DFFT}^{-1}\{\Phi_{m,n}\}. \tag{64}$$

Since the value of $\phi_{0,0}$ is arbitrary and not uniquely determined by this process, a user typically specifies a reference phase at one control pixel in the image and offsets the unwrapped phase in all other pixels accordingly.

In some large area SAR maps, at far range, the interferogram begins to show a lack of coherence between images of the image pair as evidenced by a rapid change in a phase fringe at far ranges. The phase fringe, represented by a $2\pi$ change in the interferometric phase, in a case where the baseline equals 144 meters equates to a little over 100 meters of elevation change. It has been observed that the phase changes very rapidly with increasing range (the fringes are very dense). This is because the Earth is falling away from the radar position in that direction. To eliminate this effect, an interferogram is constructed using the Earth's ellipsoid model (WGS 84), and the result is subtracted from the ERS-1 interferogram, thus removing the Earth ellipsoid from the phase.

In the present approach to DTED generation, the above techniques are used to compute elevations along the desired grid by the least squares method. Unreliable points will be so labeled, and in an operational scenario, the process might have access to a previous database of terrain elevations that it can merge with, filling the holes of both. The terrain used for experiment has been unusually severe. It is expected that, to provide accurate elevation maps for unusually severe terrain, it may be required that at least two interferometric pairs over the terrain be processed.

In step S6 (FIGS. 2 and 28), the elevation determination algorithm converts the unwrapped phase information into elevation/height information accurately at predetermined locations on an earth local tangent plane.

Figure 30:
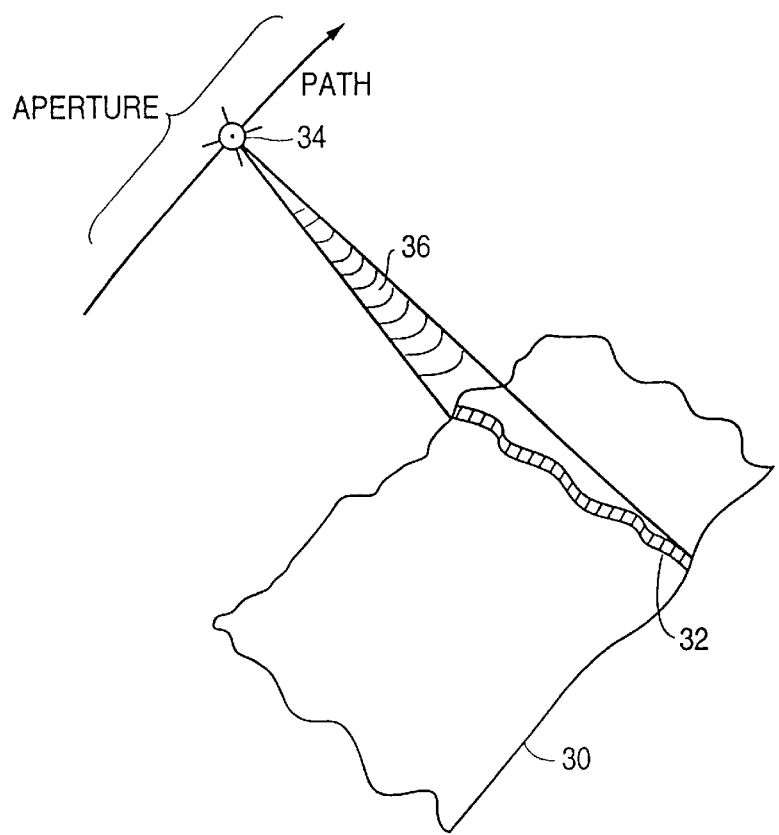
FIGS. 30 and 31 are pictorial diagrams of the geometry of the terrain interferometric elevation data determination process of the invention.

In FIG. 30, a radar traverses a path during the time interval (i.e., a time aperture) in which data is collected to prepare the synthetic image radar image 30. After processing the data, including auto focus phase history processing (e.g., S2 of FIG. 2 or 28), the image 30, so developed, contains pixels extending in range and cross-range directions. A cross-range displacement of row of pixels 32, that extends in the range direction (i.e., a row of pixels with equal Doppler), is contained in plane 36 that is orthogonal to the path of the radar. Orthogonal plane 36 intersects the path at particular point 34 that defines a center location of the radar when data was collected to develop row of pixels 32 that extend in the range direction. This location is different than the center location of the radar when data for the whole image 30 was collected. Thus, for any cross-range displaced row of pixels that extend in the range direction, it is possible to determine a radar location at the center of the aperture used to collect the data corresponding to the row of pixels. To obtain the greatest accuracy for the radar location, correction parameters are preferably determined for the radar path according to the least squares adjustment of observations and parameters process described with respect to FIG. 11 (steps P21 through P26) and FIGS. 12–13.

Since the master and slave images have been registered before the interferogram was developed, a selection of a particular row of pixels extending in the range direction defines the location of the radar when data was collected for both the master and slave images. The row of pixels that extends in the range direction and the location of the radar when both the master and slave images were collected are all coplanar. See FIG. 30.

Figure 31:
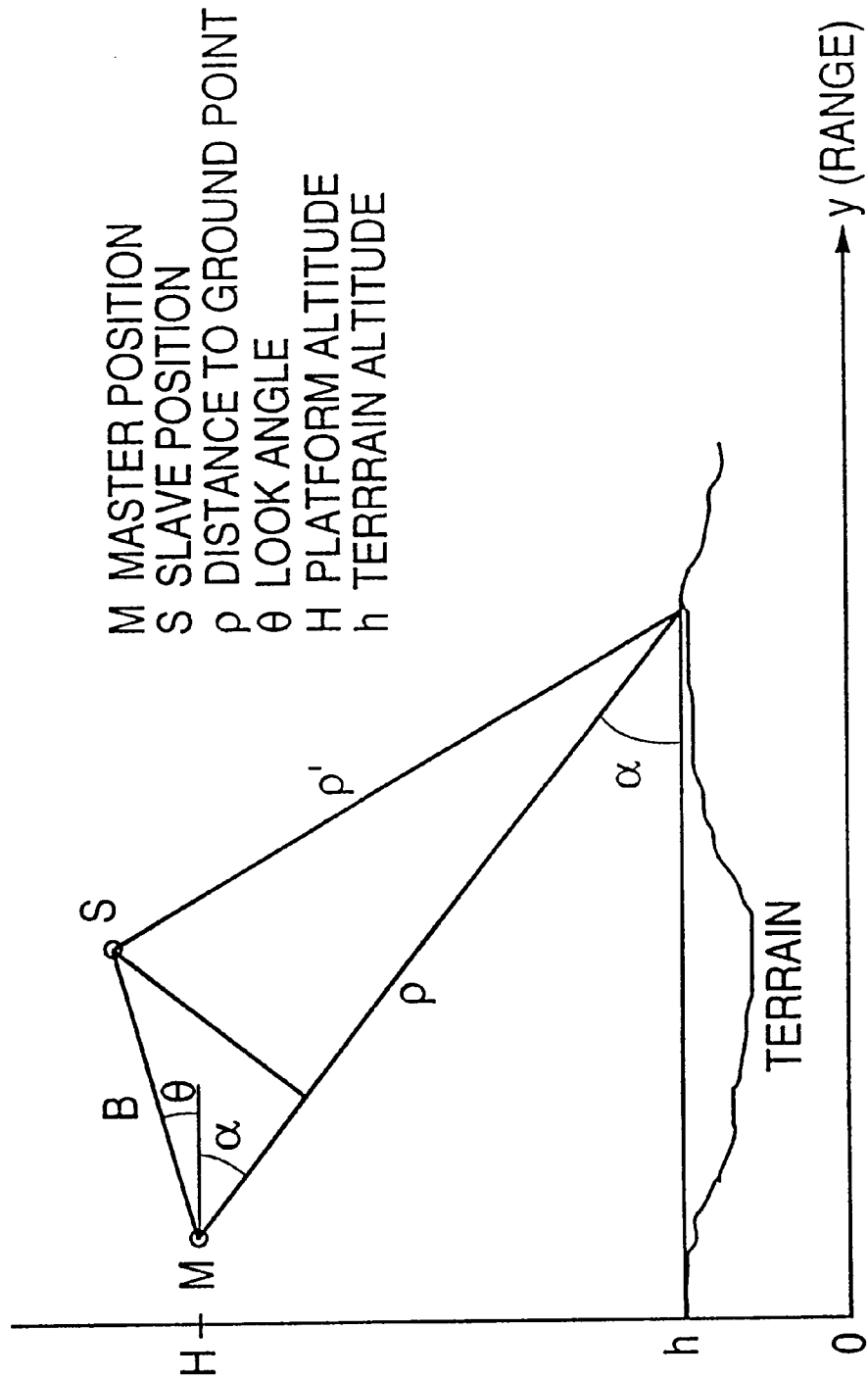

In FIG. 31, the triangular geometry of a pixel, the location of the radar when the master pixel was measured and the location of the radar when the slave pixel was measured in orthogonal plane 36 (FIG. 30) is depicted. Since the master and slave images have been accurately registered, the slave pixel and the master pixel are overlayed on the pixel. The pixel's location in X and Y (in a local tangent plane coordinate set) defines the center time within the master aperture, and therefore, defines location M of the radar when the master pixel data was collected. The location M is coordinate transformed to be expressed in a local tangent plane coordinate set. The pixel's location in X and Y also defines the center time within the slave aperture, and therefore, defines location S of the radar when the slave pixel data was collected. The location S is coordinate transformed to be expressed in a local tangent plane coordinate set. Then look angle θ, baseline B and master platform altitude H are computed (see FIG. 31). Distance to ground pixel p is the measured range R to the pixel in the master image, and radar wavelength λ is defined by the data set from the radar.

A distance may be expressed by the phase change at the radar wavelength. A 2π phase change corresponds to a distance equal to one wavelength. A radar sends a signal to the ground pixel where the signal is reflected and returned to the radar. The round trip distance may be expressed as a phase change. The round trip distances to and from the ground pixel as observed at the slave radar location and at the master radar location are generally not equal. The round trip distance difference, expressed as a phase angle, is the phase angle computed in the global phase unwrapping process completed in equation (64). The phase difference has been adjusted to be predetermined phase difference $\phi_{0,0}$ (e.g., 0 phase) at a reference pixel. This is equivalent to adjusting the phase of the transmitted signal from either the master or slave radar to achieve the predetermined phase difference $\phi_{0,0}$ at the reference pixel. Observation of another pixel by the master and slave radars will increase or decrease the range to the pixel by different amounts that defines the phase computed by equation (64).

Angle α (see FIG. 31) is computed by $$\alpha = \cos^{-1}(\lambda\phi/(2\pi)) - \theta, \text{ and} \quad (65)$$

then terrain altitude h is computed by:

$$h = H - \rho\sin(\alpha), \quad (66)$$

where $\phi$ is the interferometer phase as computed in equation (64) and as adjusted for reference phase $\phi_{0,0}$. This calculation is repeated for each pixel in the interferogram phase array to determine the output elevation array and complete process step S6 (FIG. 2 or 28).

Figure 32:
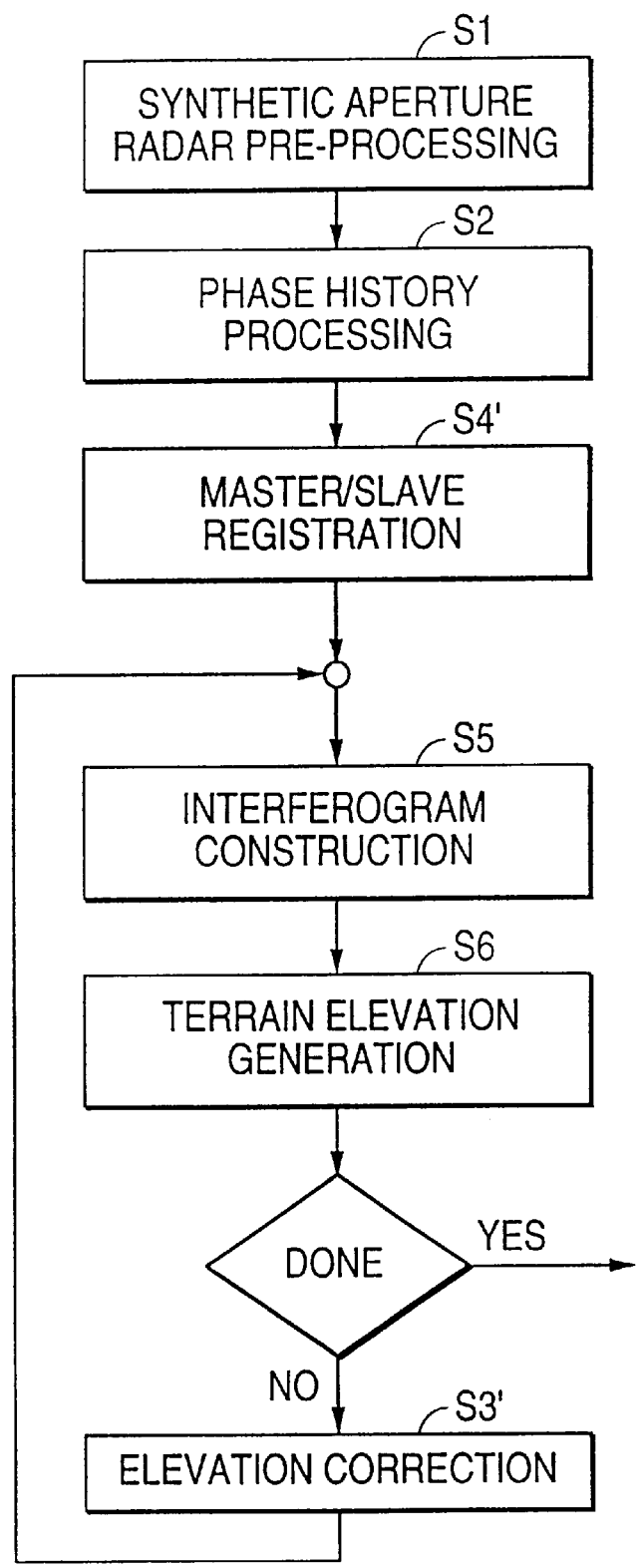
FIG. 32 is a functional block diagram of a third embodiment of the invention.

In FIG. 32, an alternative embodiment of this process includes the same steps S1, S2, S5 and S6 as described with respect to FIG. 2 or 28. This alternative embodiment is useful when there is no a priori elevation data available and there is no image data available with a suitable angle subtended to permit elevation to be generated using radargrammetry.

In this alternative embodiment, steps S5, S6 and S3' are iterated 3 to 6 times to achieve desired accuracies. In the first iteration, elevation correction is not possible since there is no elevation data. Furthermore, since elevation correction is not possible during the initial iteration, the master and slave image data from step S2 need not be auto-focused using the advanced phase gradient technique described herein during this initial iteration. The master and slave images generated from the phase history processing are merely registered to each other in step S4' using a de-warping process as described with respect to step P15 of FIG. 19. However, after the initial iteration, image data from step S2 (FIG. 32) should be auto-focused using the phase gradient technique.

The registered images are used to form an interferogram in step S5 and generate an interferometric terrain elevation array in step S6 as would be done in the method described with regard to FIG. 2 or 28. Then the interferometric terrain elevation array is used to correct master and slave images for layover effects in step S3' as described with regard to step S3' in FIG. 28 (i.e., where the layover corrected slave image is de-warped to the layover corrected master image, even though the master image is not de-warped to a regular grid). An equivalent procedure would be to de-warp the layover corrected master image to a regular grid (or for that matter, a near regular grid), and de-warp the layover corrected slave image to the same regular grid and then register one image to the other using tie-point registration as described with respect to step S4 of FIG. 2.

In the succeeding iteration, the elevation corrected master and slave images (from S3' of FIG. 32) are used to form an interferogram in step S5, and an updated terrain elevation array is computed in step S6. The iterations continue for 3 to 6 times until a completion criteria is reached. The completion criteria may be as simple as a test for done indicated by the number of iterations performed.

Figure 33:
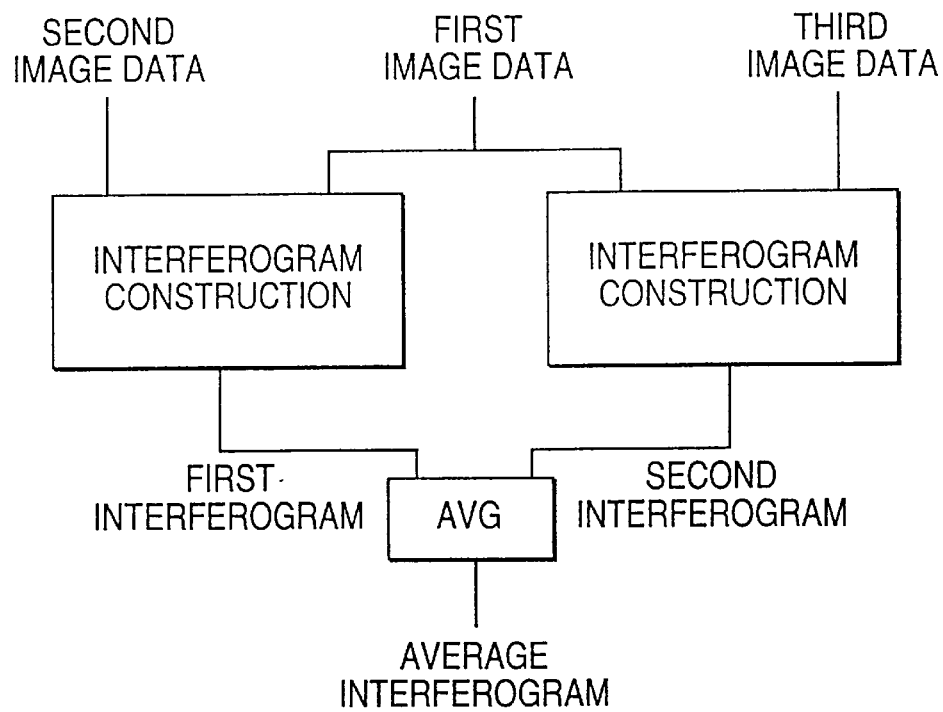
FIGS. 33 and 34 are function block diagrams of techniques to combine interferograms.

In an alternative embodiment depicted in FIG. 33, step S5, interferogram construction (e.g., FIG. 2, 28 or 32) is achieved by combining interferograms. In FIG. 33, three image data arrays representing a region, preferably layover corrected arrays, are available and contain processed data from radar observations where the radar was positioned at three corresponding points. Any combination of two points of the three corresponding points form an angle with the region that is preferably less than one milliradian. In a step identical to step S5 (FIG. 2, 28 or 32), the first and second image data is combined to form a first interferogram. In another step identical to step S5 (FIG. 2, 28 or 32), the first and third image data is combined to form a second interferogram. The first and second interferograms are combined by performing a pixel by pixel weighted average to form a weighed interferogram. The weighted interferogram is processed as described with respect to step S6, terrain elevation generation (FIG. 2, 28 or 32).

Figure 34:
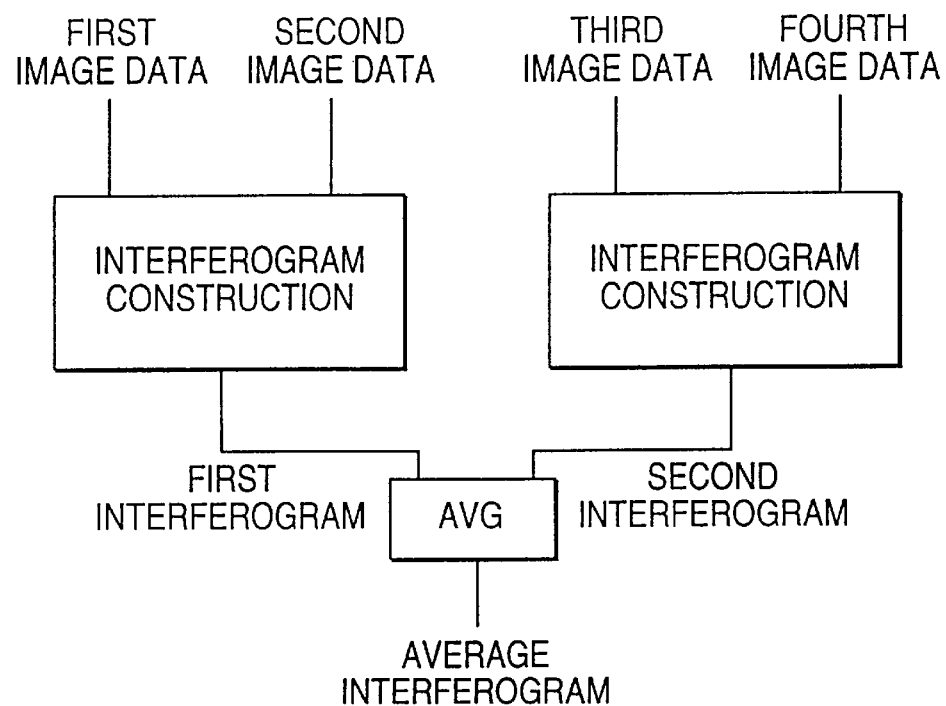
Figure 35:
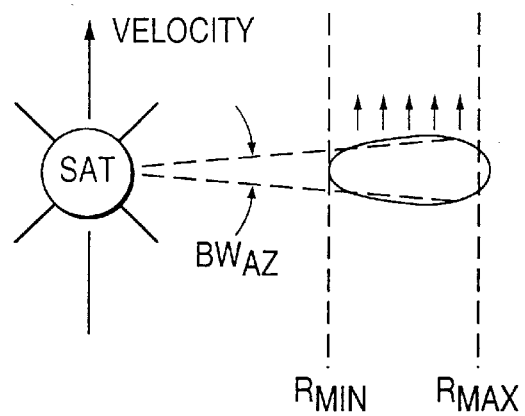
FIGS. 35 and 36 are plan and elevation views of the geometry used to collect radar data from a moving satellite.
Figure 36:
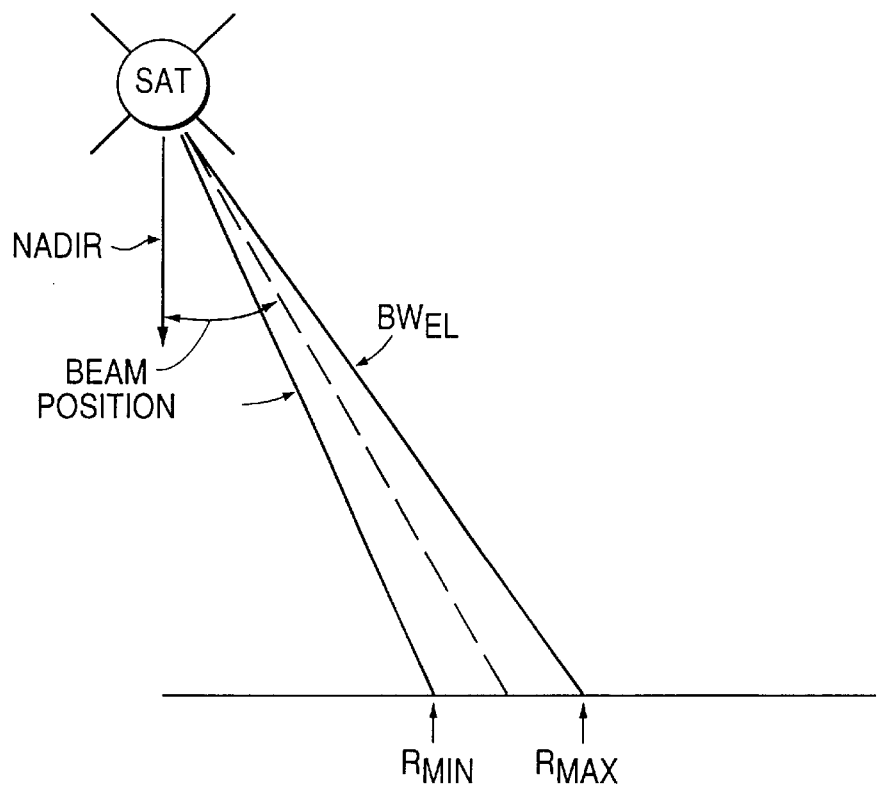
Figure 37:
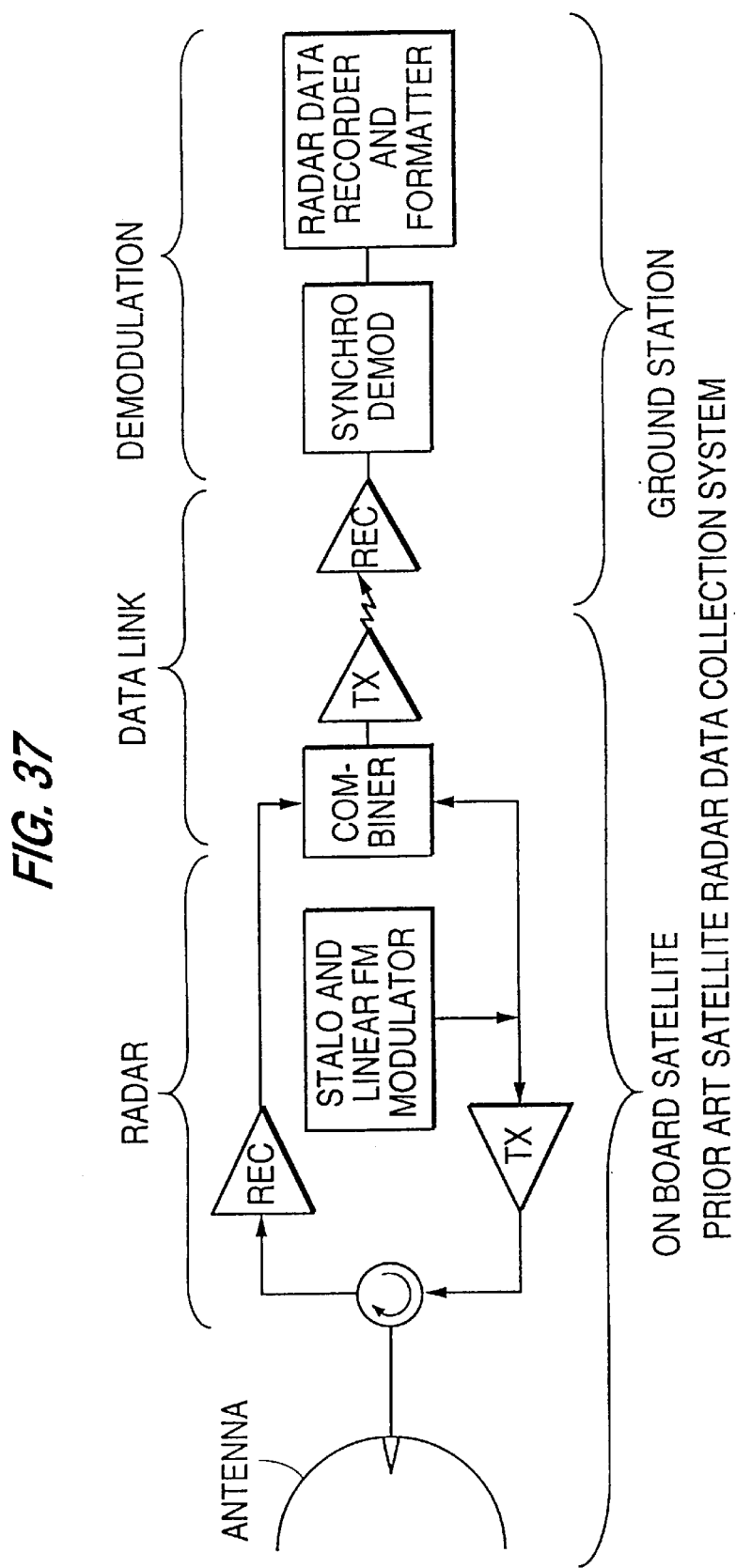
FIG. 37 is a system block diagram of a known satellite radar data collection system.
Figure 38:
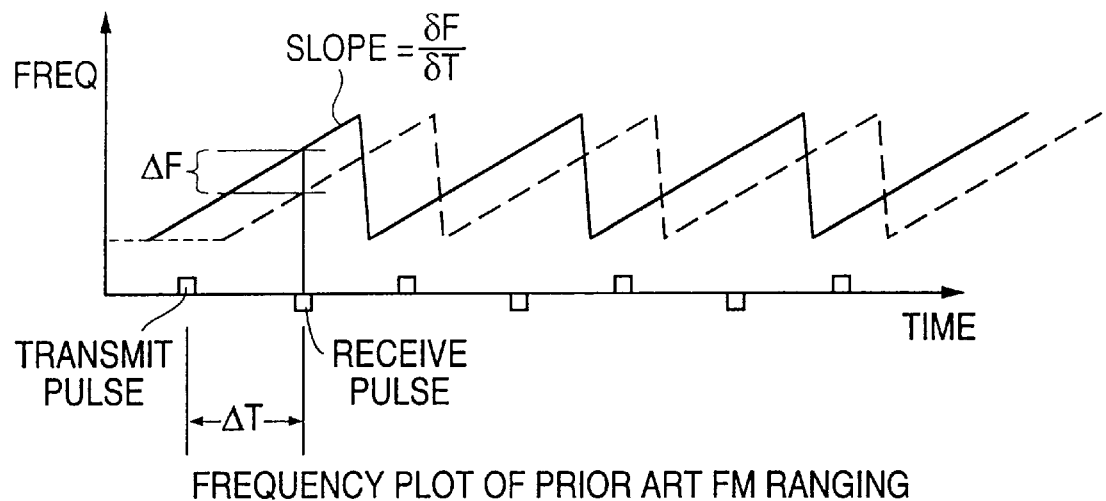
FIG. 38 is a graph of frequency as a function of time for a known linear FM radar ranging technique.
Figure 39:
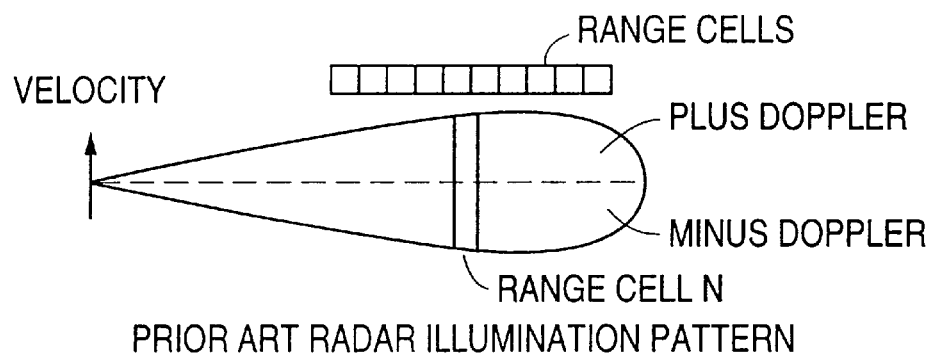
FIG. 39 is a diagram of a single pulse illumination foot print of a radar beam from a known satellite radar.
Figure 40:
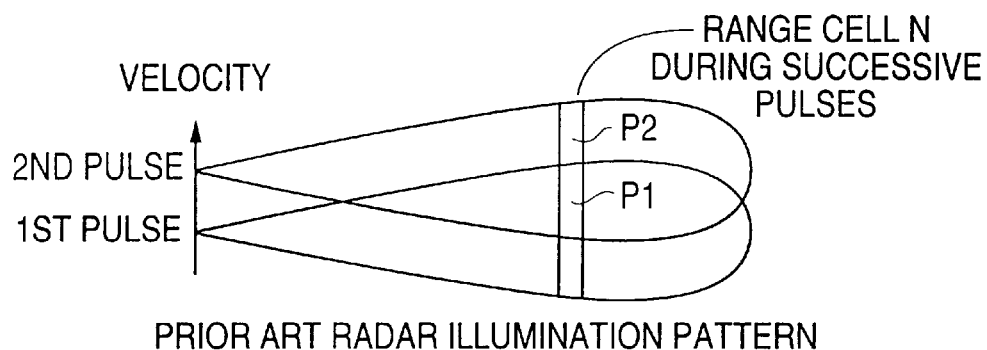
FIG. 40 is a diagram of a two pulse illumination foot print of a radar beam from a known satellite radar.
Figure 41:
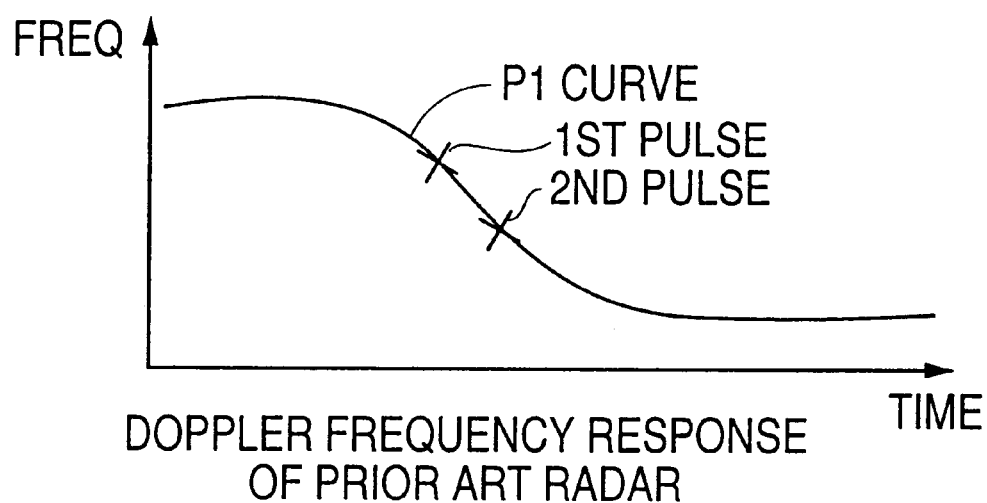
FIG. 41 is a graph depicting the known Doppler frequency shift from single ground reflector P1 as observed by a radar that is moving with respect to the ground reflector.
Figure 42:
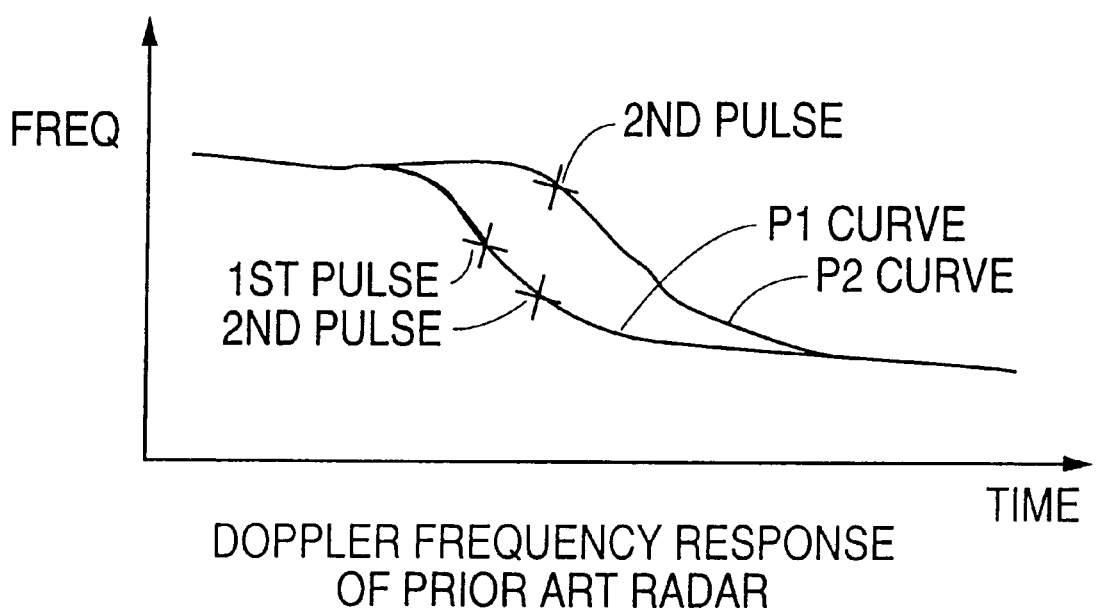
FIG. 42 is a graph depicting the known Doppler frequency shift from two ground reflectors P1, P2 as observed by a radar that is moving in an along tract direction with respect to the two ground reflectors.

In FIG. 34, four image data arrays representing a region, preferably layover corrected arrays, are available and contain processed data from radar observations where the radar was positioned at four corresponding points. Any combination of two points of the four corresponding points form an angle with the region that is preferably less than one milliradian. In a step identical to step S5 (FIG. 2, 28 or 32), the first and second image data is combined to form a first interferogram. In another step identical to step S5 (FIG. 2, 28 or 32), the third and fourth image data is combined to form a second interferogram. The first and second interferograms are combined by performing a pixel by pixel weighted average to form a weighed interferogram. The weighted interferogram is processed as described with respect to step S6, terrain elevation generation (FIG. 2, 28 or 32).

The weighing for the first and second interferograms is ordinarily balanced 50:50. However, when an image pair has less than ideal geometry, or the radar source of one of the images is degraded with respect to the other radar sources (e.g., different radars operating at different frequencies are permitted), unbalanced weighting is used. Multiple interferograms may be combined this way.

By using a phase gradient auto-focus technique for phase history processing, by correcting images for layover effects, by accurately registering the master and slave images and by using a global phase unwrapping process, accurate wide area elevation maps can be prepared from strip mode (i.e., large area) SAR images (synthetic aperture radar images). Known techniques using spot mode SAR images (different than strip mode SAR) from aircraft radars (e.g, at 50,000 feet altitude) are limited to small areas of only one or two nautical miles in diameter. In contrast, with the present IFSAR (interferometry SAR) process, aircraft strip mode SAR images as large as 60 nautical miles on a side (from ERS-1 satellite data) have been successfully processed to calculate elevation data for maps. Known attempts to process strip mode SAR images and extract elevation data by interferometry have failed.

In one test, a first image of ERS-1 data from a radar operating at C-band was successfully processed against a second image of ERS-1 data from the same radar but collected at a different time (i.e, different orbit). In another test, a first image of ERS-1 data from a first radar operating at C-band was successfully processed against a second image of ERS-2 data from a second and different radar operating in C-band. The above described method will also successfully process image data from two different satellite radars operating at different frequencies. The method will even successfully process image data from different radars carried on different platforms such as one radar on a satellite and the other on an terrestrial airplane.

Known elevation measurement systems are unable to achieve elevation measurements over large areas with inter-ferogrammtric means. Strip type synthetic aperture radar modes are preferred when large area performance is desired; however, known radar systems cannot maintain sufficient phase coherence over large areas with strip mode radars to achieve interferometric elevation measurements over the large area. With strip mode radars, known technology would loose coherence over the large array because the wrapped interferogram cannot be faithfully unwrapped over the whole area.

Some known radars use commonly employed spot type synthetic aperture radar modes to achieve coherence across a small image. However, the spot modes are commonly employed in terrestrial aircraft, and therefore, are limited to small area arrays usually less than 2 to 5 kilometers in spot diameter. Even though a spot mode achieves good coherence across the small area, known elevation measurement systems do not use such spot mode radars.

Known systems do not combine (i.e., mosaic together) smaller interferograms to achieve a larger interferogram. At the border where two smaller interferograms meet, there is a phase discontinuity that cannot be adaquately eliminated by known unwrapping techniques. This results in sharp elevation discontinuities when the elevations are ultimately determined.

Similarly, known systems do not combine (i.e., mosaic together) smaller elevation arrays to achieve larger elevation arrays. The phase discontinuites discussed above cause severe elevation discontinuites in elevation arrays generated from the interferograms. Any attempt to mosaic together smaller elevation arrays (e.g., as if generated from many smaller interferograms generated by spot mode SARs) would require an unexceptable level of manual intervention to smooth elevation discontinuites along the border between the small elevation arrays.

Over large areas, known elevation measurement systems must rely on noncoherent procedures commonly known as radargrammetry (i.e., based on intensity correlation). With known systems vertical elevation accuracies are limited to a one sigma vertical error of more than 50 meters over wide areas (i.e., larger than 2 kilometers).

In contrast, the present invention achieves sufficient phase coherence with strip mode radars (but not limited to strip mode radars) across large areas to permit interferometric elevation determination. Accuracies with a one sigma vertical error of less than 30 meters are achieved over wide areas (i.e., larger than 20 kilometers and even as large as 100 kilometers across track). ERS-1 data may be obtained for an area that measures 100 kilometers by 100 kilometers. In fact, one sigma vertical errors of less than 100 times the radar wavelength are achieved over wide areas. The relative range between a ground point and the two radar observation positions is measured to within 10 to 15 degrees out of the 360 degrees that makes up a wavelength. With preferred radar separations (e.g., about one-fifth of a milliradian, vertex of the angle at the ground point), at preferred down look angles (e.g., 60 degrees), accuracies to a one sigma vertical error of less than 50 times the radar wavelength are achieved over wide areas. For example, at C-band (i.e., 5 GHz) one sigma vertical errors of about 2.5 meters are achievable over wide areas.

With the present invention, it is not even necessary that the master and slave images come from the same radar. The master radar may operate at one frequency while the slave radar operates at another frequency, the frequencies being any frequency in a band from 0.4 GHz to 12 GHz. The algorithm is sufficiently robust to accomodate this wide band of frequencies. Lower frequencies are preferred to penetrate foliage at the earth's surface, and higher frequencies are preferred to achieve higher resolution maps.

The two radars need not operate at the same altitude. In fact, the one radar may be carried by satellite and another by aircraft. An aircraft borne radar may operate at an altitude between 25,000 feet and 70,000 feet. A 30,000 to 50,000 foot altitude may be regarded as typical. At higher altitudes, a higher performance or special aircraft is required, and at lower altitudes, significant shadowing may occur in mountainous areas when large areas are to be surveyed.

A satellite borne radar will orbit at altitudes between 80 nautical miles and 800 nautical miles. A 300 nautical mile polar orbit may be regarded as typical. At lower altitudes, the satellite's orbit will decay more rapidly due to atmospheric drag, and at higher altitude, high resolution is more difficult to achieve due to the widening antenna beam at longer ranges.

The image resolution achieved by the present invention is better than 120 meters in all directions. In general, the resolution in the radar slant plane is the speed of light divided by the radar system bandwidth. The radar system bandwidth is, in general, different for the range and cross range dimension. In the range dimension (i.e., cross track for a strip mode radar), the radar system bandwidth is divided by the cosine of the radar slant plane angle (i.e., the angle between the radar slant plane and the local tangent plane).

Some known interferometric SAR processes use two simultaneous radars separated by a baseline and fixedly held to the separation by rigid means such as a long boom, etc. Even with such techniques, strip mode SAR images wider than 10 kilometers are not attempted. In contrast, the present invention uses two images derived from almost any source. In practice, the two images may come from one satellite radar that makes separate passes observing the same region on different days, or it may come from an aircraft radar making different passes on different days, or even different season (i.e., snow instead of summer foliage). The present process uses statistics extracted from the collected data itself to perform all necessary alignments and registrations.

Known art does not correct for layover effects. Known art is not capable of using inputs of a priori known elevation data from auxiliary sources. Known art does not provide elevation data from radargrammetry to improve accuracy of the interferometric elevation determination process. Known interferometry art does not improve elevation accuracy by using an auxiliary SAR image for radargrammetry processing. Known art is not capable of incrementally improving elevation accuracy by combining additional SAR images of the region. Known art does not iterate on an interferometric solution to improve accuracy.

Having described preferred embodiments of a novel processor and method for measuring elevation data using an interferometric synthetic aperture radar (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. A method of processing a wrapped phase array into an unwrapped phase array, the method comprising steps of:
   forming a twice unfolded array from the wrapped phase array and computing a first array, each element of the first array being based on a discrete Poisson difference equation;
   processing the first array through a two dimensional FFT to form a second array;
   scaling the second array by a scaling function to form a third array; and
   processing the third array through an inverse two dimensional FFT to form the unwrapped phase array.

2. The method of claim 1, wherein the step of forming a twice unfolded array forms an array periodic in two dimensions.

3. The method of claim 2, wherein the step of computing a first array further comprises steps of:
   computing a row difference array, an element in the row difference array being based on a difference between an element in a particular row in the twice unfolded array and an element in an adjacent row in the twice unfolded array;
   computing a column difference array, an element in the column difference array being based on a difference between an element in a particular column in the twice unfolded array and an element in an adjacent column in the twice unfolded array;
   computing a double row difference array, an element in the double row difference array being based on a difference between an element in the particular row in the row difference array and an element in an adjacent row in the row difference array;
   computing a double column difference array, an element in the double column difference array being based on a difference between an element in the particular column in the column difference array and an element in an adjacent column in the column difference array; and
   adding the double row difference array to the double column difference array element by element to form the first array.

4. The method of claim 1, wherein the step of scaling multiplies the scaling function by each element in the second array, the scaling function being an inverse of:

$$2\cos(\pi m/M)+2\cos(\pi n/N)-4,$$

where
   M is a number of rows in the second array,
   m is an index for M,
   N is a number of columns in the second array, and
   n is an index for N.

5. A computing machine comprising:
   a processor;
   a first module to form a twice unfolded array and compute a first array from a wrapped phase array, each element of the first array being based on a discrete Poisson difference equation;
   a second module to process the first array through a two dimensional FFT to form a second array;
   a third module to scale the second array by a scaling function to form a third array; and
   a fourth module to process the third array through an inverse two dimensional FFT to form a unwrapped phase array.

6. The machine of claim 5, wherein the first module comprises a first sub-module to form the twice unfolded array as an array periodic in two dimensions.

7. The machine of claim 6, wherein the first module further comprises:
   a second sub-module to compute a row difference array, an element in the row difference array being based on a difference between an element in a particular row in the twice unfolded array and an element in an adjacent row in the twice unfolded array;
   a third sub-module to compute a column difference array, an element in the column difference array being based on a difference between an element in a particular column in the twice unfolded array and an element in an adjacent column in the twice unfolded array;
   a fourth sub-module to compute a double row difference array, an element in the double row difference array being based on a difference between an element in the particular row in the row difference array and an element in an adjacent row in the row difference array;
   a fifth sub-module to compute a double column difference array, an element in the double column difference array being based on a difference between an element in the particular column in the column difference array and an element in an adjacent column in the column difference array; and a sixth sub-module to add the double row difference array to the double column difference array element by element to form the first array.

8. The machine of claim 5, wherein the third module multiplies the scaling function by each element in the second array, the scaling function being an inverse of:

$$2\cos(\pi m/M)+2\cos(\pi n/N)-4,$$

where

M is a number of rows in the second array, m is an index for M,

N is a number of columns in the second array, and n is an index for N.

9. A computer readable medium having stored thereon a plurality of modules for controlling a computer, the plurality of modules comprising:

a first module to control the processor to form a twice unfolded array and compute a first array from a wrapped phase array, each element of the first array being based on a discrete Poisson difference equation;

a second module to control the procesor to process the first array through a two dimensional FFT to form a second array;

a third module to control the processor to scale the second array by a scaling function to form a third array; and a fourth module to control the processor to process the third array through an inverse two dimensional FFT to form a unwrapped phase array.

10. The medium of claim 9, wherein the first module comprises a first sub-module to control the processor to form the twice unfolded array as an array in two dimensions.

11. The medium of claim 10, wherein the first module further comprises:

a second sub-module to control the processor to compute a row difference array, an element in the row difference array being based on a difference between an element in a particular row in the twice unfolded array and an element in an adjacent row in the twice unfolded array;

a third sub-module to control the processor to compute a column difference array, an element in the column difference array being based on a difference between an element in a particular column in the twice unfolded array and an element in an adjacent column in the twice unfolded array;

a fourth sub-module to control the processor to compute a double row difference array, an element in the double row difference array being based on a difference between an element in the particular row in the row difference array and an element in an adjacent row in the row difference array;

a fifth sub-module to control the processor to compute a double column difference array, an element in the double column difference array being based on a difference between an element in the particular column in the column difference array and an element in an adjacent column in the column difference array; and a sixth sub-module to control the processor to add the double row difference array to the double column difference array element by element to form the first array.

12. The medium of claim 9, wherein the third module controls the processor to multiply the scaling function by each element in the second array, the scaling function being an inverse of:

$$2\cos(\pi m/M)+2\cos(\pi n/N)-4,$$

where

M is a number of rows in the second array, m is an index for M,

N is a number of columns in the second array, and n is an index for N.

* * * * *